(12) United States Patent
Sensui

(10) Patent No.: US 6,552,857 B2
(45) Date of Patent: Apr. 22, 2003

(54) SOFT-FOCUS LENS SYSTEM

(75) Inventor: Takayuki Sensui, Tokyo (JP)

(73) Assignee: PENTAX Corporation, Toyko (JP)

(*) Notice: Subject to any disclaimer, the term of this patent is extended or adjusted under 35 U.S.C. 154(b) by 0 days.

(21) Appl. No.: 10/126,695

(22) Filed: Apr. 23, 2002

(65) Prior Publication Data
US 2003/0053220 A1 Mar. 20, 2003

(30) Foreign Application Priority Data

| Apr. 24, 2001 | (JP) | ................................. 2001-125301 |
| Apr. 24, 2001 | (JP) | ................................. 2001-125302 |
| Jul. 17, 2001 | (JP) | ................................. 2001-216409 |

(51) Int. Cl.$^7$ ............................................. G02B 15/14
(52) U.S. Cl. .................... 359/692; 359/672; 359/676; 359/691; 359/795; 359/707
(58) Field of Search ............................. 359/672, 676, 359/692, 691, 795, 707

(56) References Cited

U.S. PATENT DOCUMENTS

| 5,172,274 A | 12/1992 | Hirakawa | ................... 359/745 |
| 5,822,132 A | * 10/1998 | Hirakawa | ................... 359/692 |
| 5,841,590 A | * 11/1998 | Sato | ........................... 359/763 |
| 5,991,093 A | 11/1999 | Murata et al. | ............... 359/691 |
| 6,212,017 B1 | 4/2001 | Murata | ........................ 359/690 |

FOREIGN PATENT DOCUMENTS

| JP | 8-86957 | 4/1996 |
| JP | 8-248310 | 9/1996 |

* cited by examiner

Primary Examiner—Georgia Epps
Assistant Examiner—M. Hasan
(74) Attorney, Agent, or Firm—Greenblum & Bernstein, P.L.C.

(57) ABSTRACT

A soft-focus lens system includes a master lens group and a soft-focus lens group. The soft-focus lens group includes a positive sub lens group and a negative sub lens group. The positive sub lens group and the negative sub lens group are moved to set the normal photographing mode or the soft-focus photographing mode. Each of the sub lens groups is arranged to move with respect to the master lens group and the other of the sub lens groups so that the focal point and the focal length are not substantially varied before and after the switching of the soft-focus photographing mode to the normal photographing mode or vice versa.

16 Claims, 47 Drawing Sheets

$F_{NO}$=2.9

—— d Line
------- g Line
---- C Line

-0.2    0.2
SPHERICAL
ABERRATION

CHROMATIC
ABERRATION

Y=21.64

-0.05   0.05
LATERAL
CHROMATIC
ABERRATION

Y=21.64

—— S
-- M

-0.2    0.2
ASTIGMATISM

Y=21.64

-2 (%) 2
DISTORTION $F_{NO}=2.9$

SPHERICAL
ABERRATION

CHROMATIC
ABERRATION

Y=21.64

LATERAL
CHROMATIC
ABERRATION

Y=21.64

ASTIGMATISM

Y=21.64

DISTORTION $F_{NO}=2.9$

—— d Line
------ g Line
---- C Line

-0.2  0.2
SPHERICAL
ABERRATION

CHROMATIC
ABERRATION

Y=21.64

-0.05  0.05
LATERAL
CHROMATIC
ABERRATION

Y=21.64

— S
-- M

-0.2  0.2
ASTIGMATISM

Y=21.64

-2 (%) 2
DISTORTION

Fig.7A  Fig.7B  Fig.7C  Fig.7D
$F_{NO}=2.9$  Y=21.64  Y=21.64  Y=21.64
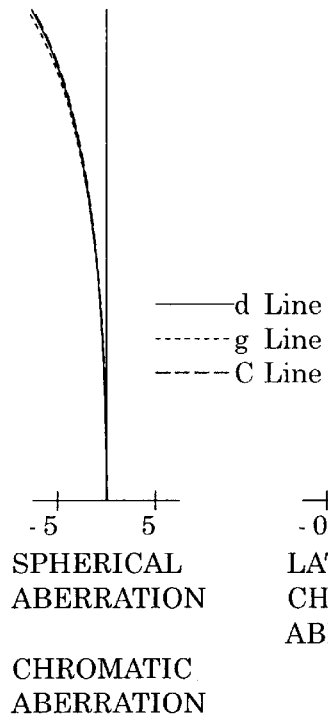
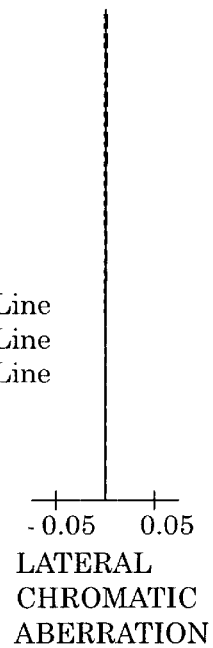
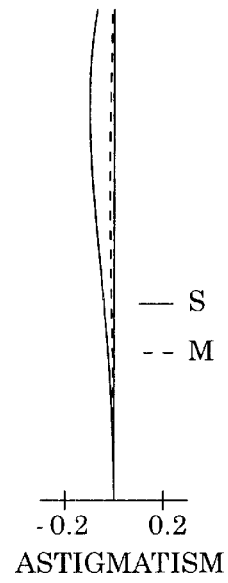
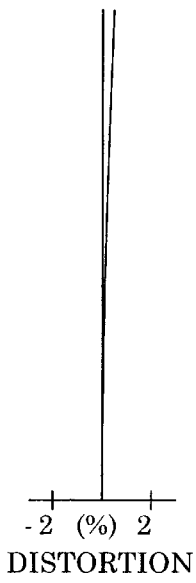
——— d Line
------- g Line
---- C Line
— S
-- M
-5  5     -0.05  0.05     -0.2  0.2     -2 (%) 2
SPHERICAL   LATERAL      ASTIGMATISM   DISTORTION
ABERRATION  CHROMATIC
            ABERRATION
CHROMATIC
ABERRATION
Fig.8A
Y=12.00   +1.00
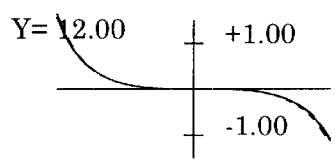
          -1.00
Fig.8B
Y=18.00   +1.00
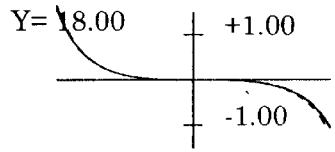
          -1.00
Fig.8C
Y=21.64   +1.00         ——— d Line
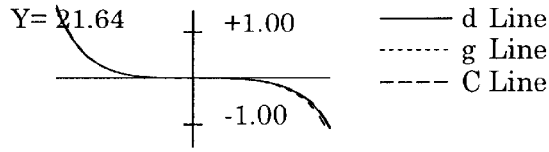    ------- g Line
          -1.00         ---- C Line Fig.9
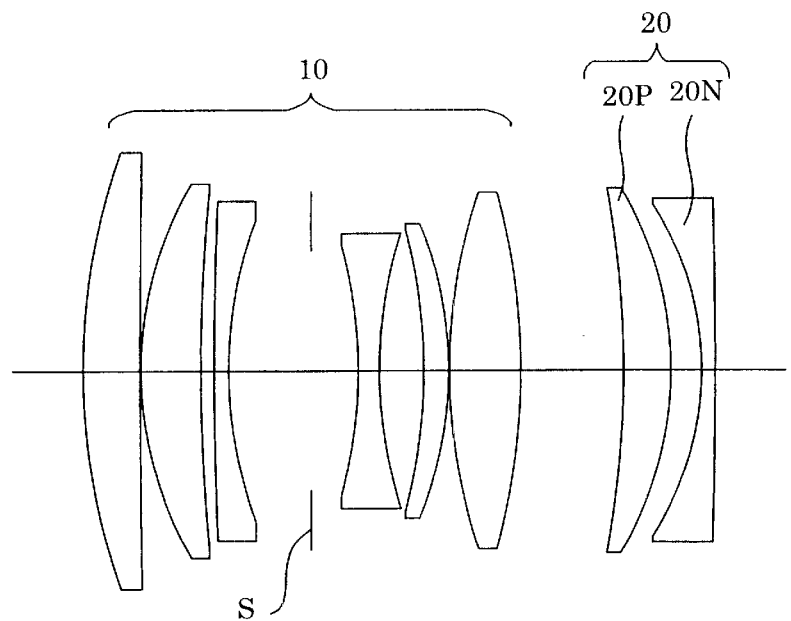
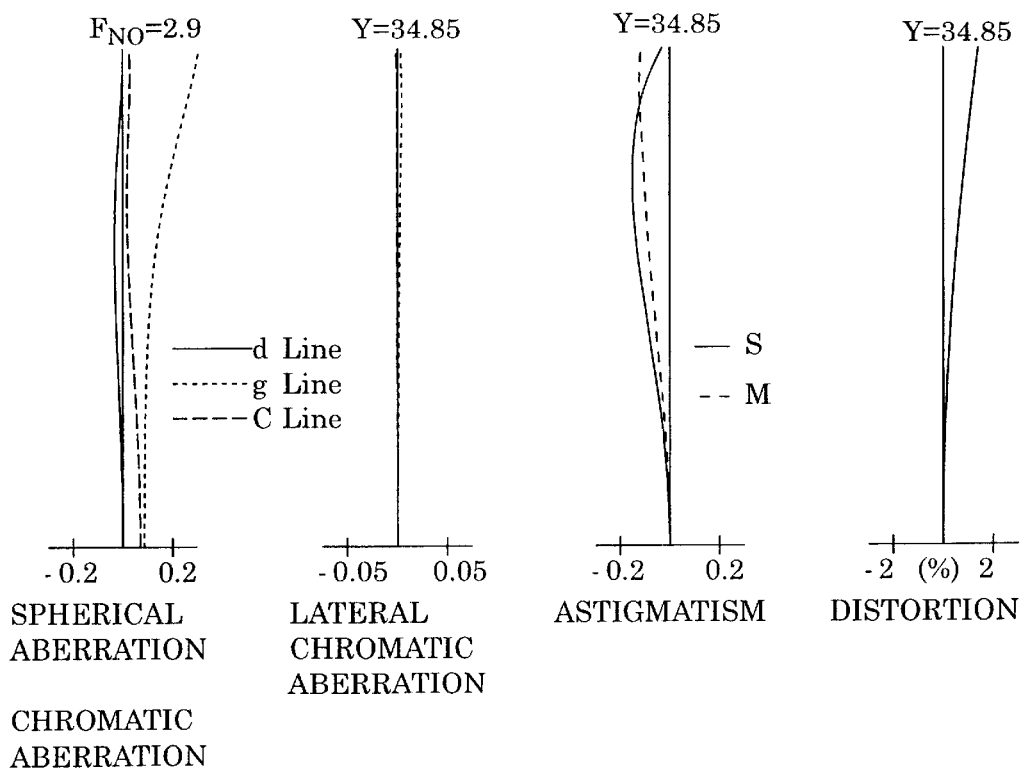
Fig.10A  Fig.10B  Fig.10C  Fig.10D

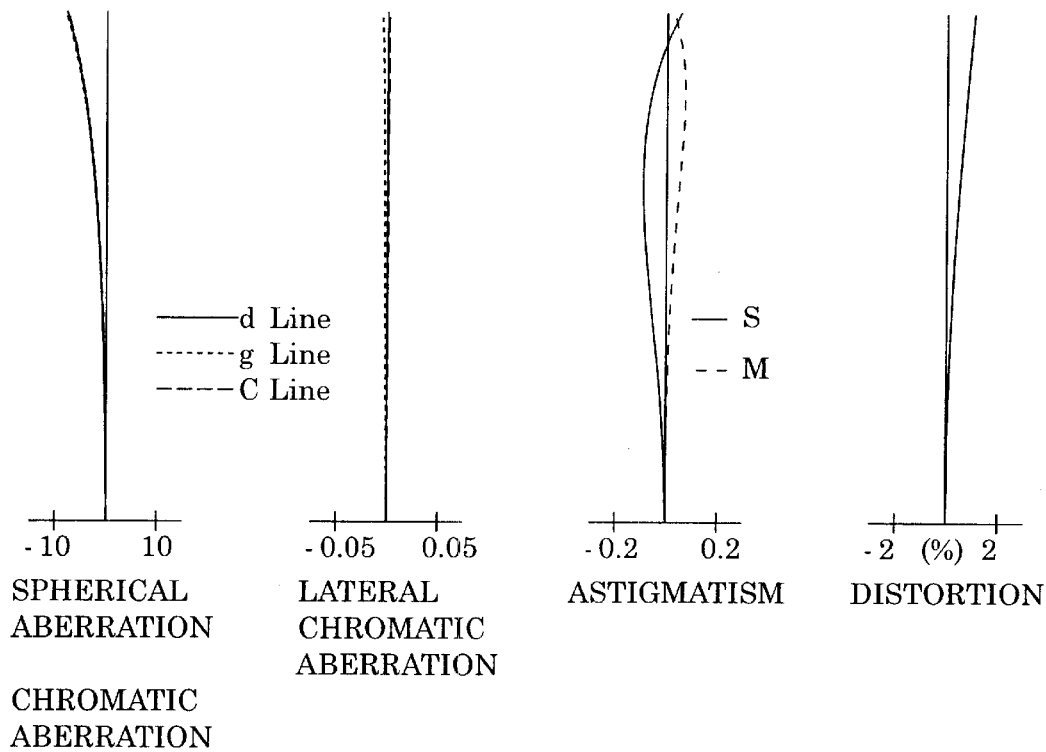
Fig.11A  F_NO=2.9  SPHERICAL ABERRATION CHROMATIC ABERRATION
Fig.11B  Y=34.85  LATERAL CHROMATIC ABERRATION
Fig.11C  Y=34.85  ASTIGMATISM
Fig.11D  Y=34.85  DISTORTION Fig.13
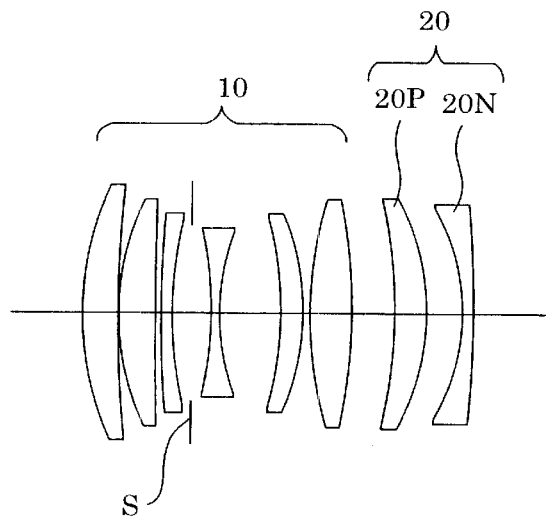
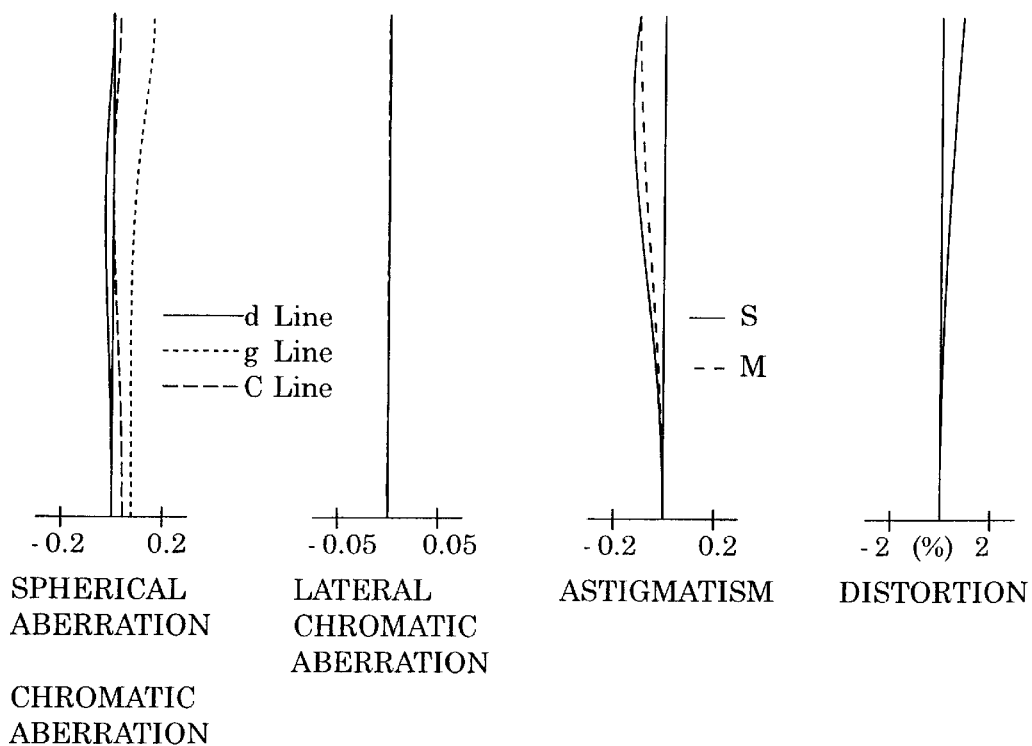
Fig.14A  Fig.14B  Fig.14C  Fig.14D
$F_{NO}=2.9$  Y=21.64  Y=21.64  Y=21.64
— d Line
------ g Line
---- C Line
— S
-- M
-0.2  0.2    -0.05  0.05    -0.2  0.2    -2 (%) 2
SPHERICAL    LATERAL       ASTIGMATISM   DISTORTION
ABERRATION   CHROMATIC
             ABERRATION
CHROMATIC
ABERRATION

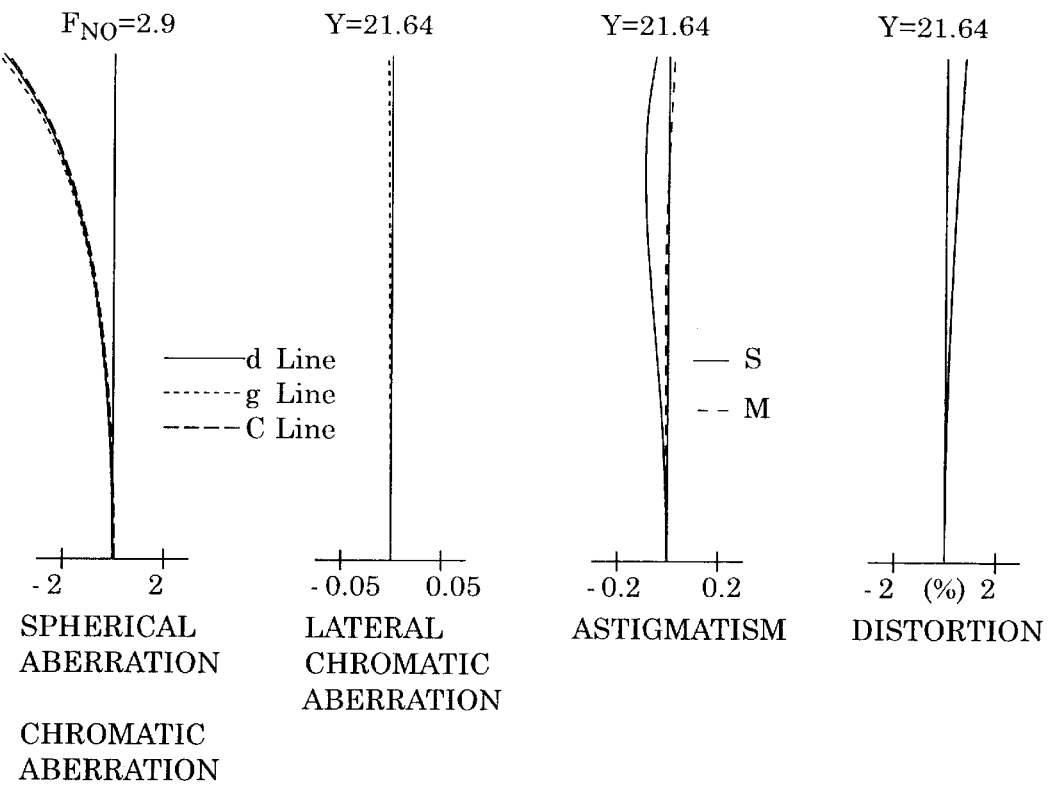
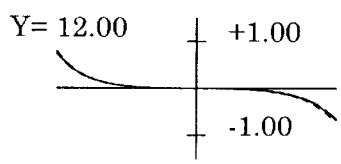
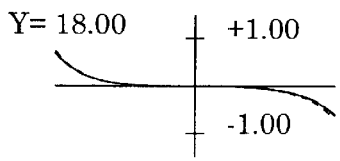
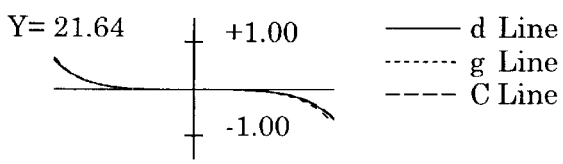

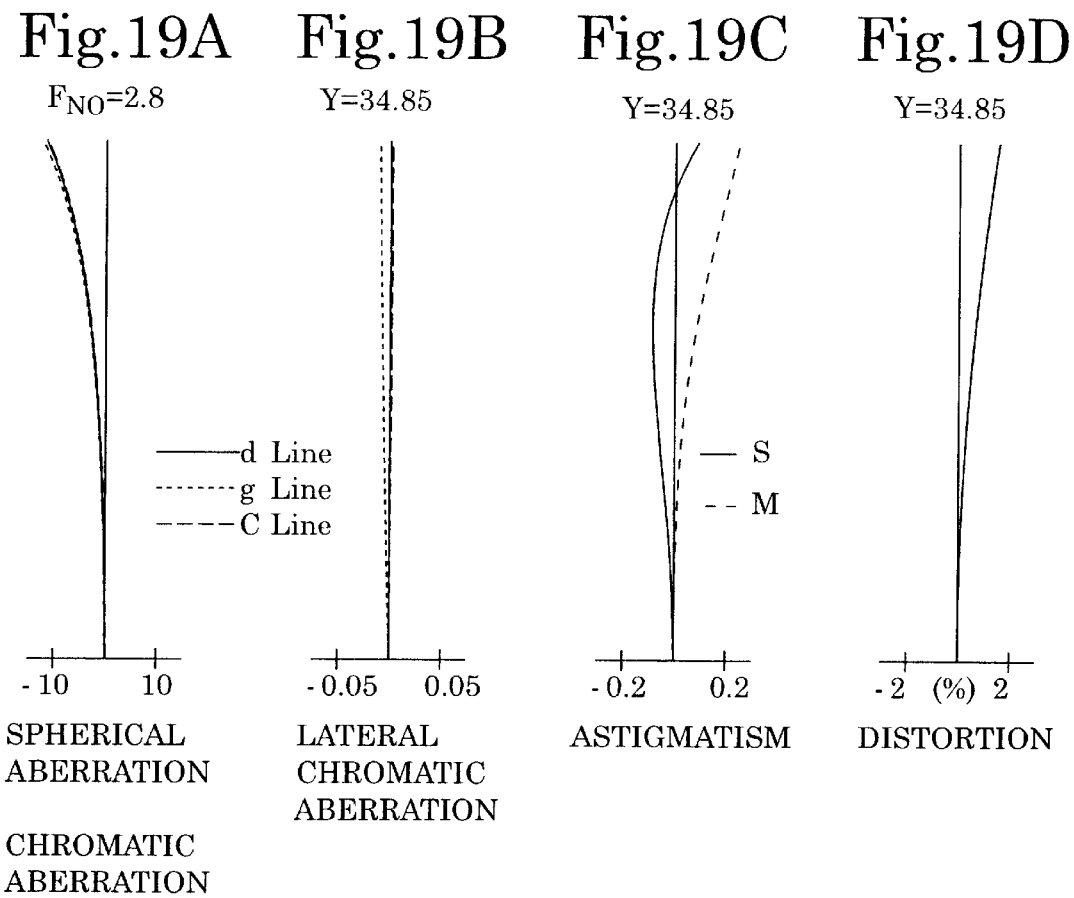

Fig.21
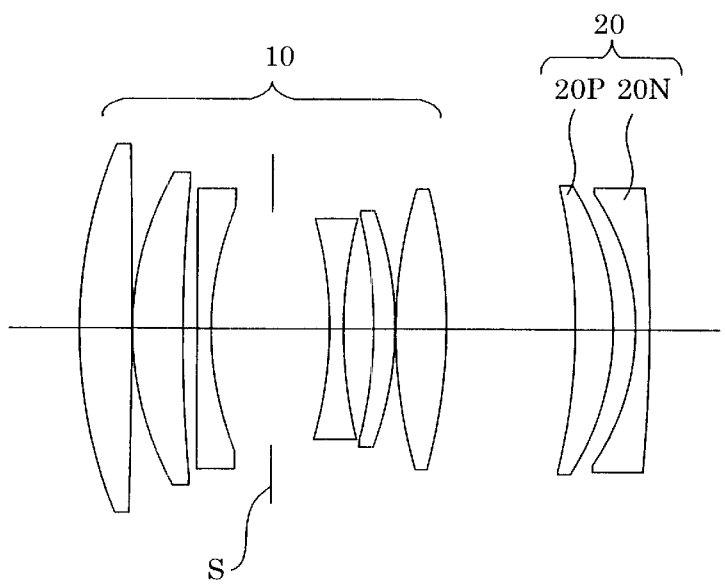
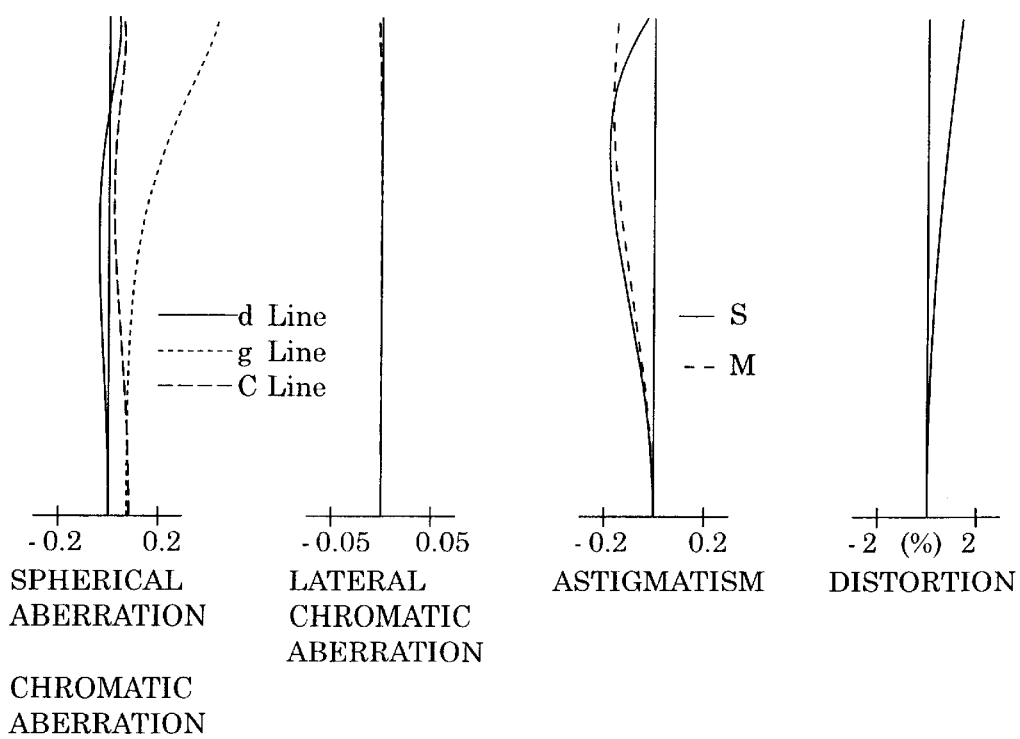
Fig.22A  Fig.22B  Fig.22C  Fig.22D
$F_{NO}=2.9$   Y=34.85   Y=34.85   Y=34.85
— d Line
----- g Line
---- C Line
— S
-- M
-0.2  0.2   -0.05  0.05   -0.2  0.2   -2 (%) 2
SPHERICAL  LATERAL      ASTIGMATISM  DISTORTION
ABERRATION  CHROMATIC
            ABERRATION
CHROMATIC
ABERRATION

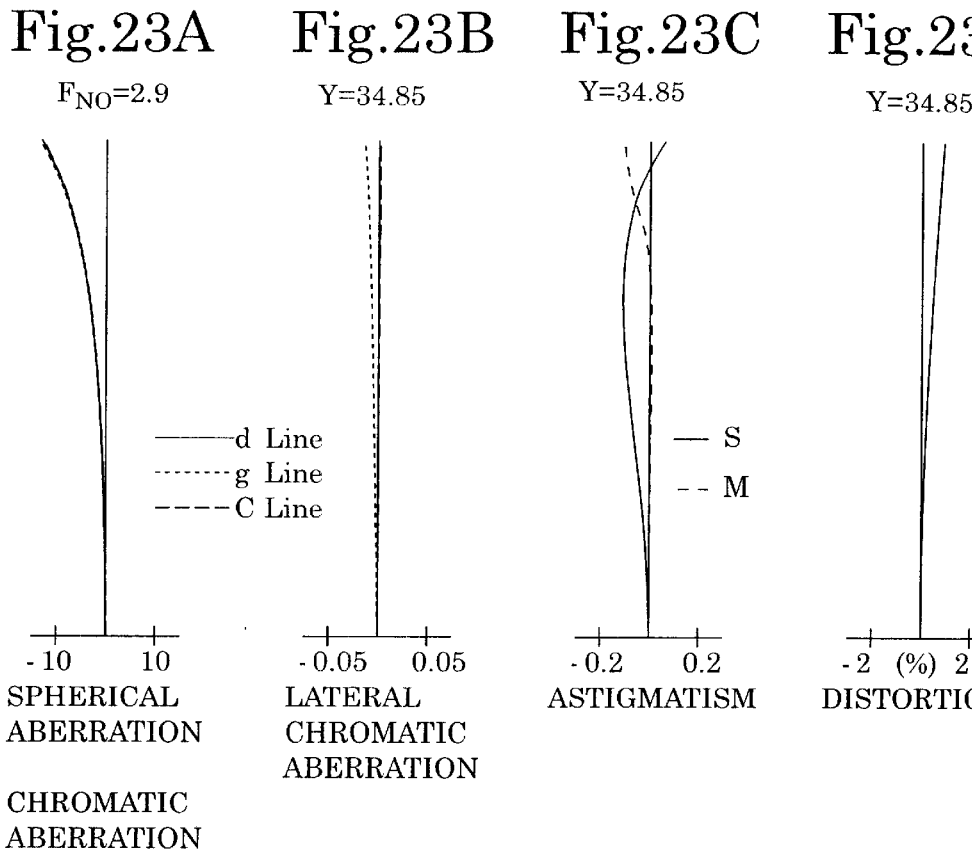

Fig.25
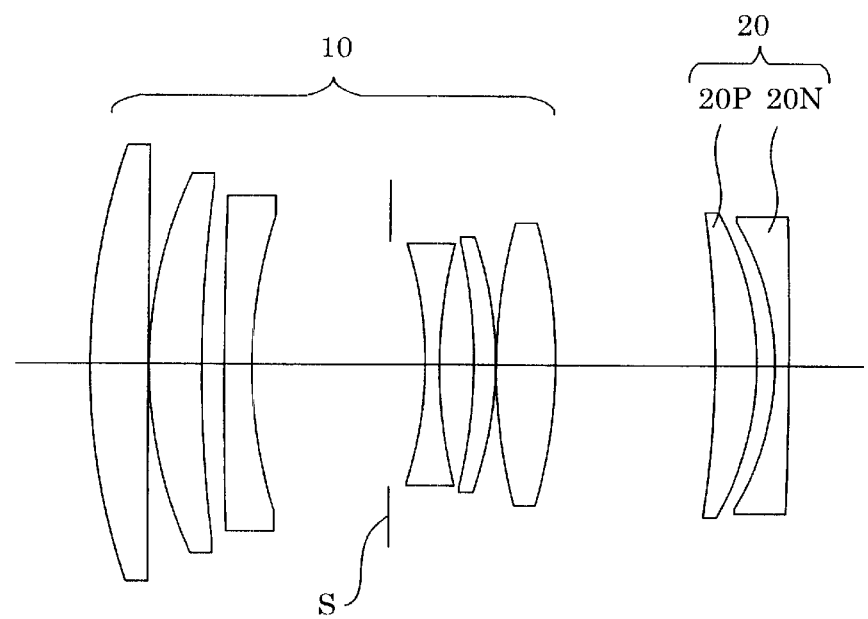
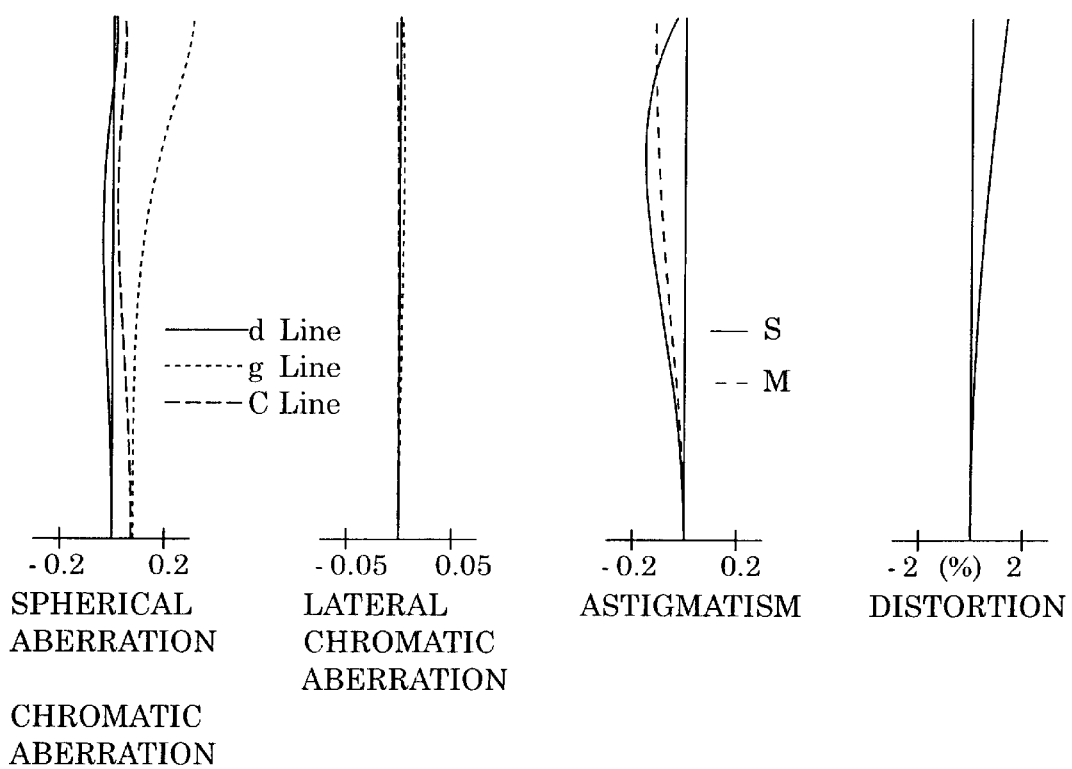
Fig.26A  Fig.26B  Fig.26C  Fig.26D
$F_{NO}=2.8$  Y=34.85  Y=34.85  Y=34.85
— d Line
------- g Line
---- C Line
— S
-- M
-0.2  0.2      -0.05  0.05     -0.2  0.2     -2 (%) 2
SPHERICAL     LATERAL         ASTIGMATISM   DISTORTION
ABERRATION    CHROMATIC
              ABERRATION
CHROMATIC
ABERRATION Fig.27A  Fig.27B  Fig.27C  Fig.27D
$F_{NO}=2.8$  Y=34.85  Y=34.85  Y=34.85
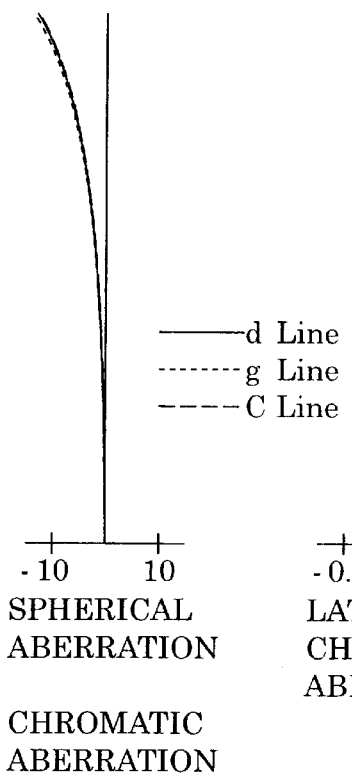
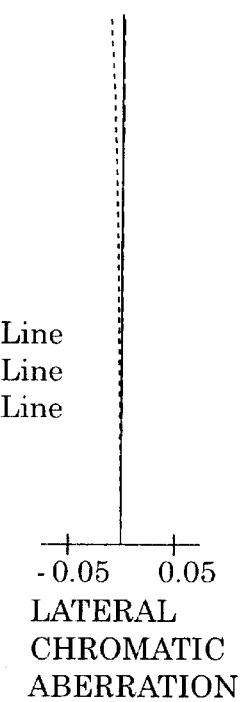
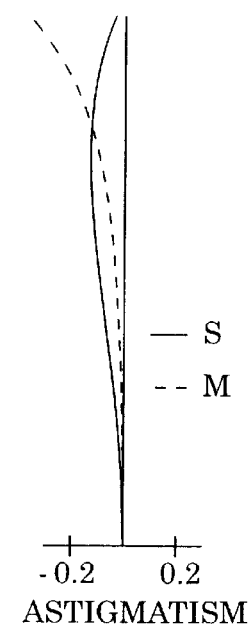
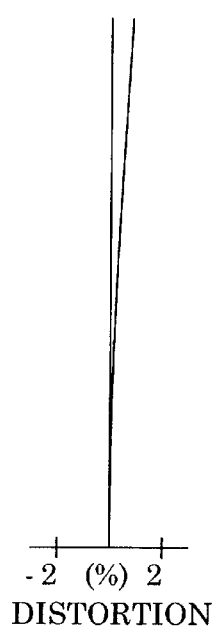
SPHERICAL  LATERAL  ASTIGMATISM  DISTORTION
ABERRATION  CHROMATIC
              ABERRATION
CHROMATIC
ABERRATION
Fig.28A
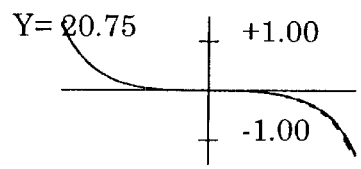
Fig.28B
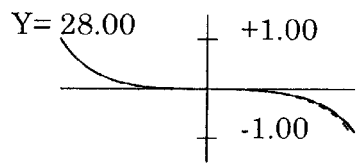
Fig.28C
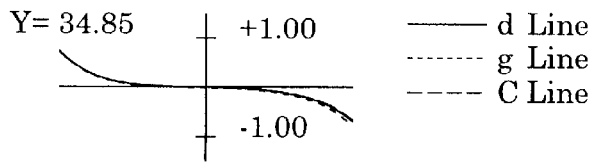

$F_{NO}=2.9$    Y=34.85    Y=34.85    Y=34.85

SPHERICAL ABERRATION
CHROMATIC ABERRATION

LATERAL CHROMATIC ABERRATION

ASTIGMATISM

DISTORTION

Fig. 37
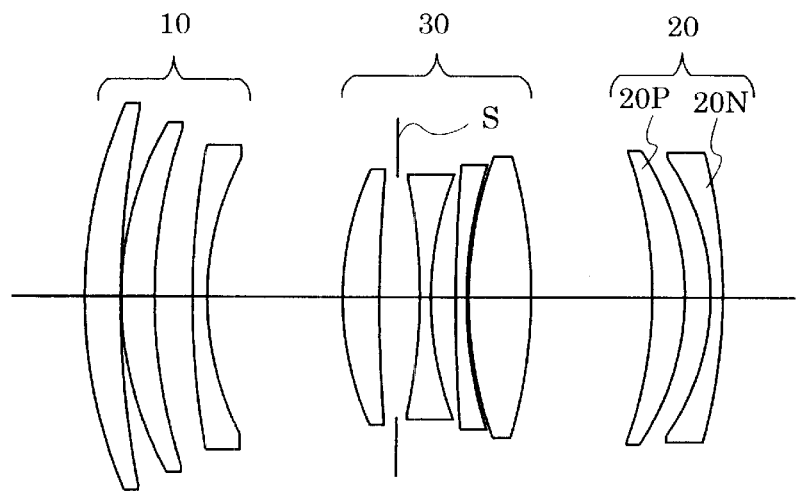
Fig. 38A   Fig. 38B   Fig. 38C   Fig. 38D
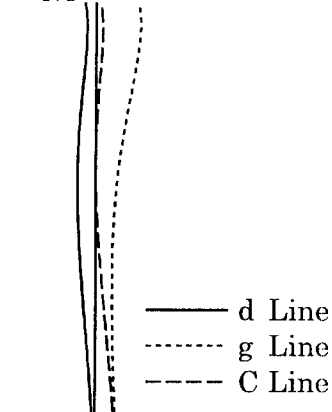
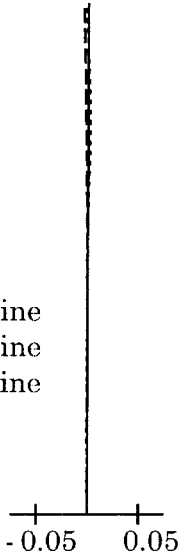
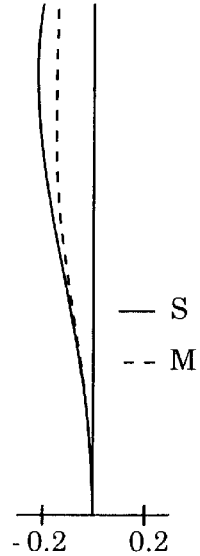
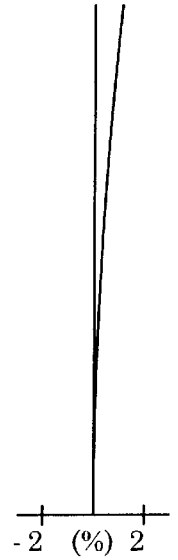
SPHERICAL ABERRATION CHROMATIC ABERRATION
LATERAL CHROMATIC ABERRATION
ASTIGMATISM
DISTORTION

SPHERICAL ABERRATION

CHROMATIC ABERRATION

LATERAL CHROMATIC ABERRATION

ASTIGMATISM

DISTORTION

Fig.41
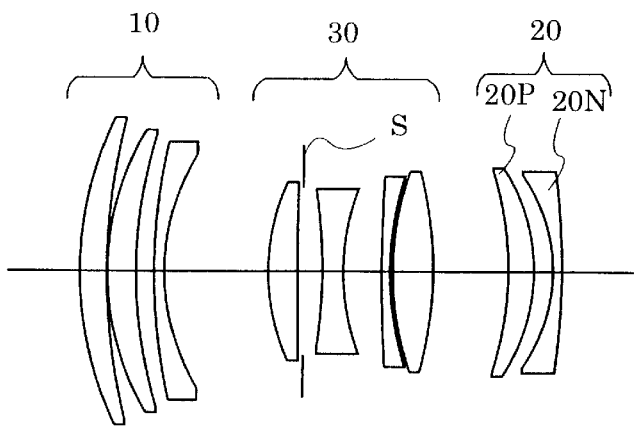
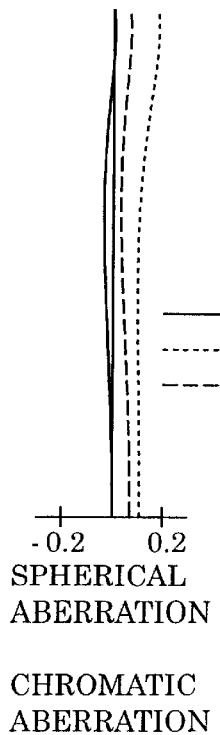
Fig.42A
$F_{NO}= 2.8$
—— d Line
······ g Line
- - - C Line
-0.2    0.2
SPHERICAL
ABERRATION
CHROMATIC
ABERRATION
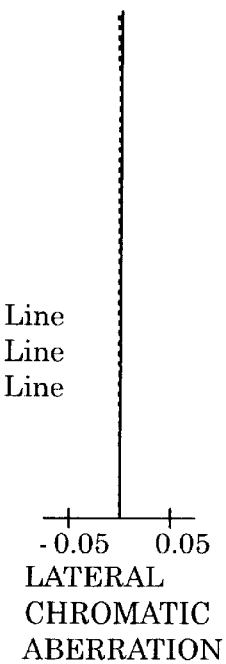
Fig.42B
Y= 21.64
-0.05   0.05
LATERAL
CHROMATIC
ABERRATION
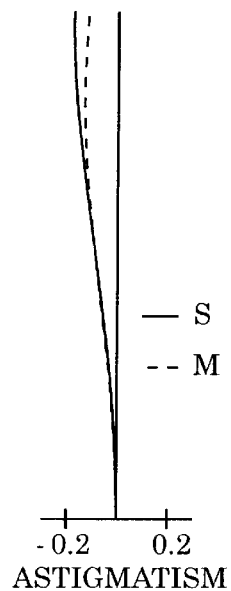
Fig.42C
Y= 21.64
—— S
- - M
-0.2    0.2
ASTIGMATISM
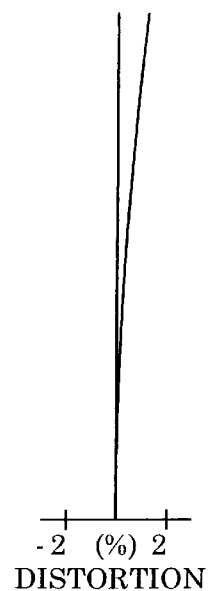
Fig.42D
Y= 21.64
-2  (%)  2
DISTORTION Fig.43A  Fig.43B  Fig.43C  Fig.43D
$F_{NO}=2.8$   Y= 21.64   Y= 21.64   Y= 21.64
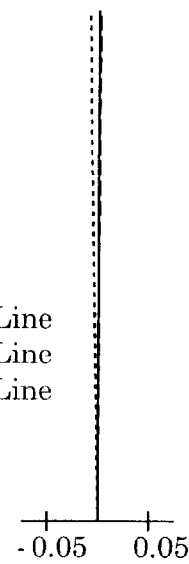
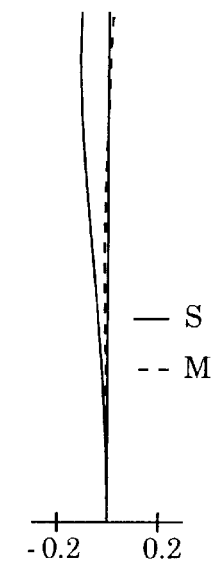
——— d Line
······· g Line
---- C Line
— S
-- M
SPHERICAL   LATERAL   ASTIGMATISM   DISTORTION
ABERRATION   CHROMATIC
            ABERRATION
CHROMATIC
ABERRATION
Fig.44A  Y= 0.00
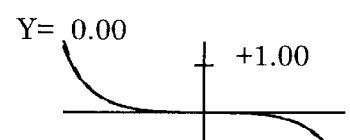
Fig.44B  Y= 12.00
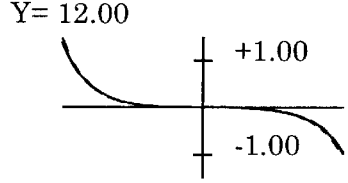
Fig.44C  Y= 18.00
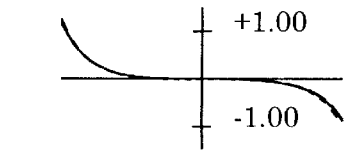
Fig.44D  Y= 21.64
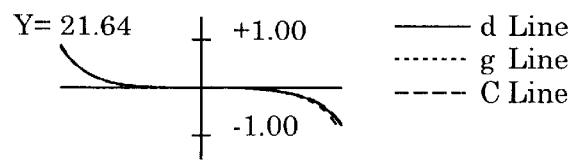
——— d Line
······· g Line
---- C Line $F_{NO}= 2.8$ — d Line
------- g Line
---- C Line

-0.2  0.2

SPHERICAL
ABERRATION

CHROMATIC
ABERRATION

Y= 21.64

-0.05  0.05

LATERAL
CHROMATIC
ABERRATION

Y= 21.64

— S
-- M

-0.2  0.2

ASTIGMATISM

Y= 21.64

-2  (%)  2

DISTORTION

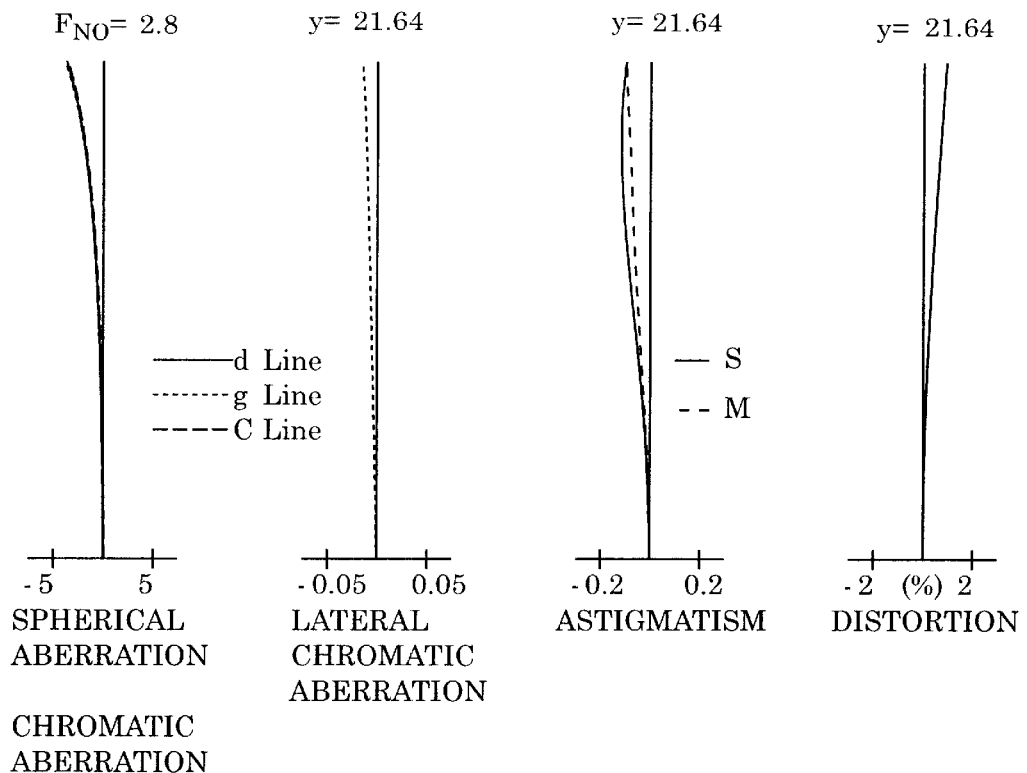
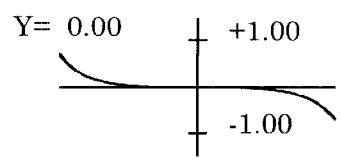
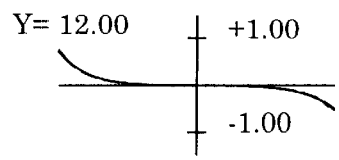
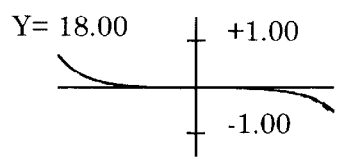
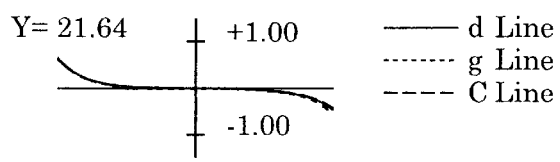

$F_{NO}= 2.8$

—— d Line
------- g Line
---- C Line

-0.2  0.2
SPHERICAL
ABERRATION
CHROMATIC
ABERRATION

Y=21.64

-0.05  0.05
LATERAL
CHROMATIC
ABERRATION

Y=21.64

—— S
-- M

-0.2  0.2
ASTIGMATISM

Y=21.64

-2  (%)  2
DISTORTION

Fig.51A
$F_{NO}=2.8$
Fig.51B
Y= 21.64
Fig.51C
Y= 21.64
Fig.51D
Y= 21.64
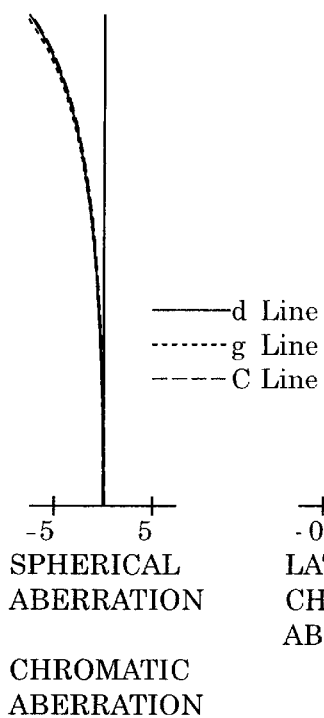
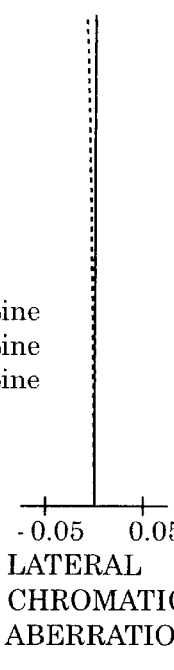
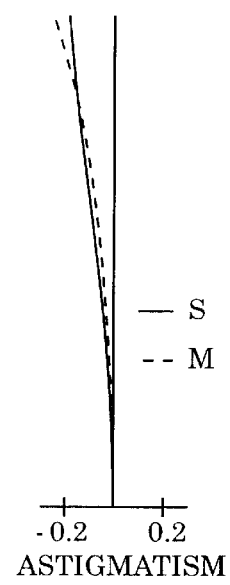
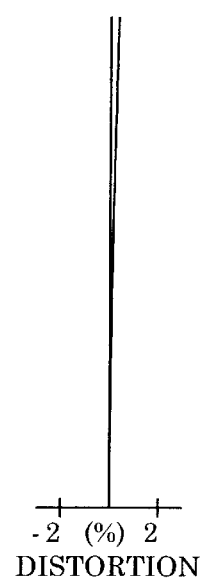
——— d Line
········ g Line
- - - - C Line
— S
-- M
-5  5
SPHERICAL
ABERRATION
CHROMATIC
ABERRATION
-0.05  0.05
LATERAL
CHROMATIC
ABERRATION
-0.2  0.2
ASTIGMATISM
-2 (%) 2
DISTORTION
Fig.52A
Y= 0.00
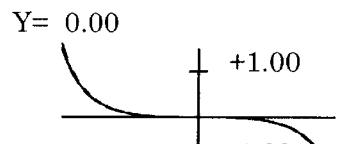
Fig.52B
Y= 12.00
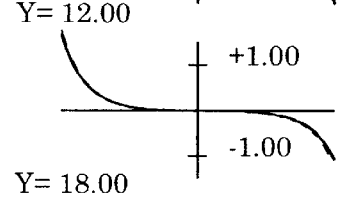
Fig.52C
Y= 18.00
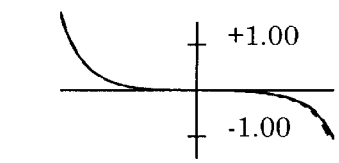
Fig.52D
Y= 21.64
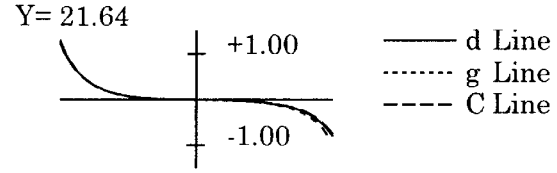
——— d Line
········ g Line
- - - - C Line

Fig.53
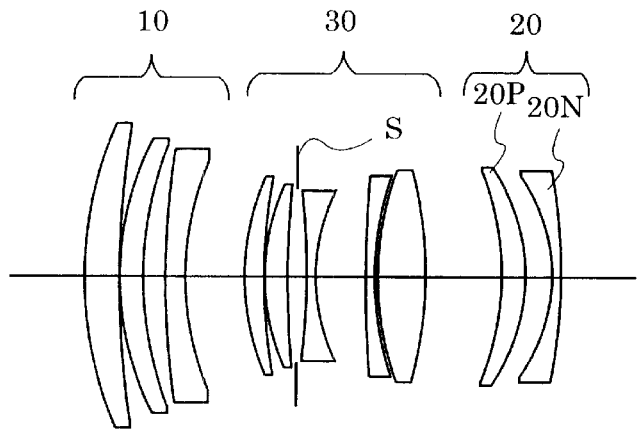
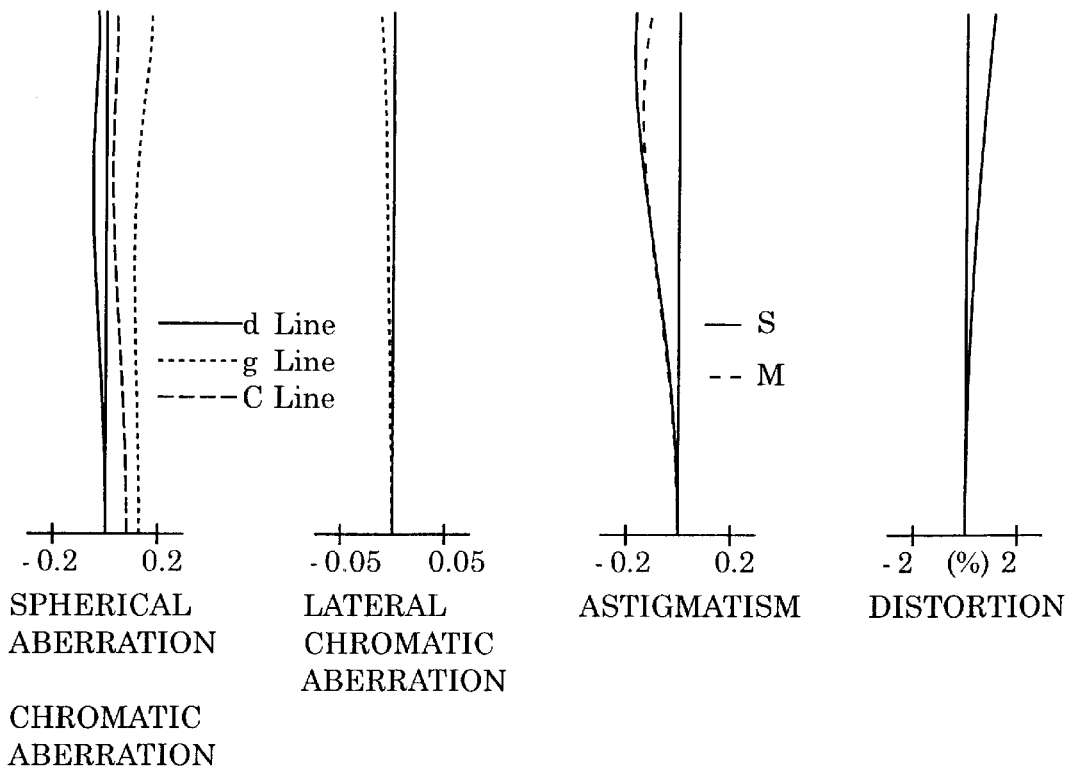
Fig.54A  Fig.54B  Fig.54C  Fig.54D
$F_{NO}= 2.8$   Y= 21.64   Y= 21.64   Y= 21.64
SPHERICAL ABERRATION
CHROMATIC ABERRATION
LATERAL CHROMATIC ABERRATION
ASTIGMATISM
DISTORTION Fig.55A
$F_{NO}= 2.8$
Fig.55B
Y= 21.64
Fig.55C
Y= 21.64
Fig.55D
Y=21.64
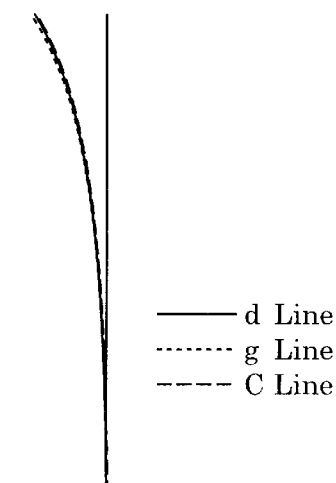
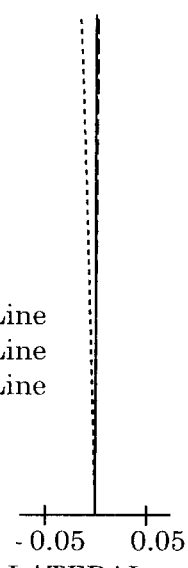
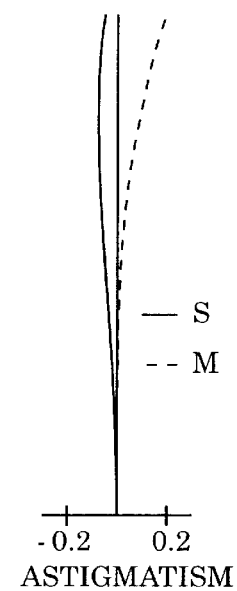
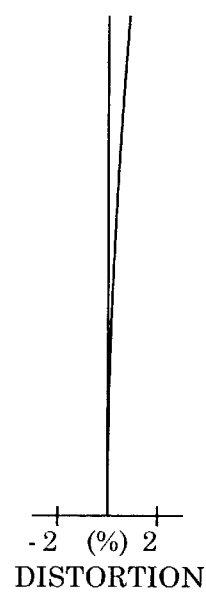
—— d Line
······ g Line
---- C Line
—— S
-- M
-5  5
SPHERICAL
ABERRATION
CHROMATIC
ABERRATION
-0.05  0.05
LATERAL
CHROMATIC
ABERRATION
-0.2  0.2
ASTIGMATISM
-2 (%) 2
DISTORTION
Fig.56A
Y= 0.00
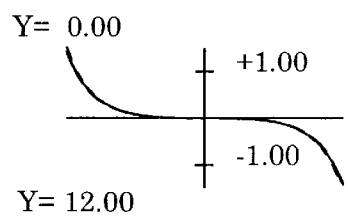
+1.00
-1.00
Fig.56B
Y= 12.00
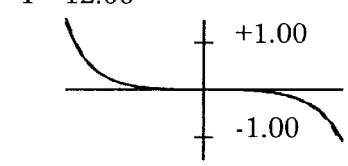
+1.00
-1.00
Fig.56C
Y= 18.00
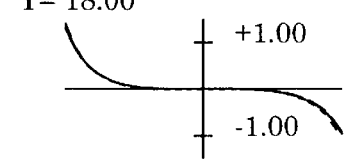
+1.00
-1.00
Fig.56D
Y= 21.64
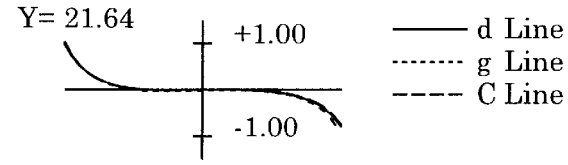
+1.00
-1.00
—— d Line
······ g Line
---- C Line

SPHERICAL ABERRATION

CHROMATIC ABERRATION

LATERAL CHROMATIC ABERRATION

ASTIGMATISM

DISTORTION

Fig.59A    Fig.59B    Fig.59C    Fig.59D
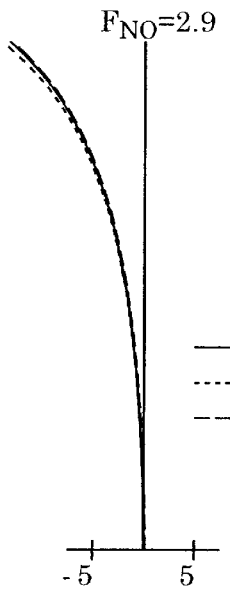
$F_{NO}=2.9$
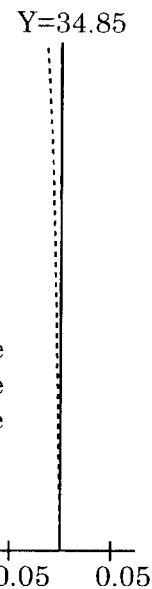
Y=34.85
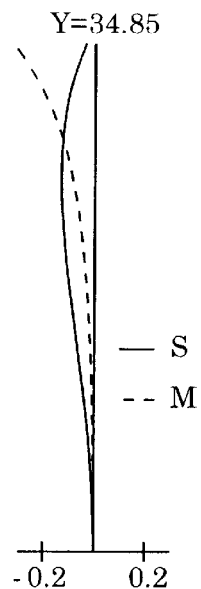
Y=34.85
Y=34.85
——— d Line
········· g Line
------ C Line
——— S
--- M
-5  5
SPHERICAL
ABERRATION
CHROMATIC
ABERRATION
-0.05  0.05
LATERAL
CHROMATIC
ABERRATION
-0.2  0.2
ASTIGMATISM
-2  (%)  2
DISTORTION
Fig.60A
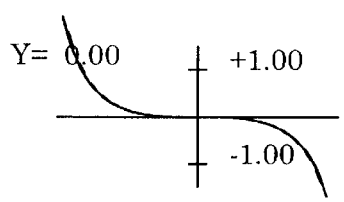
Y= 0.00    +1.00
           -1.00
Fig.60B
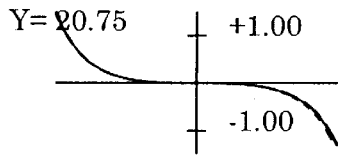
Y= 20.75   +1.00
           -1.00
Fig.60C
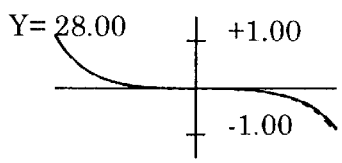
Y= 28.00   +1.00
           -1.00
Fig.60D
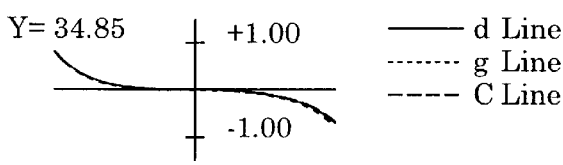
Y= 34.85   +1.00
           -1.00
——— d Line
········· g Line
------ C Line $F_{NO}=3.0$ — d Line
······ g Line
---- C Line

-0.2  0.2
SPHERICAL
ABERRATION

CHROMATIC
ABERRATION

Y=34.85

-0.05  0.05
LATERAL
CHROMATIC
ABERRATION

Y=34.85

— S
-- M

-2  2
ASTIGMATISM

Y=34.85

-2  (%)  2
DISTORTION $F_{NO}=2.9$

— d Line
······ g Line
---- C Line

-0.2  0.2
SPHERICAL
ABERRATION

CHROMATIC
ABERRATION

Y=21.64

-0.05  0.05
LATERAL
CHROMATIC
ABERRATION

Y=21.64

— S
-- M

-2  2
ASTIGMATISM

Y=21.64

-2  (%)  2
DISTORTION

Fig.62
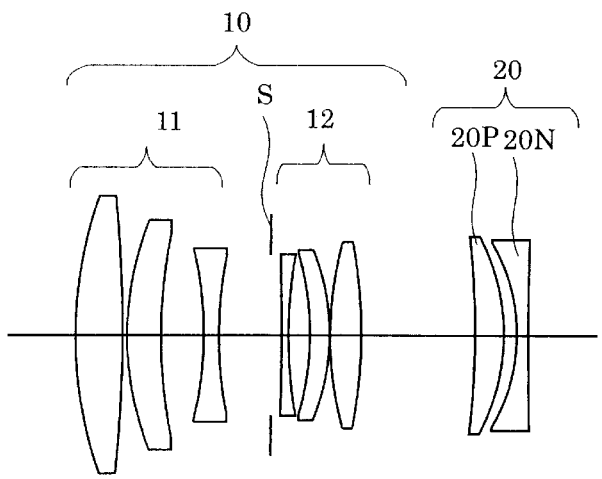
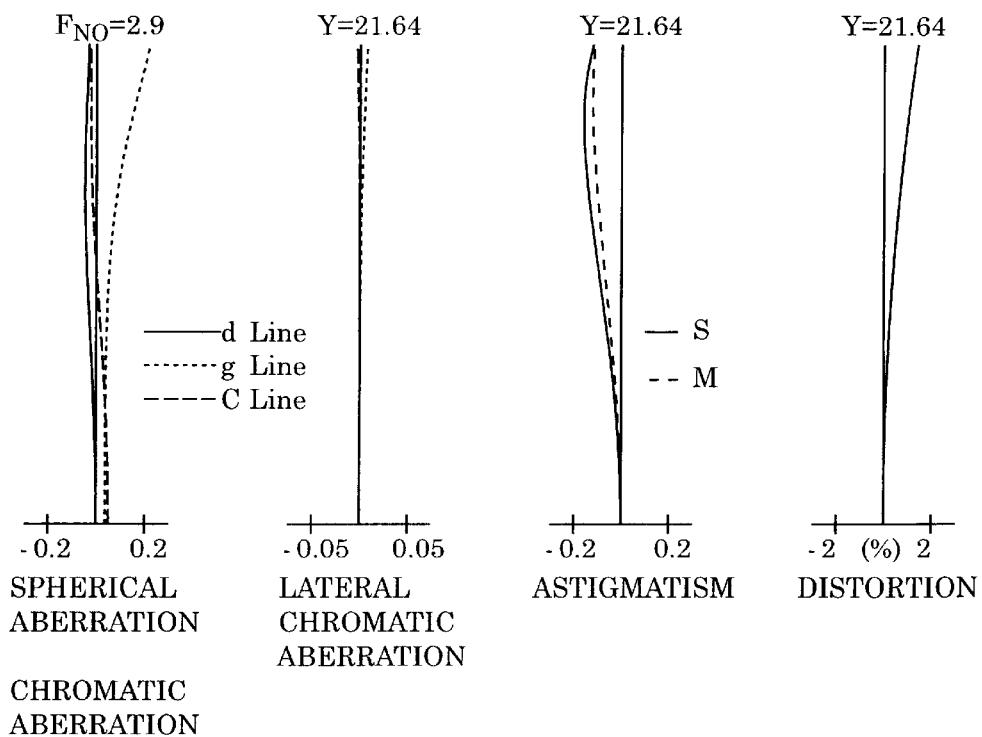
Fig.63A  Fig.63B  Fig.63C  Fig.63D
SPHERICAL ABERRATION
CHROMATIC ABERRATION
LATERAL CHROMATIC ABERRATION
ASTIGMATISM
DISTORTION SPHERICAL ABERRATION CHROMATIC ABERRATION  LATERAL CHROMATIC ABERRATION  ASTIGMATISM  DISTORTION

| Fig.68A | Fig.68B | Fig.68C | Fig.68D |
|---|---|---|---|
| $F_{NO}=2.9$ | Y=34.85 | Y=34.85 | Y=34.85 |
| SPHERICAL ABERRATION CHROMATIC ABERRATION | LATERAL CHROMATIC ABERRATION | ASTIGMATISM | DISTORTION |

$F_{NO}=2.9$

——— d Line
········ g Line
-  -  -  - C Line

-5    5
SPHERICAL
ABERRATION

CHROMATIC
ABERRATION

Y=34.85

-0.05   0.05
LATERAL
CHROMATIC
ABERRATION

Y=34.85

——— S
-  - M

-0.2   0.2
ASTIGMATISM

Y=34.85

-2  (%)  2
DISTORTION

Y= 0.00    +1.00

-1.00

Y= 20.75   +1.00

-1.00

Y= 28.00   +1.00

-1.00

Y= 34.85   +1.00        ——— d Line
                        ········ g Line
                  -1.00 -  -  - C Line

SPHERICAL ABERRATION  LATERAL CHROMATIC ABERRATION  ASTIGMATISM  DISTORTION

CHROMATIC ABERRATION

SPHERICAL ABERRATION  LATERAL CHROMATIC ABERRATION  ASTIGMATISM  DISTORTION

CHROMATIC ABERRATION

SPHERICAL ABERRATION

CHROMATIC ABERRATION

LATERAL CHROMATIC ABERRATION

ASTIGMATISM

DISTORTION $F_{NO}=2.9$
——— d Line
········ g Line
– – – C Line
-0.2    0.2
SPHERICAL
ABERRATION
CHROMATIC
ABERRATION

Y=21.64
-0.05   0.05
LATERAL
CHROMATIC
ABERRATION

Y=21.64
——— S
– – M
-0.2    0.2
ASTIGMATISM

Y=21.64
-2  (%)  2
DISTORTION

— d Line
······ g Line
– – – C Line

— S
– – M

-0.2  0.2
SPHERICAL
ABERRATION
CHROMATIC
ABERRATION

-0.05  0.05
LATERAL
CHROMATIC
ABERRATION

-2  2
ASTIGMATISM

-2  (%)  2
DISTORTION

— d Line
······ g Line
– – – C Line

— S
– – M

-0.2  0.2
SPHERICAL
ABERRATION
CHROMATIC
ABERRATION

-0.05  0.05
LATERAL
CHROMATIC
ABERRATION

-2  2
ASTIGMATISM

-2  (%)  2
DISTORTION

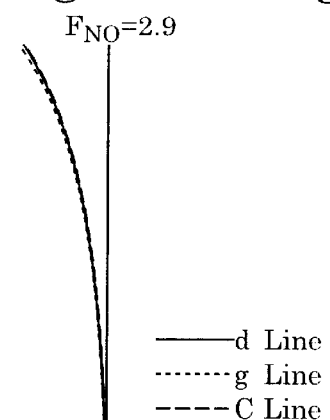
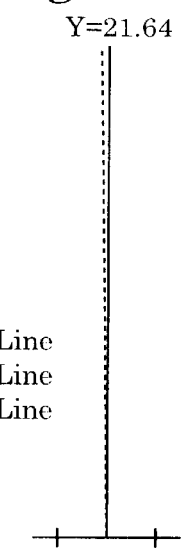
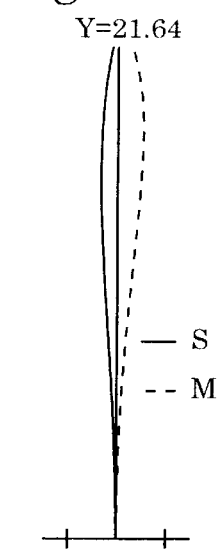
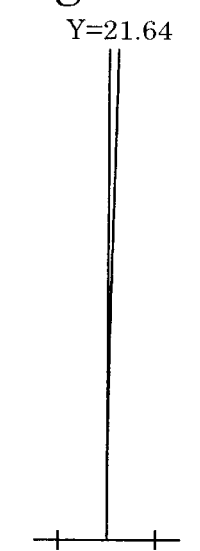
Fig.79A  Fig.79B  Fig.79C  Fig.79D
SPHERICAL ABERRATION
CHROMATIC ABERRATION
LATERAL CHROMATIC ABERRATION
ASTIGMATISM
DISTORTION
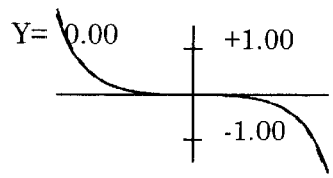
Fig.80A
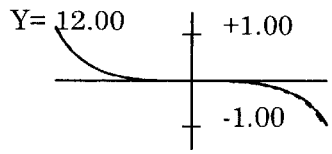
Fig.80B
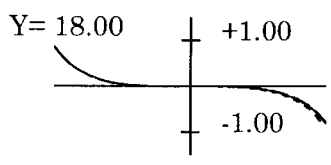
Fig.80C
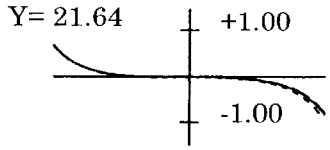
Fig.80D Fig.82
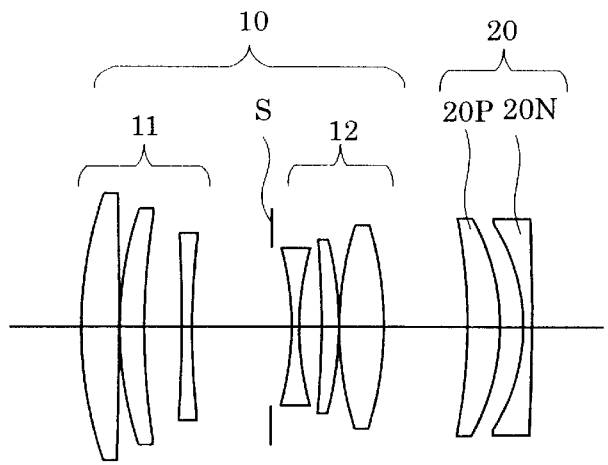
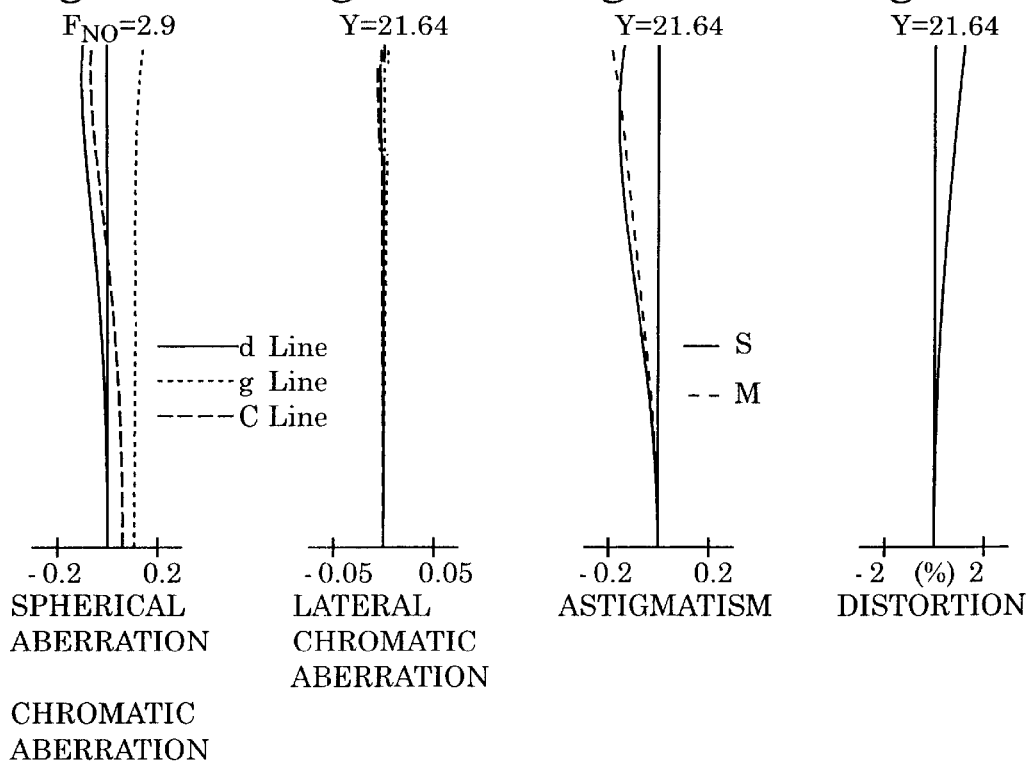
Fig.83A $F_{NO}=2.9$
SPHERICAL ABERRATION
CHROMATIC ABERRATION
— d Line
······ g Line
---- C Line
Fig.83B Y=21.64
LATERAL CHROMATIC ABERRATION
Fig.83C Y=21.64
ASTIGMATISM
— S
-- M
Fig.83D Y=21.64
DISTORTION Fig.84A  Fig.84B  Fig.84C  Fig.84D
$F_{NO}=2.9$  Y=21.64  Y=21.64  Y=21.64
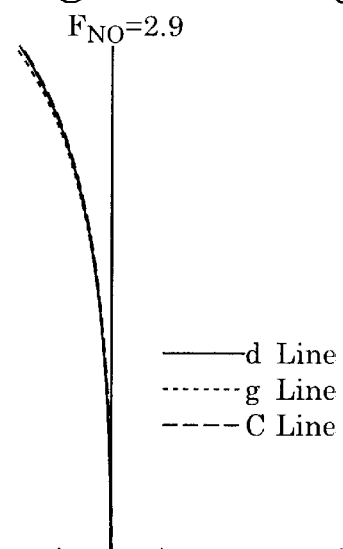
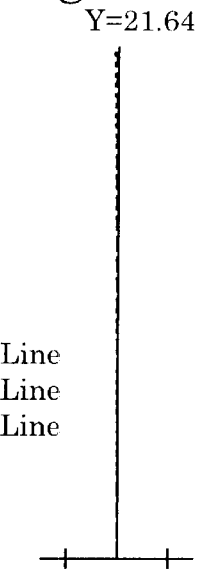
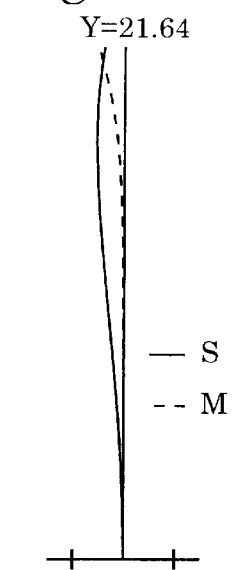
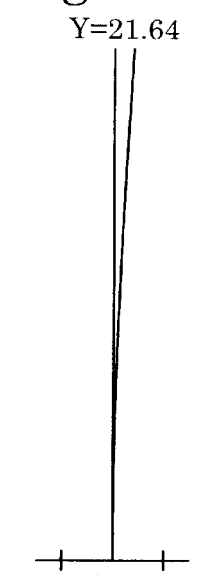
——— d Line
·······  g Line
- - - - C Line
——— S
- - M
SPHERICAL ABERRATION
CHROMATIC ABERRATION
LATERAL CHROMATIC ABERRATION
ASTIGMATISM
DISTORTION
Fig.85A  Y= 0.00
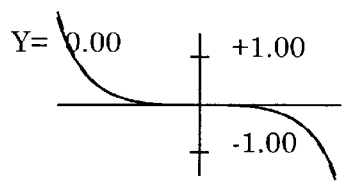
Fig.85B  Y= 12.00
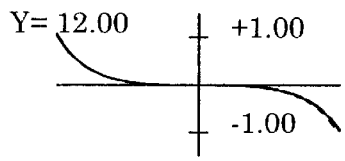
Fig.85C  Y= 18.00
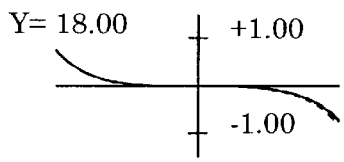
Fig.85D  Y= 21.64
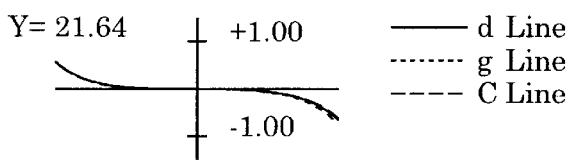
——— d Line
·······  g Line
- - - - C Line

Fig.87
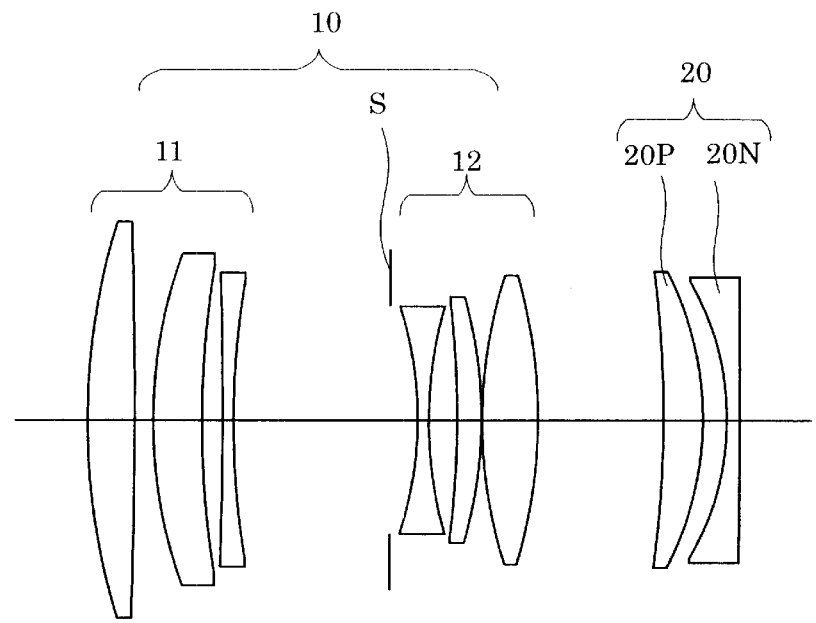
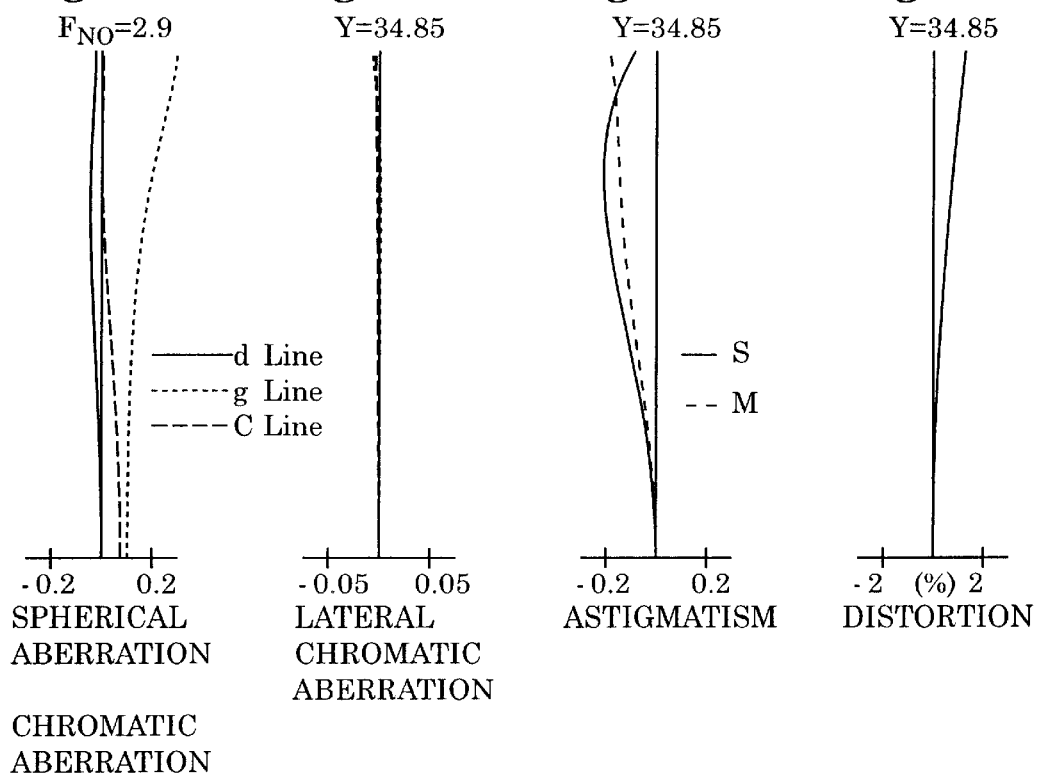
Fig.88A  Fig.88B  Fig.88C  Fig.88D
$F_{NO}=2.9$  Y=34.85  Y=34.85  Y=34.85
— d Line
---- g Line
---- C Line
— S
-- M
-0.2  0.2
SPHERICAL
ABERRATION
CHROMATIC
ABERRATION
-0.05  0.05
LATERAL
CHROMATIC
ABERRATION
-0.2  0.2
ASTIGMATISM
-2 (%) 2
DISTORTION

Fig.89A
$F_{NO}$=2.9
——— d Line
········· g Line
- - - - C Line
-5  5
SPHERICAL
ABERRATION
CHROMATIC
ABERRATION
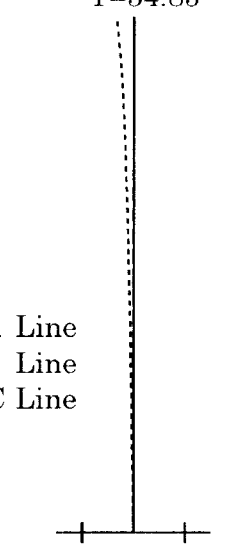
Fig.89B
Y=34.85
-0.05  0.05
LATERAL
CHROMATIC
ABERRATION
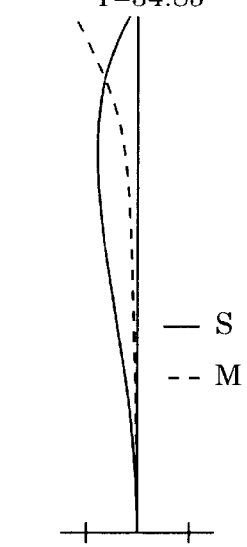
Fig.89C
Y=34.85
——— S
- - M
-0.2  0.2
ASTIGMATISM
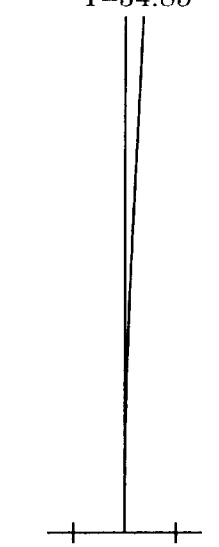
Fig.89D
Y=34.85
-2  (%)  2
DISTORTION
Fig.90A
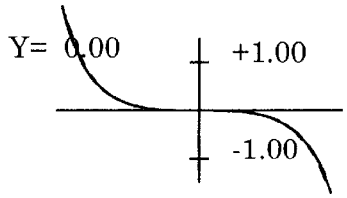
Y= 0.00
Fig.90B
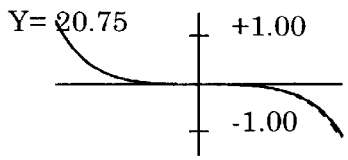
Y= 20.75
Fig.90C
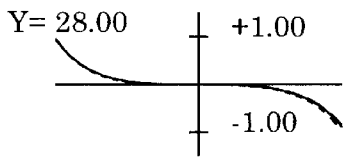
Y= 28.00
Fig.90D
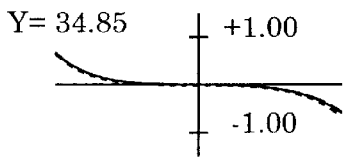
Y= 34.85
——— d Line
········· g Line
- - - - C Line $F_{NO}=3.1$ —— d Line
········ g Line
- - - C Line

-0.2   0.2
SPHERICAL
ABERRATION

CHROMATIC
ABERRATION

Y=34.85

-0.05   0.05
LATERAL
CHROMATIC
ABERRATION

Y=34.85

—— S
- - M

-5   5
ASTIGMATISM

Y=34.85

-2  (%)  2
DISTORTION

SOFT-FOCUS LENS SYSTEM

BACKGROUND OF THE INVENTION

1. Field of the Invention

The present invention relates to a soft-focus lens system, and in particular, relates thereto in which a soft-focus photographing mode can be switched to a normal photographing mode without soft-focus effects or vice versa, and which can be used in a single lens reflex (SLR) camera.

2. Description of the Prior Art

A soft-focus lens system of the above type has been disclosed in, e.g., Japanese Unexamined Patent Publication (hereinafter, JUPP) No. 8-86957. In the lens system of this publication, when the normal photographing mode is switched to the soft-focus photographing mode or vice versa, the focal point and the focal length are inevitably varied. If this occurs before and after the switching of the photographing modes, a focusing operation has to be done again. Furthermore, if an attempt is made to automatically correct the varied focal point and focal length by a predetermined mechanism, the structure of the lens system has to become complicated.

Still further, in a lens system which has been disclosed in, e.g., JUPP No. 8-248310, the change of the focal length caused by the switching of the above photographing modes is cancelled by moving another lens system. However, such an arrangement is a type of a zoom mechanism, which also makes the structure of the lens system complicated.

In the above conventional soft-focus lens systems, focusing is performed by advancing the most object-side lens group, or by advancing the entire lens system. As a result, the overall length of the lens system becomes longer. Moreover, the weight of a lens group(s) to perform focusing is heavy, so that it is difficult for a user to easily handle and carry the camera with him/her. Furthermore, it is not suitable to incorporate an automatic focusing (AF) function into such a lens system.

In addition to the above, it has been known that a soft-focus lens system, which (i) can form a clear image in the normal photographing mode, and (ii) can generate uniform flare from the center of the image filed to the periphery thereof in the soft-focus photographing mode, has utilized spherical aberration occurred in lens elements. However, there are requirements that options on the effects of soft-focusing, in addition to the effects of soft-focusing obtained by spherical aberration, be increased in order to widen photographic expressions.

SUMMARY OF THE INVENTION

The present invention is to provide a soft-focus lens system which (i) can maintain the focal point and the focal length before and after the switching of the soft-focus photographing mode to a normal photographing mode or vice versa, and which (ii) can dispense with a complicated movement of the lens groups, (iii) can avoid increasing the weight of a lens group(s) to perform focusing, and (iv) can increase options on the effects of soft-focusing in order to widen photographic expressions by utilizing not only spherical aberration but also filed curvature.

As a first aspect of the present invention, there is provided a soft-focus lens system including a positive master lens group (hereinafter, master lens group) and a negative soft-focus lens group (hereinafter soft-focus lens group). The soft-focus lens group includes at least two moveable sub lens groups, i.e., a positive sub lens group and a negative sub lens group, which are independently moveable with respect to the master lens group. The positive sub lens group and the negative sub lens group are moved to set the normal photographing mode or the soft-focus photographing mode in which larger spherical aberration is occurred than in the normal photographing mode. Furthermore, each of the sub lens groups is arranged to move with respect to the master lens group and the other of the sub lens groups so that the focal point and the focal length are not substantially varied before and after the switching of the soft-focus photographing mode to the normal photographing mode or vice versa.

Due to the following reasons, the soft-focus lens group has negative power:

(1) the normal photographing mode is switched to the soft-focus photographing mode or vice versa by changing the distance between the positive sub lens group and the negative sub lens group;

(2) under this arrangement, if the soft-focus lens group has positive power, the changes of the focal point and the focal length are corrected by moving the positive soft-focus lens group toward the image by a predetermined distance;

(3) however, moving the positive soft-focus lens group by a predetermined distance toward the image makes the diameter of a bundle of light rays passing therethrough smaller, thereby spherical aberration becomes smaller;

(4) in other words, such a decrease of spherical aberration is equivalent to canceling the effects of soft-focusing;

(5) on the other hand, if an attempt is made to further increase the positive power of the positive soft-focus lens group so that the change of the focal point due to the effects of soft-focusing is corrected by moving the positive soft-focus lens group by a distance shorter than the above predetermined distance, the positive power of the master lens group becomes weaker; and (6) as a result, the second principal point moves toward the image, so that the overall length of the lens system becomes longer.

Since there is freedom on the positional relation between the master lens group and the soft-focus lens group, the arrangement thereof in the first aspect of the present invention can be made as follows:

(a) the master lens group and the soft-focus lens group are arranged in this order from the object;

(b) a diaphragm is provided in the master lens group; and (c) the soft-focus lens group includes the positive sub lens group and the negative sub lens group, in this order from the object, which are constituted by a positive single lens element and a negative single lens element so that an air lens, having a shape of a meniscus lens element with the concave surface facing toward the diaphragm, is formed between the positive single lens element and the negative single lens element.

According to a second aspect of the present invention, a positive lens group to exclusively perform focusing (hereinafter, focusing lens group) to obtain an in-focus state of the object is provided between the master lens group and the soft-focus lens group. In other words, the soft-focus lens system according to the second aspect of the present invention includes the master lens group, the positive focusing lens group (hereinafter, focusing lens group) and the soft-focus lens group, in this order from the object. The arrangement of the soft-focus lens group and the function thereof are the same as the first aspect of the present invention. Each of the sub lens groups of the soft-focus lens group is arranged to move with respect to the master lens group, the focusing lens group and the other of the sub lens groups so that the focal point and the focal length are not substantially varied before and after the switching of the soft-focus photographing mode to the normal photographing mode or vice versa. In the second aspect of the present invention, the master lens group is made constantly immoveable, and the focusing lens group exclusively functions as a lens group to perform focusing to obtain an in-focus state of the object regardless of the positions of the sub lens groups of the soft-focus lens group.

It is practical to provide the diaphragm in the focusing lens group. Similar to the first aspect of the present invention, the positive sub lens group and the negative sub lens group of the soft-focus lens group are constituted by a positive single lens element and a negative single lens element so that an air lens, having a shape of a meniscus lens element with the concave surface facing toward the diaphragm, is formed between these positive and negative lens elements.

Here, a third aspect of the present invention will be discussed. The third aspect of the present invention is devised based on the requirements that the effects of soft-focusing be more beautifully refined. The soft-focus lens system of the third aspect of the present invention includes the master lens group and the soft-focus lens group. The master lens group is constituted by two sub lens groups F1 and F2, and the diaphragm is provided therebetween. Specifically, at least one of the sub lens groups F1 and F2 of the master lens group is made moveable along the optical axis in order to set the normal photographing mode or the soft-focus photographing mode in which larger field curvature is occurred than in the normal photographing mode. On the other hand, similar to the first and second aspects of the present invention, the soft-focus lens group includes at least two moveable sub lens groups, i.e., the positive sub lens group and the negative sub lens group, which are independently moveable with respect to the master lens group and the other of the sub lens groups. The positive sub lens group and the negative sub lens group are moved to set the normal photographing mode or the soft-focusing photographing mode in which larger spherical aberration is occurred than in the normal photographing mode.

In other words, according to the third aspect of the present invention, since the effects of soft-focusing can be attained by utilizing both field curvature and spherical aberration, or either one of field curvature and spherical aberration, the master lens group can therefore be defined as a field-curvature varying lens group, and the soft-focus lens group can be defined as a spherical-aberration varying lens group.

Due to the following reasons, the master lens group is constituted by the diaphragm and the two sub lens groups, at least one of which is made moveable along the optical axis:

(1) the amount of field curvature is determined by the position of the diaphragm, and the positions of the sub lens groups (lens surfaces) before and behind the diaphragm;

(2) usually, the positions of the diaphragm and the sub lens groups are relatively determined so that field curvature can be reduced;

(3) on the other hand, the above means that these positions are relatively determined so that field curvature can be increased, upon necessity; and (4) according to the third aspect of the present invention, the amount of field curvature can be varied by making at least one of the sub lens group provided before and behind the diaphragm moveable along the optical axis.

In addition to the above, the entire master lens group is required to have positive power, on the other hand, either one of the sub lens groups may have positive or negative power.

The soft-focus lens group according to the first and third aspects of the present invention satisfy the following conditions:

$$0.05 < d0/f < 0.50 \quad (1)$$

$$-4.0 < fB0/f < -0.5 \quad (2)$$

wherein d0 designates the distance between the master lens group and the soft-focus lens group along the optical axis in the normal photographing mode;

fB0 designates the focal length of the soft-focus lens group in the normal photographing mode; and f designates the focal length of the entire lens system in the normal photographing mode.

The soft-focus lens group according to the second aspect of the present invention satisfies the following conditions:

$$0.05 < d0'/f' < 0.50 \quad (1')$$

$$-4.0 < fB0'/f' < -0.5 \quad (2')$$

wherein d0' designates the distance between the focusing lens group and the soft-focus lens group along the optical axis in the normal photographing mode;

fB0' designates the focal length of the soft-focus lens group in the normal photographing mode; and f' designates the focal length of the entire lens system in the normal photographing mode.

The soft-focus lens group according to the second aspect of the present invention satisfies the following conditions:

$$0.5 < f3/f' < 1.5 \quad (3)$$

$$0.1 < rR1/f' < 2.0 \quad (4)$$

wherein f3 designates the focal length of the focusing lens group; and rR1 designates the radius of curvature of the most object-side surface of the focusing lens group.

In the third aspect of the present invention, the master lens group (field-curvature varying lens group) is required to have positive power, on the other hand, either one of the sub lens groups F1 and F2 may have positive or negative power. However, it is preferable that the sub lens group F2 behind the diaphragm have positive power, and that the diaphragm move together with the sub lens group F2 when the normal photographing mode is switched to the soft-focus photographing mode in which field curvature largely occurs than in the normal photographing mode, or vice versa. Furthermore, the sub lens group F1 before the diaphragm preferably satisfies the following condition:

$$|f/fF1| < 1.0 \quad (5)$$

wherein fF1 designates the focal length of the sub lens group F1 of the master lens group (field-curvature varying lens group).

On the other hand, in order to change the normal photographing mode to the soft-focus photographing mode, or vice versa, the sub lens group F2 can be made immoveable, and only the sub lens group F1 can be made moveable.

The soft-focus lens system according to the third aspect of the present invention satisfies the following conditions:

$$-4.0 < f/rA < 1.0 \quad (6)$$

$$0.05 < dF12/f < 0.50 \quad (7)$$

wherein rA designates the radius of curvature of the object-side surface of the most-image side lens element in the sub lens group F1 of the master lens group (field-curvature varying lens group); and dF12 designates the distance between the sub lens groups F1 and F2 in the normal photographing mode.

In the soft-focus lens system of the first and third aspects of the present invention, focusing is preferably performed by advancing the entire lens system, or by advancing the master lens group only, i.e., the front lens-group advancing type. Specifically, in the case of the front lens-group advancing type, the focusing portion and the soft-focus portion can be made completely independent, so that the structure of a mechanism for the lens system can be made simpler. In a lens system of the front lens-group advancing type, since the soft-focus lens group is generally provided behind the diaphragm, such an arrangement is advantageous for the correcting of aberrations.

On the other hand, according to the second aspect of the present invention, since the master lens group is constantly made immoveable, the soft-focus lens system is an inner-focusing type lens system in which the focusing lens group is moveable, between the master lens group and the soft-focus lens group, for performing focusing. Due to this arrangement, the focusing portion and the soft-focus portion can be made completely independent, so that the structure of a mechanism for the lens system can be made simpler. Still further, a lens group to perform focusing, i.e., the focusing lens group, is not heavy, so that such an arrangement is suitable for incorporating an automatic focusing (AF) function into the lens system, and is easy to be handled due to the nature of the inner-focusing type lens system, i.e., the overall length thereof is unchanged.

The present disclosure relates to subject matters contained in Japanese Patent Applications No. 2001-125301 (filed on Apr. 24, 2001), No. 2001-125302 (filed on Apr. 24, 2001) and No. 2001-216409 (filed on Jul. 17, 2001), which are expressly incorporated herein in their entirety.

BRIEF DESCRIPTION OF THE DRAWINGS

The present invention will be discussed below in detail with reference to the accompanying drawings, in which:

FIGS. 7A, 7B, 7C and 7D show aberrations occurred when the lens arrangement of the soft-focus lens system of FIG. 5 is switched to the soft-focus photographing mode, while an object at infinity is in an in-focus state;

FIGS. 8A, 8B and 8C show coma occurred when the lens arrangement of the soft-focus lens system of FIG. 5 is switched to the soft-focus photographing mode, while an object at infinity is in an in-focus state;

FIG. 9 shows the lens arrangement of a soft-focus lens system according to a third embodiment in the normal photographing mode, when an object at infinity is in an in-focus state;

FIGS. 10A, 10B, 10C and 10D show aberrations occurred in the soft-focus lens system of FIG. 9;

FIGS. 11A, 11B, 11C and 11D show aberrations occurred when the lens arrangement of the soft-focus lens system of FIG. 9 is switched to the soft-focus photographing mode, while an object at infinity is in an in-focus state;

FIG. 13 shows the lens arrangement of a soft-focus lens system according to a fourth embodiment in the normal photographing mode, when an object at infinity is in an in-focus state;

FIGS. 14A, 14B, 14C and 14D show aberrations occurred in the soft-focus lens system of FIG. 13;

FIGS. 15A, 15B, 15C and 15D show aberrations occurred when the lens arrangement of the soft-focus lens system of FIG. 13 is switched to the soft-focus photographing mode, while an object at infinity is in an n-focus state;

FIGS. 16A, 16B and 16C show coma occurred when the lens arrangement of the soft-focus lens system of FIG. 13 is switched to the soft-focus photographing mode, while an object at infinity is in an in-focus state;

FIGS. 19A, 19B, 19C and 19D show aberrations occurred when the lens arrangement of the soft-focus lens system of FIG. 17 is switched to the soft-focus photographing mode, while an object at infinity is in an in-focus state;

FIGS. 20A, 20B and 20C show coma occurred when the lens arrangement of the soft-focus lens system of FIG. 17 is switched to the soft-focus photographing mode, while an object at infinity is in an in-focus state;

FIG. 21 shows the lens arrangement of a soft-focus lens system according to a sixth embodiment in the normal photographing mode, when an object at infinity is in an in-focus state;

FIGS. 22A, 22B, 22C and 22D show aberrations occurred in the soft-focus lens system of FIG. 21;

FIGS. 23A, 23B, 23C and 23D show aberrations occurred when the lens arrangement of the soft-focus lens system of FIG. 21 is switched to the soft-focus photographing mode, while an object at infinity is in an in-focus state;

FIGS. 24A, 24B and 24C show coma occurred when the lens arrangement of the soft-focus lens system of FIG. 21 is switched to the soft-focus photographing mode, while an object at infinity is in an in-focus state;

FIG. 25 shows the lens arrangement of a soft-focus lens system according to a seventh embodiment in the normal photographing mode, when an object at infinity is in an in-focus state;

FIGS. 26A, 26B, 26C and 26D show aberrations occurred in the soft-focus lens system of FIG. 25;

FIGS. 27A, 27B, 27C and 27D show aberrations occurred when the lens arrangement of the soft-focus lens system of FIG. 25 is switched to the soft-focus photographing mode, while an object at infinity is in an in-focus state;

FIGS. 28A, 28B and 28C show coma occurred when the lens arrangement of the soft-focus lens system of FIG. 25 is switched to the soft-focus photographing mode, while an object at infinity is in an in-focus state;

FIG. 37 shows the lens arrangement of a soft-focus lens system according to a tenth embodiment in the normal photographing mode, when an object at infinity is in an in-focus state;

FIGS. 38A, 38B, 38C and 38D show aberrations occurred in the soft-focus lens system of FIG. 37;

FIG. 41 shows the lens arrangement of a soft-focus lens system according to an eleventh embodiment in the normal photographing mode, when an object at infinity is in an in-focus state;

FIGS. 42A, 42B, 42C and 42D show aberrations occurred in the soft-focus lens system of FIG. 41;

FIGS. 43A, 43B, 43C and 43D show aberrations occurred when the lens arrangement of the soft-focus lens system of FIG. 41 is switched to the soft-focus photographing mode, while an object at infinity is in an in-focus state;

FIGS. 44A, 44B, 44C and 44D show coma occurred when the lens arrangement of the soft-focus lens system of FIG. 41 is switched to the soft-focus photographing mode, while an object at infinity is in an in-focus state;

FIGS. 47A, 47B, 47C and 47D show aberrations occurred when the lens arrangement of the soft-focus lens system of FIG. 45 is switched to the soft-focus photographing mode, while an object at infinity is in an in-focus state;

FIGS. 48A, 48B, 48C and 48D show coma occurred when the lens arrangement of the soft-focus lens system of FIG. 45 is switched to the soft-focus photographing mode, while an object at infinity is in an in-focus state;

FIGS. 51A, 51B, 51C and 51D show aberrations occurred when the lens arrangement of the soft-focus lens system of FIG. 49 is switched to the soft-focus photographing mode, while an object at infinity is in an in-focus state;

FIGS. 52A, 52B, 52C and 52D show coma occurred when the lens arrangement of the soft-focus lens system of FIG. 49 is switched to the soft-focus photographing mode, while an object at infinity is in an in-focus state;

FIG. 53 shows the lens arrangement of a soft-focus lens system according to a fourteenth embodiment in the normal photographing mode, when an object at infinity is in an in-focus state;

FIGS. 54A, 54B, 54C and 54D show aberrations occurred in the soft-focus lens system of FIG. 53;

FIGS. 55A, 55B, 55C and 55D show aberrations occurred when the lens arrangement of the soft-focus lens system of FIG. 53 is switched to the soft-focus photographing mode, while an object at infinity is in an in-focus state;

FIGS. 56A, 56B, 56C and 56D show coma occurred when the lens arrangement of the soft-focus lens system of FIG. 53 is switched to the soft-focus photographing mode, while an object at infinity is in an in-focus state;

FIGS. 59A, 59B, 59C and 59D show aberrations occurred, when the lens arrangement of the soft-focus lens group (spherical-aberration varying lens group) in FIG. 57 is switched to the soft-focus photographing mode, while an object at infinity is in an in-focus state;

FIGS. 60A, 60B, 60C and 60D show coma occurred when the lens arrangement of the soft-focus lens group (spherical-aberration varying lens group) in FIG. 57 is switched to the soft-focus photographing mode, while an object at infinity is in an in-focus state;

FIG. 62 shows the lens arrangement of a soft-focus lens system according to a sixteenth embodiment in the normal photographing mode, when an object at infinity is in an in-focus state;

FIGS. 63A, 63B, 63C and 63D show aberrations occurred in the soft-focus lens system of FIG. 62;

FIGS. 79A, 79B, 79C and 79D show aberrations occurred when the lens arrangement of the soft-focus lens group (spherical-aberration varying lens group) in FIG. 77 is switched to the soft-focus photographing mode, while an object at infinity is in an in-focus state;

FIGS. 80A, 80B, 80C and 80D show coma occurred when the lens arrangement of the soft-focus lens group (spherical-aberration varying lens group) in FIG. 77 is switched to the soft-focus photographing mode, while an object at infinity is in an in-focus state;

FIGS. 81A, 81B, 81C and 81D show aberrations when the lens arrangement of the master lens group (field-curvature varying lens group) in FIG. 77 is switched to the soft-focus photographing mode, while an object at infinity is in an in-focus state;

FIG. 82 shows the lens arrangement of a soft-focus lens system according to a twentieth embodiment in the normal photographing mode, when an object at infinity is in an in-focus state;

FIGS. 83A, 83B, 83C and 83D show aberrations occurred in the soft-focus lens system of FIG. 82;

FIGS. 84A, 84B, 84C and 84D show aberrations when the lens arrangement of the soft-focus lens group (spherical-aberration varying lens group) in FIG. 82 is switched to the soft-focus photographing mode, while an object at infinity is in an in-focus state;

FIGS. 85A, 85B, 85C and 85D show coma occurred when the soft-focus lens group (spherical-aberration varying lens group) in FIG. 82 is switched to the soft-focus photographing mode, while an object at infinity is in an in-focus state;

FIGS. 86A, 86B, 86C and 86D show aberrations occurred when the lens arrangement of the master lens group (field-curvature varying lens group) in FIG. 82 is switched to the soft-focus photographing mode, while an object at infinity is in an in-focus state;

FIG. 87 shows the lens arrangement of a soft-focus lens system according to a twenty-first embodiment in the normal photographing mode, when an object at infinity is in an in-focus state;

FIGS. 88A, 88B, 88C and 88D show aberrations occurred in the soft-focus lens system of FIG. 87;

FIGS. 89A, 89B, 89C and 89D show aberrations when the lens arrangement of the soft-focus lens group (spherical-aberration varying lens group) in FIG. 87 is switched to the soft-focus photographing mode, while an object at infinity is in an in-focus state;

FIGS. 90A, 90B, 90C and 90D show coma occurred when the soft-focus lens group (spherical-aberration varying lens group) in FIG. 87 is switched to the soft-focus photographing mode, while an object at infinity is in an in-focus state;

DESCRIPTION OF THE PREFERRED EMBODIMENTS

FIGS. 1 through 36C show the first through ninth embodiments of the soft-focus lens system.

Figure 1:
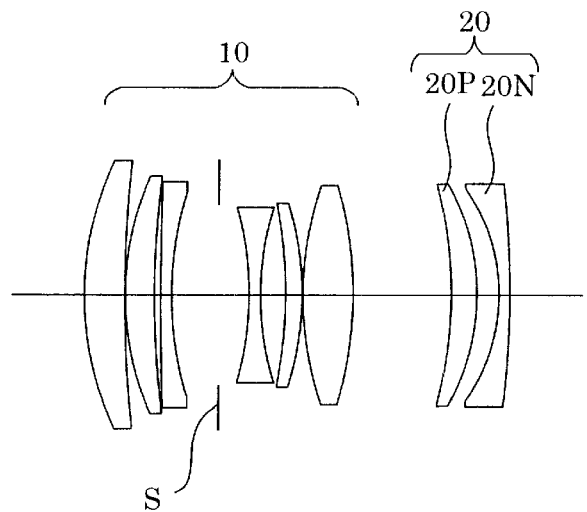
FIG. 1 shows the lens arrangement of a soft-focus lens system according to a first embodiment in the normal photographing mode, when an object at infinity is in an in-focus state.
Figure 2A:
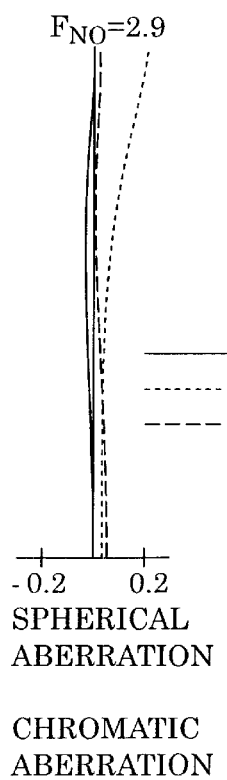
FIGS. 2A, 2B, 2C and 2D show aberrations occurred in the soft-focus lens system of FIG. 1.
Figure 2B:
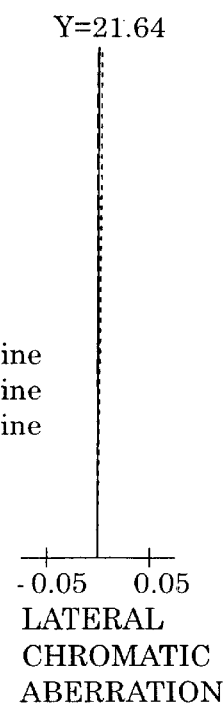
Figure 2C:
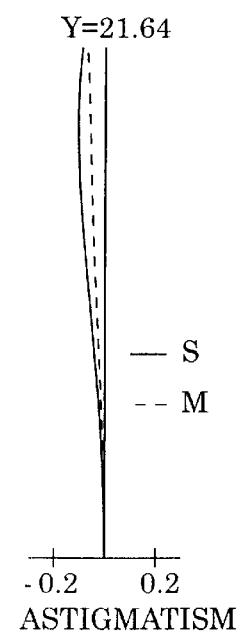
Figure 2D:
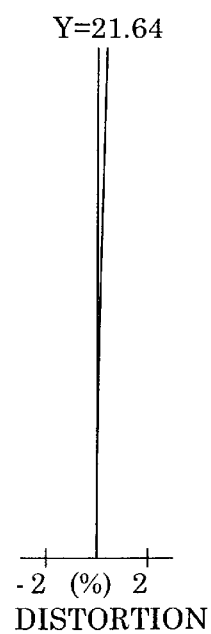
Figure 3A:
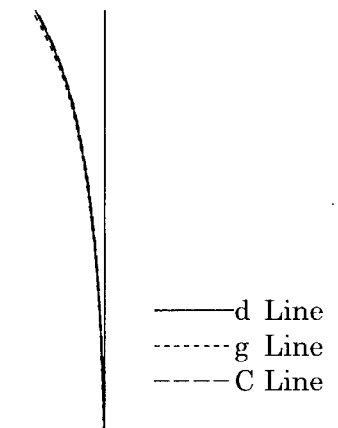
FIGS. 3A, 3B, 3C and 3D show aberrations occurred when the lens arrangement of the soft-focus lens system of FIG. 1 is switched to the soft-focus photographing mode, while an object at infinity is in an in-focus state.
Figure 3B:
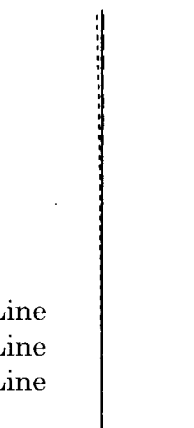
Figure 3C:
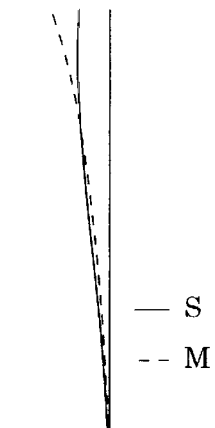
Figure 3D:
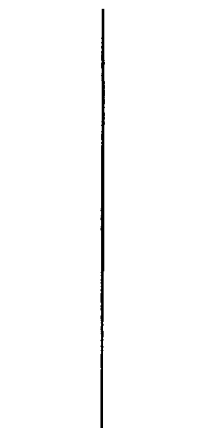

FIG. 1 shows the first embodiment of a soft-focus lens system. The soft-focus lens system includes a positive master lens group (hereinafter, master lens group) 10 and a negative soft-focus lens group (hereinafter, soft-focus lens group) 20, in this order from the object. The soft-focus lens group 20 includes a positive moveable sub lens group 20P (hereinafter, positive sub lens group) and a negative moveable sub lens group 20N (hereinafter, negative sub lens group). A diaphragm S is provided in the master lens group 10. Note that the combined power of the master lens group 10 and the soft-focus lens group 20 is positive. According to the first embodiment, the normal photographing mode and the soft-focus photographing mode in which spherical aberration largely occurs than in the normal photographing mode are set by respectively moving the positive sub lens group 20P and the negative sub lens group 20N along different moving paths.

Here, a moving pattern of these sub lens groups 20P and 20N, in which the normal photographing mode is defined as an initial state, is explained as follows:

(i) when the normal photographing mode is switched to the soft-focus photographing mode, the positive sub lens groups 20P and the negative sub lens group 20N move toward the object;

(ii) the positive sub lens group 20P moves faster than the negative sub lens group 20N does; and (iii) the focal point and the focal length are not substantially varied before and after the normal photographing mode is switched to the soft-focus photographing mode.

The solution, by which the sub lens groups 20P and 20N can move without changing the focal point and the focal length before and after the switching of the photographing modes, exists, if the following conditions are satisfied at the same time:

(1) the master lens group 10 has positive power;

(2) the soft-focus lens group 20 has negative power; and (3) the positive sub lens groups 20P and the negative sub lens group 20N of the soft-focus lens group 20 are independently moveable with respect to the master lens group 10.

In the first through ninth embodiments shown in FIGS. 1, 5, 9, 13, 17, 21, 25, 29 and 33, the master lens group 10 and the soft-focus lens group 20 are arranged in this order from the object; the diaphragm S is provided in the master lens group 10; the positive sub lens group 20P and the negative sub lens group 20N are arranged, in this order from the object. The sub lens group 20P includes a positive single lens element, and the sub lens group 20N includes a negative single lens element; and these lens element are arranged to form an air lens therebetween having a shape of a meniscus lens element with the concave surface facing toward the diaphragm S.

In the normal photographing mode, the air lens is made thinner, so that under-corrected spherical aberration occurs on the first surface, i.e., the converging surface, of the air lens is canceled out by over-corrected spherical aberration occurred on the second surface thereof, i.e., the diverging surface. As a result, photography without the effects of soft-focusing can be carried out.

In the soft-focus photographing mode, the air lens is made thicker than in the normal photographing mode, so that only the incident height of light rays onto the second surface is lowered, and over-corrected spherical aberration thereon is reduced. As a result, under-corrected spherical aberration is maintained, and the effects of soft-focusing can be obtained in photography.

On the other hand, in the case where the air lens is not formed to have the concave surface facing toward the diaphragm S, when the thickness of the air lens is varied, not only the incident height of light rays to the second surface, but also the incident angle thereof to the second surface varies, so that aberrations other than spherical aberration undesirably vary.

In a conventional soft-focus lens system, the change of the normal photographing mode to the soft-focus photographing mode or vice versa is performed by only varying the thickness of the air lens without varying the distance between the master lens group and the soft-focus lens group, and thereby, the focal point and the focal length are varied before and after the change of the photographing modes. The change of the focal point and the focal length can be explained as follows:

(i) an image formed by the master lens group is considered to be an object point for the soft-focus lens group;

(ii) when the thickness of the air lens having the concave surface is varied, the focal length of the soft-focus lens group varies, since varying the thickness of the air lens is equivalent to varying the distance between lens elements having predetermined power;

(iii) if the distance between the master lens group and the soft-focus lens group is constant, the magnification of the soft-focus lens group varies;

(iv) if the magnification of the soft-focus lens group varies, an image-to-objet distance also varies; and (v) as a result, the focal length of the entire lens system, and the position of the focal point vary.

Unlike the above conventional soft-focus lens system, when the normal photographing mode is switched to the soft-focus photographing mode or vice versa, the soft-focus lens system according to the embodiments is arranged to vary not only the thickness of the air lens in the soft-focus lens group 20, but also the relative positions of the master lens group 10 and the soft-focus lens group 20, thereby an image-to-objet distance with respect to the soft-focus lens group 20 is maintained constant, and the magnification of the soft-focus lens group 20 is also maintained constant. Consequently, the photographing modes can be changed without causing the changes of the focal point and focal length. More specifically, the above is explained as follows:

Under the condition that 'a' designates the distance between an object point and the first principal point; 'b' designates the distance between the second principal point and the image point; 'fs' designates the focal length of the soft-focus lens group 20; and HH designates the distance between the first and second principal points;

The following is obtained based on the image-forming equation, when the principal point is considered to be a reference point:

$$-1/a + 1/b = 1/fs$$

Here, the transverse magnification m=−b/a

In order to make the image-to-objet distance (IO) constant,

IO=−a+b+HH=−a²/(a+fs)+HH=constant

In order to make the transverse magnification constant, m=−fs/(a+fs)=constant

Note that in the soft-focus lens system which satisfies the above conditions, the position of the paraxial focal point and the focal length of the entire lens system can be maintained constant by moving the positive sub lens group 20P and the negative sub lens group 20N along the predetermined moving paths.

Condition (1) is for attaining the effects of soft-focusing, while the changes of the focal length and the focal point are reduced to the extent that the changes are substantially negligible.

If the master lens group 10 and the soft-focus lens group 20 are close to each other to the extent that d0/f exceeds the lower limit of condition (1), the changes of the focal length and the focal point cannot be corrected even when the effects of soft-focusing can be attained.

If the master lens group 10 and the soft-focus lens group 20 are distant from each other to the extent that d0/f exceeds the upper limit of condition (1), it is difficult to secure the back focal distance, so that the diameter of the soft-focus lens group 20 becomes larger.

Condition (2) is for attaining to the effects of soft-focusing sufficiently in the soft-focus photographing mode, and for performing photography without the effects of soft-focusing in the normal photographing mode, while the traveling distances of the positive sub lens group 20P and the negative sub lens group 20N are maintained shorter.

If the power of the soft-focus lens group 20 becomes too weak to the extent that fB0/f exceeds the lower limit of condition (2), the traveling distances of the positive sub lens group 20P and the negative sub lens group 20N, for correcting the changes of the focal point and the focal point, become too long in the soft-focus photographing mode.

If the power of the soft-focus lens group 20 becomes too strong to the extent that fB0/f exceeds the upper limit of condition (2), the correcting of aberrations, in the normal photographing mode, becomes difficult, in particular, when photography is performed at a close object distance.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO designates the f-number, f designates the focal length of the entire zoom lens system, $f_B$ designates the back focal distance, w designates the half angle-of-view (°), r designates the radius of curvature, d designates the lens-element thickness or distance between lens elements, Nd designates the refractive index of the d-line, and ν designates the Abbe number.

Figure 4A:
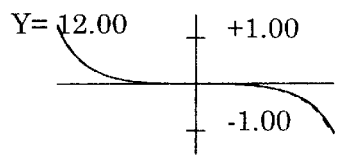
FIGS. 4A, 4B and 4C show coma occurred when the lens arrangement of the soft-focus lens system of FIG. 1 is switched to the soft-focus photographing mode, while an object at infinity is in an in-focus state.
Figure 4B:
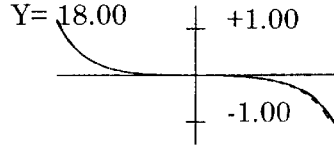
Figure 4C:
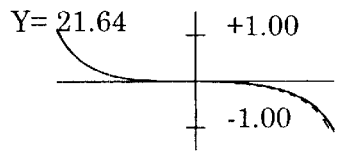

FIGS. 1 through 4C show the first embodiment of the soft-focus lens system. FIG. 1 shows the lens arrangement of the soft-focus lens system in the normal photographing mode, when an object at infinity is in an in-focus state. FIGS. 2A through 2D show aberrations occurred in the soft-focus lens system of FIG. 1. FIGS. 3A through 3D show aberrations occurred when the lens arrangement of the soft-focus lens system of FIG. 1 is switched to the soft-focus photographing mode, while an object at infinity is in an in-focus state. FIGS. 4A through 4C show coma occurred when the lens arrangement of the soft-focus lens system of FIG. 1 is switched to the soft-focus photographing mode, while an object at infinity is in an in-focus state. Table 1 shows the numerical data of the first embodiment.

Surface Nos. 1 through 12 define the master lens group 10, surface Nos. 13 through 16 define the soft-focus lens group 20. The numerals corresponding to 'd12' and 'd14' indicate the states where an object at infinity is focused in the normal photographing mode and the soft-focus photographing mode, respectively.

Focusing an object at a close distance is carried out by moving both the master lens group 10 and the soft-focus lens group 20 toward the object. The diaphragm S is provided 6.33 from the surface No. 6 toward the image.

TABLE 1

$F_{NO}$ = 1:2.9
f = 85.00–84.38
$f_B$ = 40.30–46.43

| Surface No. | r | d | Nd | νd |
|---|---|---|---|---|
| 1 | 43.183 | 5.49 | 1.59240 | 68.3 |
| 2 | 159.905 | 0.10 | — | — |
| 3 | 39.991 | 4.01 | 1.59240 | 68.3 |
| 4 | 128.469 | 0.84 | — | — |
| 5 | 464.265 | 1.50 | 1.63636 | 35.4 |
| 6 | 48.223 | 10.52 | — | — |
| 7 | −42.737 | 1.57 | 1.54814 | 45.8 |
| 8 | 40.000 | 3.47 | — | — |
| 9 | −62.096 | 2.27 | 1.77250 | 49.6 |
| 10 | −41.822 | 0.10 | — | — |
| 11 | 45.031 | 7.00 | 1.61800 | 63.4 |
| 12 | −51.971 | 13.55–4.97 | — | — |
| 13 | −57.503 | 3.55 | 1.77250 | 49.6 |
| 14 | −30.612 | 2.99–5.44 | — | — |
| 15 | −25.303 | 1.50 | 1.66672 | 48.3 |
| 16 | −128.427 | — | — | — |

Embodiment 2

Figure 5:
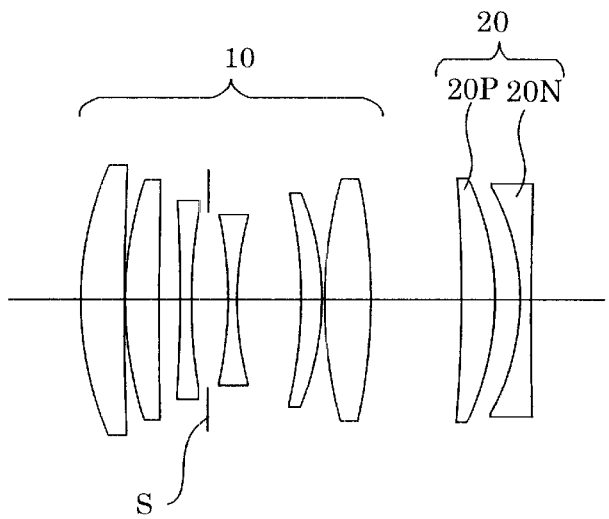
FIG. 5 shows the lens arrangement of a soft-focus lens system according to a second embodiment in the normal photographing mode, when an object at infinity is in an in-focus state.
Figure 6A:
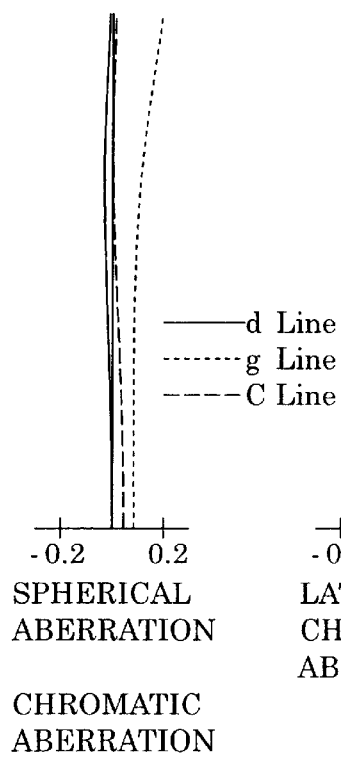
FIGS. 6A, 6B, 6C and 6D show aberrations occurred in the soft-focus lens system of FIG. 5.
Figure 6B:
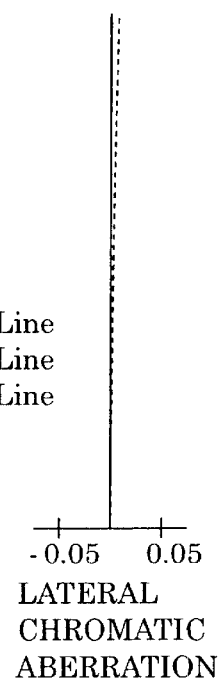
Figure 6C:
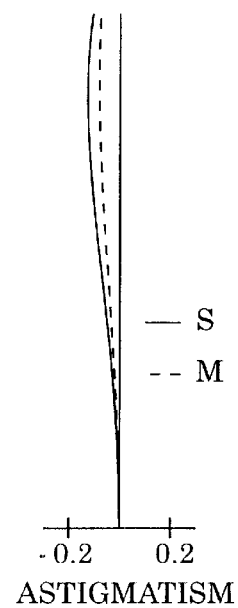
Figure 6D:
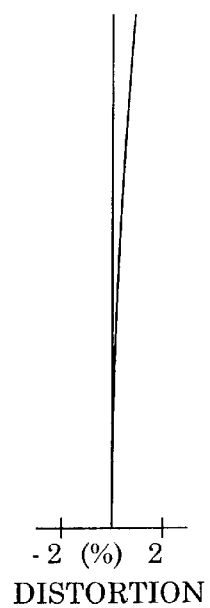

FIGS. 5 through 8C show the second embodiment of the soft-focus lens system. FIG. 5 shows the lens arrangement of the soft-focus lens system in the normal photographing mode, when an object at infinity is in an in-focus state. FIGS. 6A through 6D show aberrations occurred in the soft-focus lens system of FIG. 5. FIGS. 7A through 7D show aberrations occurred when the lens arrangement of the soft-focus lens system of FIG. 5 is switched to the soft-focus photographing mode, while an object at infinity is in an in-focus state. FIGS. 8A through 8C show coma occurred when the lens arrangement of the soft-focus lens system of FIG. 5 is switched to the soft-focus photographing mode, while an object at infinity is in an in-focus state. Table 2 shows the numerical data of the second embodiment. The basic lens arrangement is the same as the first embodiment; however, focusing an object at a close distance is performed by moving the master lens group 10 toward the object. The diaphragm S is provided 2.25 from the surface No. 6 toward the image.

TABLE 2

$F_{NO} = 1:2.9$
$f = 85.00–85.11$
$f_B = 39.41–48.90$

| Surface No. | r | d | Nd | νd |
|---|---|---|---|---|
| 1 | 46.256 | 5.97 | 1.59240 | 68.3 |
| 2 | 495.714 | 0.10 | — | — |
| 3 | 51.395 | 4.64 | 1.59240 | 68.3 |
| 4 | 745.851 | 2.92 | — | — |
| 5 | −202.047 | 1.53 | 1.66680 | 33.0 |
| 6 | 73.641 | 5.02 | — | — |
| 7 | −52.751 | 1.20 | 1.54814 | 45.8 |
| 8 | 43.498 | 8.83 | — | — |
| 9 | −62.610 | 2.79 | 1.72916 | 54.7 |
| 10 | −38.877 | 0.39 | — | — |
| 11 | 63.141 | 6.34 | 1.61800 | 63.4 |
| 12 | −78.249 | 12.46–1.00 | — | — |
| 13 | −203.119 | 4.60 | 1.77250 | 49.6 |
| 14 | −38.627 | 3.38–5.34 | — | — |
| 15 | −32.341 | 1.50 | 1.78590 | 44.2 |
| 16 | 742.357 | — | — | — |

Embodiment 3

FIGS. 9 through 12C show the third embodiment of the soft-focus lens system.

Specifically, in the third embodiment, the soft-focus lens system is applied to a medium-sized camera with the 6×4.5 format size.

Figure 12A:
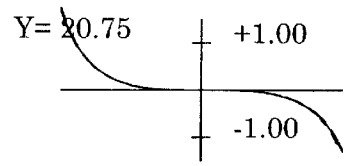
FIGS. 12A, 12B and 12C show coma occurred when the lens arrangement of the soft-focus lens system of FIG. 9 is switched to the soft-focus photographing mode, while an object at infinity is in an in-focus state.
Figure 12B:
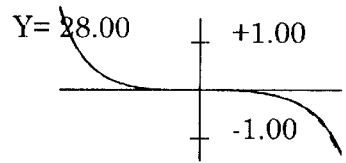
Figure 12C:
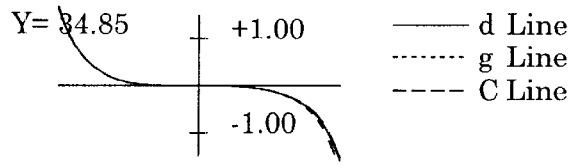

FIG. 9 shows the lens arrangement of the soft-focus lens system in the normal photographing mode, when an object at infinity is in an in-focus state. FIGS. 10A through 10D show aberrations occurred in the soft-focus lens system of FIG. 9. FIGS. 11A through 11D show aberrations occurred when the lens arrangement of the soft-focus lens system of FIG. 9 is switched to the soft-focus photographing mode, while an object at infinity is in an in-focus state. FIGS. 12A through 12C show coma occurred when the lens arrangement of the soft-focus lens system of FIG. 9 is switched to the soft-focus photographing mode, while an object at infinity is in an in-focus state. Table 3 shows the numerical data of the third embodiment. The basic lens arrangement is the same as the first embodiment; however, focusing an object at a close distance is performed by moving the master lens group 10 toward the object. The diaphragm S is provided 11.52 from the surface No. 6 toward the image.

TABLE 3

$F_{NO} = 1:2.9$
$f = 127.13–126.79$
$f_B = 59.53–70.67$

| Surface No. | r | d | Nd | νd |
|---|---|---|---|---|
| 1 | 90.614 | 8.00 | 1.59240 | 68.3 |
| 2 | 1851.497 | 0.10 | — | — |
| 3 | 52.050 | 8.36 | 1.59240 | 68.3 |
| 4 | 257.017 | 1.86 | — | — |
| 5 | 539.121 | 2.00 | 1.63636 | 35.4 |
| 6 | 60.628 | 18.22 | — | — |
| 7 | −65.698 | 3.00 | 1.54814 | 45.8 |
| 8 | 63.348 | 6.26 | — | — |
| 9 | −76.996 | 3.51 | 1.77250 | 49.6 |
| 10 | −54.154 | 0.10 | — | — |
| 11 | 77.321 | 10.08 | 1.61800 | 63.4 |
| 12 | −94.550 | 14.42–1.00 | — | — |
| 13 | −141.249 | 6.70 | 1.77250 | 49.6 |
| 14 | −49.614 | 4.31–6.58 | — | — |
| 15 | −42.647 | 1.90 | 1.66672 | 48.3 |
| 16 | −902.750 | — | — | — |

Embodiment 4

FIGS. 13 through 16C show the fourth embodiment of the soft-focus lens system. FIG. 13 shows the lens arrangement of the soft-focus lens system in the normal photographing mode, when an object at infinity is in an in-focus state. FIGS. 14A through 14D show aberrations occurred in the soft-focus lens system of FIG. 13. FIGS. 15A trough 15D show aberrations occurred when the lens arrangement of the soft-focus lens system of FIG. 13 is switched to the soft-focus photographing mode, while an object at infinity is in an in-focus state. FIGS. 16A through 16C show coma occurred when the lens arrangement of the soft-focus lens system of FIG. 13 is switched to the soft-focus photographing mode, while an object at infinity is in an in-focus state. Table 4 shows the numerical data of the fourth embodiment. The basic lens arrangement and focusing operation for an object at a close distance are the same as the first embodiment. The diaphragm S is provided 2.69 from the surface No. 6 toward the image.

TABLE 4

$F_{NO} = 1:2.9$
$f = 85.00–84.78$
$f_B = 39.97–43.15$

| Surface No. | r | d | Nd | νd |
|---|---|---|---|---|
| 1 | 42.478 | 5.00 | 1.59240 | 68.3 |
| 2 | 164.267 | 0.10 | — | — |
| 3 | 36.618 | 5.11 | 1.59240 | 68.3 |
| 4 | 665.712 | 0.80 | — | — |
| 5 | 174.296 | 1.50 | 1.66680 | 33.0 |
| 6 | 54.801 | 5.45 | — | — |
| 7 | −52.405 | 1.20 | 1.57501 | 41.5 |
| 8 | 32.552 | 8.57 | — | — |
| 9 | −48.596 | 3.12 | 1.72916 | 54.7 |
| 10 | −34.699 | 1.00 | — | — |
| 11 | 55.943 | 5.80 | 1.61800 | 63.4 |
| 12 | −79.969 | 5.98–1.04 | — | — |
| 13 | −71.420 | 4.50 | 1.65016 | 39.4 |
| 14 | −33.466 | 4.98–6.74 | — | — |
| 15 | −29.218 | 1.50 | 1.78590 | 44.2 |
| 16 | −167.924 | — | — | — |

Embodiment 5

FIGS. 17 through 20C show the fifth embodiment of the soft-focus lens system.

Specifically, in the fifth embodiment, the soft-focus lens system is applied to a medium-sized camera with the 6×4.5 format size.

Figure 17:
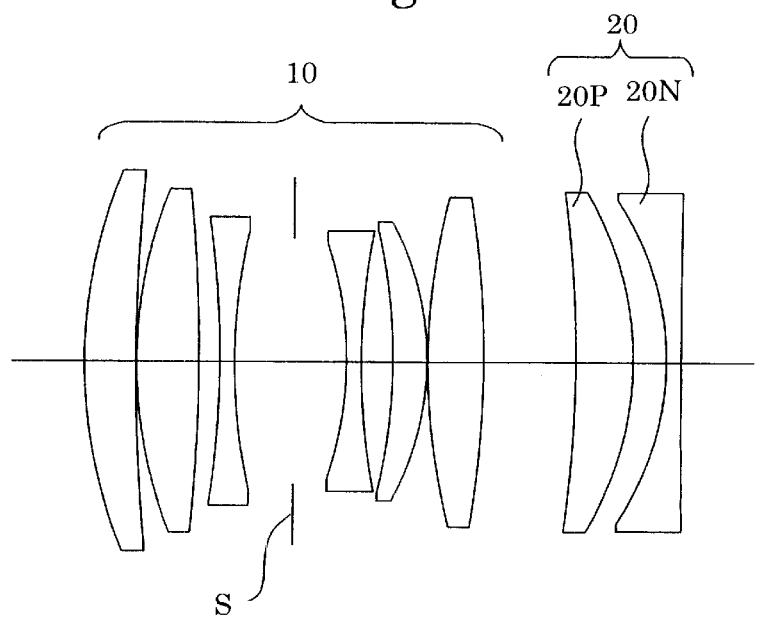
FIG. 17 shows the lens arrangement of a soft-focus lens system according to a fifth embodiment in the normal photographing mode, when an object at infinity is in an in-focus state.
Figures 18A, 18B, 18C, 18D:
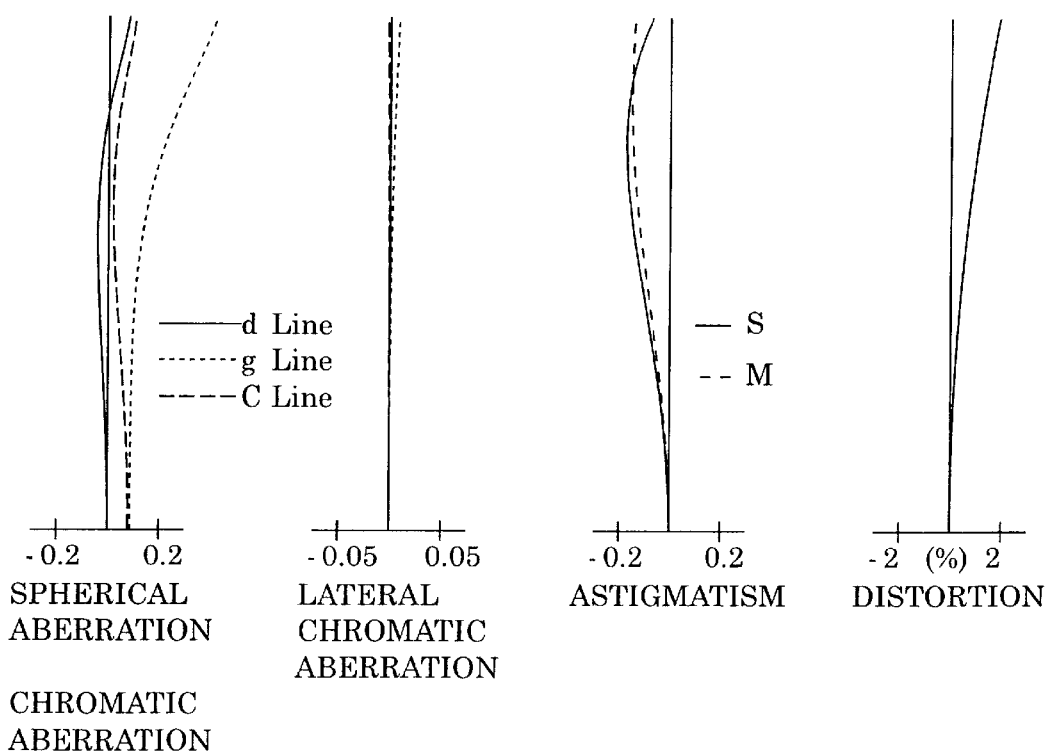
FIGS. 18A, 18B, 18C and 18D show aberrations occurred in the soft-focus lens system of FIG. 17.

FIG. 17 shows the lens arrangement of the soft-focus lens system in the normal photographing mode, when an object at infinity is in an in-focus state. FIGS. 18A through 18D show aberrations occurred in the soft-focus lens system of FIG. 17. FIGS. 19A through 19D show aberrations occurred when the lens arrangement of the soft-focus lens system of FIG. 17 is switched to the soft-focus photographing mode, while an object at infinity is in an in-focus state. FIGS. 20A through 20C show coma occurred when the lens arrangement of the soft-focus lens system of FIG. 17 is switched to the soft-focus photographing mode, while an object at infinity is in an in-focus state. Table 5 shows the numerical data of the fifth embodiment. The basic lens arrangement and focusing operation for an object at a close distance are the same as the first embodiment; on the other hand, focusing an object at a lose distance is performed by moving the master lens group 10 toward the object. The diaphragm S is provided 8.01 from the surface No. 6 toward the image.

TABLE 5

$F_{NO} = 1:2.8$
$f = 120.00–119.39$
$f_B = 57.09–65.63$

| Surface No. | r | d | Nd | νd |
|---|---|---|---|---|
| 1 | 66.654 | 7.07 | 1.48497 | 70.2 |
| 2 | 263.545 | 0.10 | — | — |
| 3 | 63.484 | 8.50 | 1.59240 | 68.3 |
| 4 | −235.927 | 2.86 | — | — |
| 5 | −131.030 | 2.00 | 1.62247 | 36.1 |
| 6 | 80.351 | 15.19 | — | — |
| 7 | −50.758 | 2.00 | 1.53077 | 48.3 |
| 8 | 92.864 | 4.38 | — | — |
| 9 | −77.452 | 4.70 | 1.56907 | 71.3 |
| 10 | −39.789 | 0.10 | — | — |
| 11 | 88.387 | 7.72 | 1.77250 | 49.6 |
| 12 | −136.937 | 12.75–1.00 | — | — |
| 13 | −164.836 | 7.86 | 1.58144 | 40.7 |
| 14 | −44.945 | 4.52–7.70 | — | — |
| 15 | −39.356 | 2.00 | 1.65016 | 39.4 |
| 16 | 1734.700 | — | — | — |

Embodiment 6

FIGS. 21 through 24C show the sixth embodiment of the soft-focus lens system.

Specifically, in the sixth embodiment, the soft-focus lens system is applied to a medium-sized camera with the 6×4.5 format size.

FIG. 21 shows the lens arrangement of the soft-focus lens system in the normal photographing mode, when an object at infinity is in an in-focus state. FIGS. 22A through 22D show aberrations occurred in the soft-focus lens system of FIG. 21. FIGS. 23A through 23D show aberrations occurred when the lens arrangement of the soft-focus lens system of FIG. 21 is switched to the soft-focus photographing mode, while an object at infinity is in an in-focus state. FIGS. 24A through 24C show coma occurred when the lens arrangement of the soft-focus lens system of FIG. 21 is switched to the soft-focus photographing mode, while an object at infinity is in an in-focus state. Table 6 shows the numerical data of the sixth embodiment. The basic lens arrangement is the same as the first embodiment; on the other hand, focusing an object at a close distance is performed by moving the master lens group 10 toward the object. The diaphragm S is provided 8.54 from the surface No. 6 toward the image.

TABLE 6

$F_{NO} = 1:2.9$
$f = 120.00–119.20$
$f_B = 57.01–69.53$

| Surface No. | r | d | Nd | νd | Nd |
|---|---|---|---|---|---|
| 1 | 68.465 | 7.36 | 1.48497 | 70.2 | — |
| 2 | −1274.200 | 0.10 | — | — | — |
| 3 | 44.736 | 7.13 | 1.56907 | 71.3 | — |
| 4 | 228.248 | 1.98 | — | — | — |
| 5 | −14530.447 | 2.00 | 1.59551 | 39.2 | — |
| 6 | 45.685 | 16.65 | — | — | — |
| 7 | −58.149 | 2.00 | 1.55690 | 48.6 | — |
| 8 | 64.115 | 4.27 | — | — | — |
| 9 | −64.665 | 3.02 | 1.77250 | 49.6 | — |
| 10 | −47.726 | 0.10 | — | — | — |
| 11 | 69.770 | 7.17 | 1.61800 | 63.4 | — |
| 12 | −76.074 | 18.09–2.94 | — | — | — |
| 13 | −86.793 | 5.30 | 1.69680 | 55.5 | — |
| 14 | −38.312 | 3.13–5.76 | — | — | — |
| 15 | −33.707 | 2.00 | 1.57135 | 53.0 | 1.57135 |
| 16 | −247.683 | — | — | — | — |

Embodiment 7

FIGS. 25 through 28C show the seventh embodiment of the soft-focus lens system.

Specifically, in the sixth embodiment, the soft-focus lens system is applied to a medium-sized camera with the 6×4.5 format size.

FIG. 25 shows the lens arrangement of the soft-focus lens system in the normal photographing mode, when an object at infinity is in an in-focus state. FIGS. 26A through 26D show aberrations occurred in the soft-focus lens system of FIG. 25. FIGS. 27A through 27D show aberrations occurred when the lens arrangement of the soft-focus lens system of FIG. 25 is switched to the soft-focus photographing mode, while an object at infinity is in an in-focus state. FIGS. 28A through 28C show coma occurred when the lens arrangement of the soft-focus lens system of FIG. 25 is switched to the soft-focus photographing mode, while an object at infinity is in an in-focus state. Table 7 shows the numerical data of the seventh embodiment. The basic lens arrangement is the same as the tenth embodiment; on the other hand, focusing an object at a close distance is performed by moving the master lens group 10 toward the object. The diaphragms is provided 18.42 from the surface No. 6 toward the image.

TABLE 7

$F_{NO} = 1:2.8$
$f = 128.77–127.97$
$f_B = 59.01–74.27$

| Surface No. | r | d | Nd | νd |
|---|---|---|---|---|
| 1 | 88.476 | 7.87 | 1.59240 | 68.3 |
| 2 | 4220.690 | 0.10 | — | — |
| 3 | 60.165 | 7.09 | 1.59240 | 68.3 |
| 4 | 185.748 | 3.01 | — | — |
| 5 | 748.715 | 3.69 | 1.63636 | 35.4 |
| 6 | 66.377 | 23.30 | — | — |
| 7 | −53.236 | 1.92 | 1.54814 | 45.8 |
| 8 | 66.111 | 4.64 | — | — |
| 9 | −71.475 | 2.92 | 1.77250 | 49.6 |
| 10 | −51.870 | 0.10 | — | — |
| 11 | 72.466 | 8.00 | 1.61800 | 63.4 |
| 12 | −70.418 | 21.45–4.13 | — | — |
| 13 | −142.507 | 5.75 | 1.77250 | 49.6 |
| 14 | −42.693 | 2.45–4.51 | — | — |
| 15 | −37.631 | 1.90 | 1.66672 | 48.3 |
| 16 | −656.041 | — | — | — |

Embodiment 8

FIGS. 29 through 32C show the eighth embodiment of the soft-focus lens system.

Specifically, in the eighth embodiment, the soft-focus lens system is applied to a medium-sized camera with the 6×4.5 format size.

Figure 29:
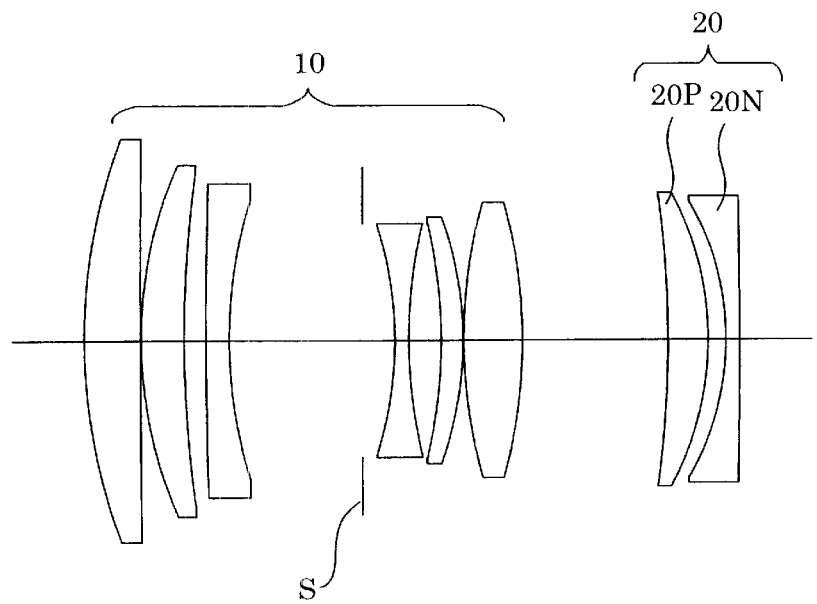
FIG. 29 shows the lens arrangement of a soft-focus lens system according to an eighth embodiment in the normal photographing mode, when an object at infinity is in an in-focus state.
Figures 30A, 30B, 30C, 30D:
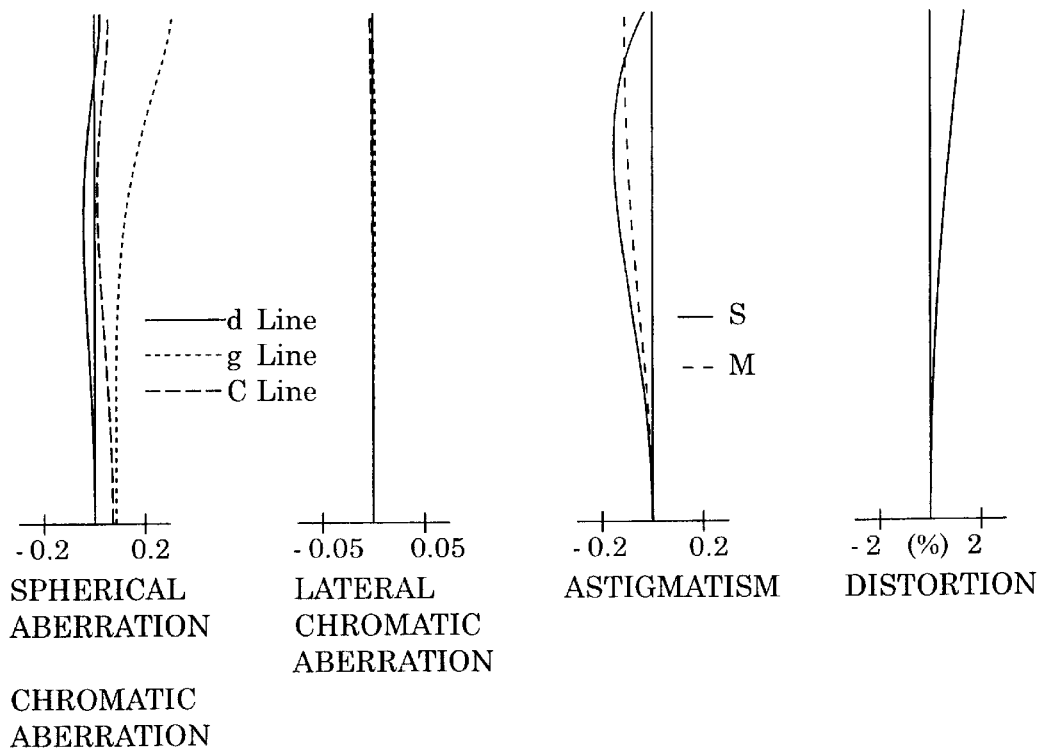
FIGS. 30A, 30B, 30C and 30D show aberrations occurred in the soft-focus lens system of FIG. 29.
Figures 31A, 31B, 31C, 31D:
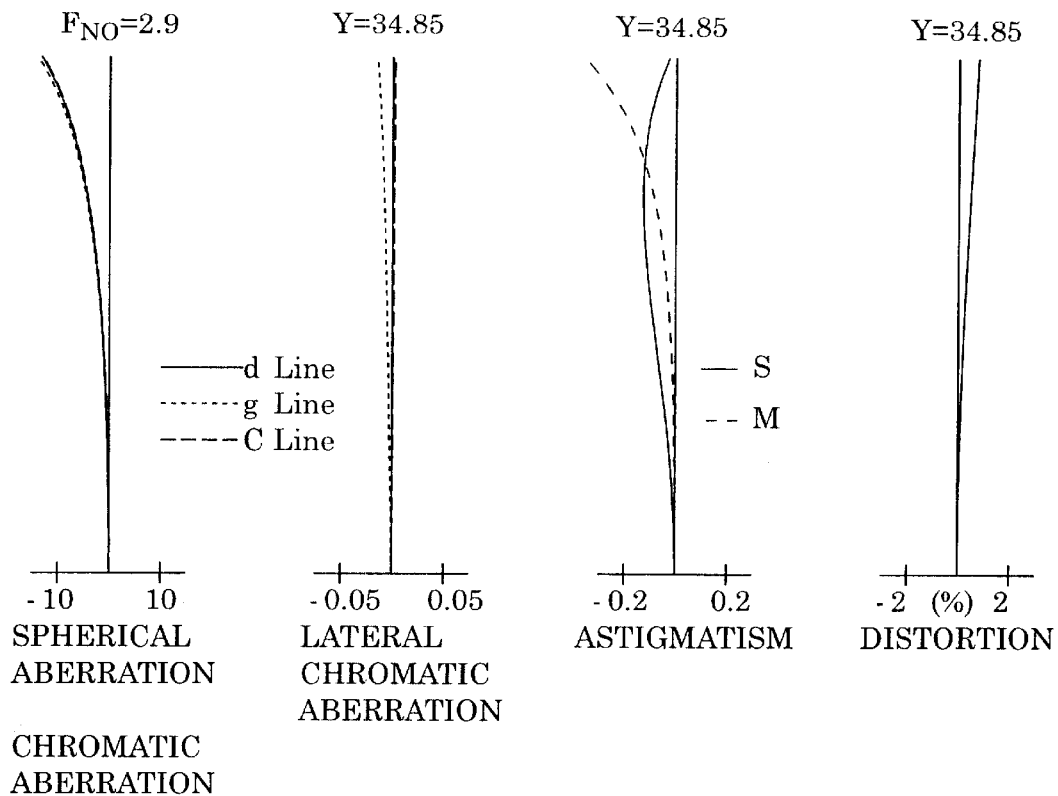
FIGS. 31A, 31B, 31C and 31D show aberrations occurred when the lens arrangement of the soft-focus lens system of FIG. 29 is switched to the soft-focus photographing mode, while an object at infinity is in an in-focus state.
Figure 32A:
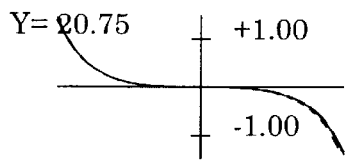
FIGS. 32A, 32B and 32C show coma occurred when the lens arrangement of the soft-focus lens system of FIG. 29 is switched to the soft-focus photographing mode, while an object at infinity is in an in-focus state.
Figure 32B:
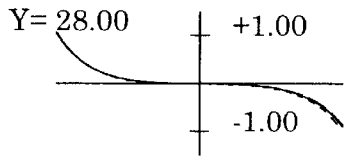
Figure 32C:
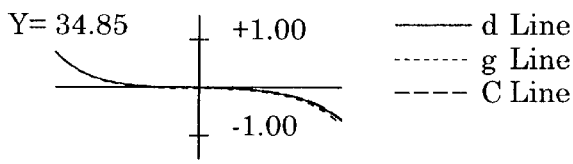

FIG. 29 shows the lens arrangement of the soft-focus lens system in the normal photographing mode, when an object at infinity is in an in-focus state. FIGS. 30A through 30D show aberrations occurred in the soft-focus lens system of FIG. 29. FIGS. 31A through 31D show aberrations occurred when the lens arrangement of the soft-focus lens system of FIG. 29 is switched to the soft-focus photographing mode, while an object at infinity is in an in-focus state. FIGS. 32A through 32C show coma occurred when the lens arrangement of the soft-focus lens system of FIG. 29 is switched to the soft-focus photographing mode, while an object at infinity is in an in-focus state. Table 8 shows the numerical data of the eighth embodiment. The basic lens arrangement is the same as the first embodiment; on the other hand, focusing an object at a close distance is performed by moving the master lens group 10 toward the object. The diaphragm S is provided 18.37 from the surface No. 6 toward the image.

TABLE 8

$F_{NO} = 1:2.9$
$f = 126.15–125.39$
$f_B = 59.00–74.09$

| Surface No. | r | d | Nd | νd |
|---|---|---|---|---|
| 1 | 78.531 | 7.72 | 1.59240 | 68.3 |
| 2 | 2457.373 | 0.10 | — | — |
| 3 | 60.091 | 5.95 | 1.59240 | 68.3 |
| 4 | 165.043 | 2.99 | — | — |
| 5 | 698.849 | 3.20 | 1.63636 | 35.4 |
| 6 | 64.917 | 22.84 | — | — |
| 7 | −51.602 | 1.90 | 1.54814 | 45.8 |
| 8 | 67.739 | 4.50 | — | — |
| 9 | −69.838 | 3.04 | 1.77250 | 49.6 |
| 10 | −49.943 | 0.10 | — | — |
| 11 | 71.916 | 8.00 | 1.61800 | 63.4 |
| 12 | −71.916 | 20.13–2.95 | — | — |
| 13 | −148.994 | 5.56 | 1.77250 | 49.6 |
| 14 | −42.854 | 2.53–4.62 | — | — |
| 15 | −37.560 | 1.90 | 1.66672 | 48.3 |
| 16 | −1024.286 | — | — | — |

Embodiment 9

FIGS. 33 through 36C show the ninth embodiment of the soft-focus lens system. Specifically, in the sixth embodiment, the soft-focus lens system is applied to a medium-sized camera with the 6×4.5 format size.

Figure 33:
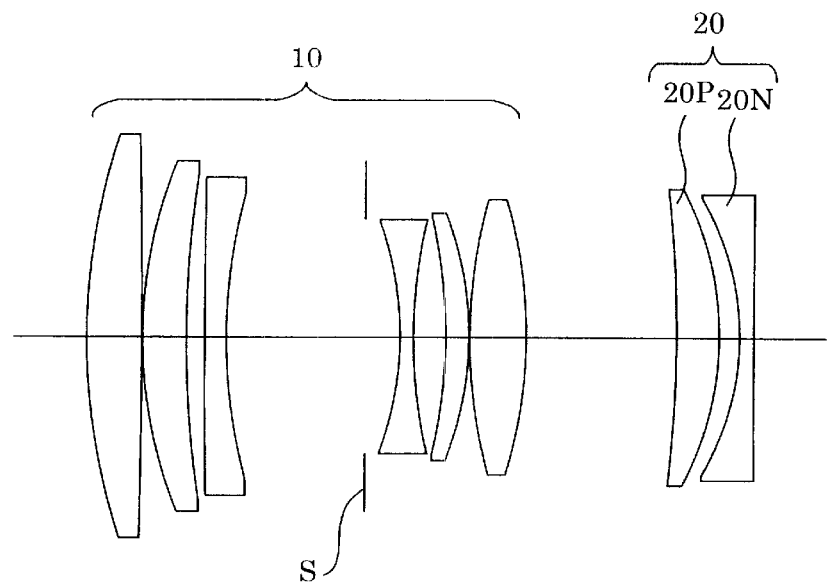
FIG. 33 shows the lens arrangement of a soft-focus lens system according to a ninth embodiment in the normal photographing mode, when an object at infinity is in an in-focus state.
Figures 34A, 34B, 34C, 34D:
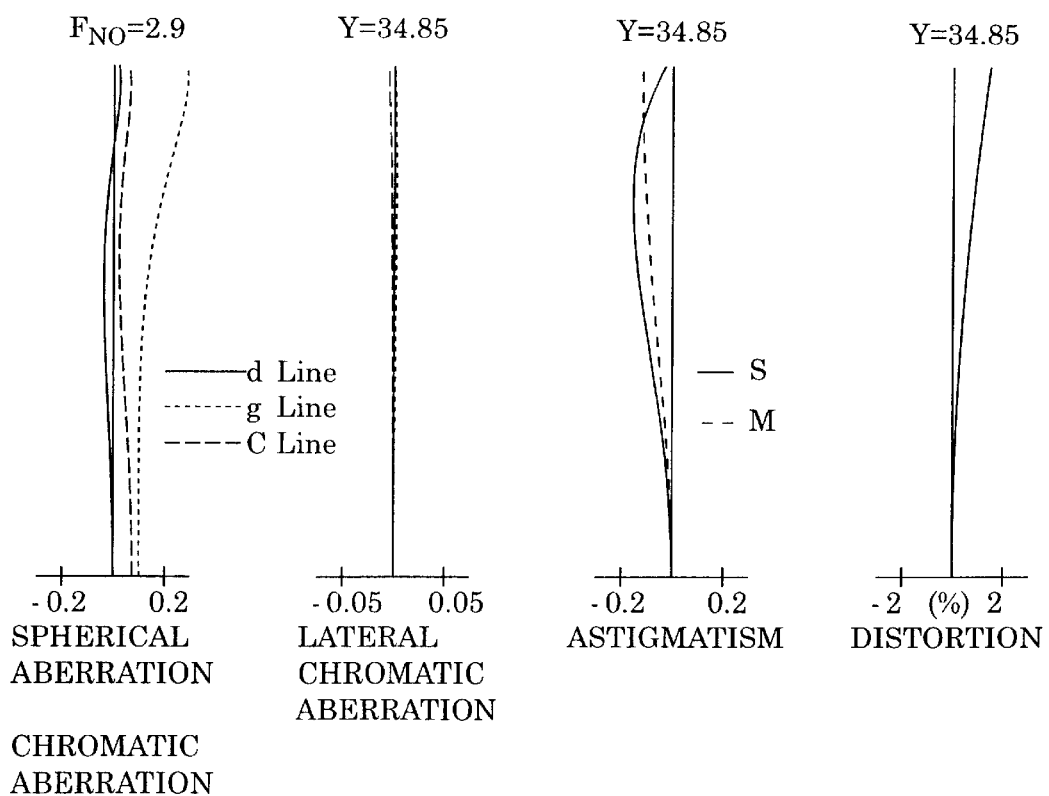
FIGS. 34A, 34B, 34C and 34D show aberrations occurred in the soft-focus lens system of FIG. 33.
Figures 35A, 35B, 35C, 35D:
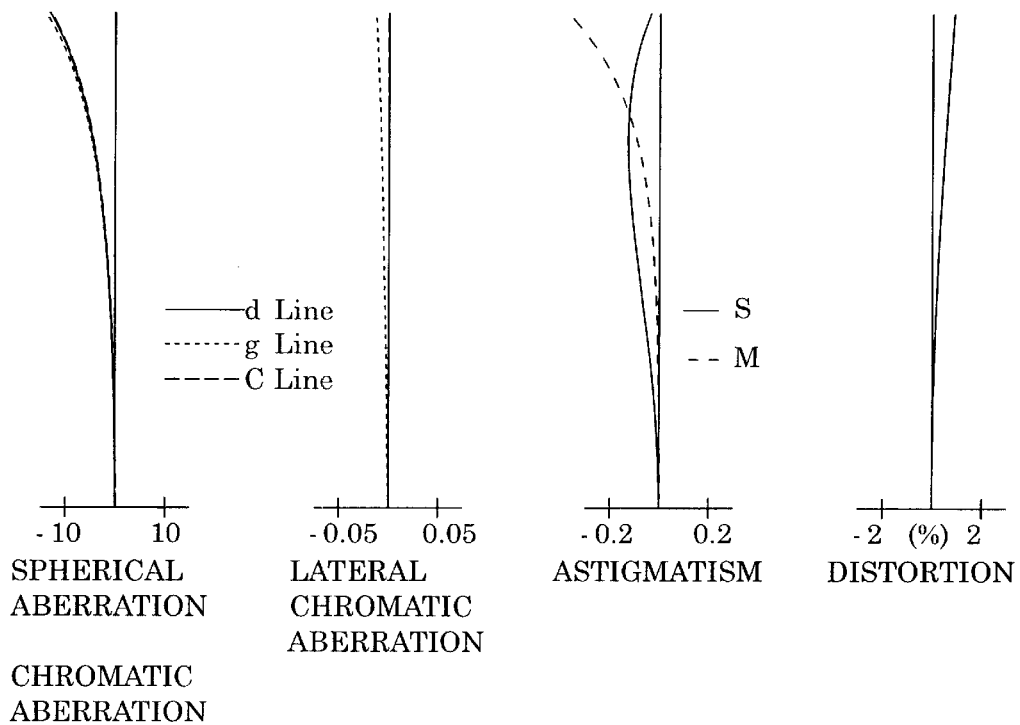
FIGS. 35A, 35B, 35C and 35D show aberrations occurred when the lens arrangement of the soft-focus lens system of FIG. 33 is switched to the soft-focus photographing mode, while an object at infinity is in an in-focus state.
Figure 36A:
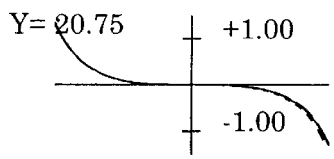
FIGS. 36A, 36B and 36C show coma occurred when the lens arrangement of the soft-focus lens system of FIG. 33 is switched to the soft-focus photographing mode, while an object at infinity is in an in-focus state.
Figure 36B:
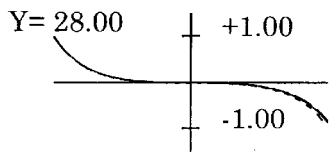
Figure 36C:
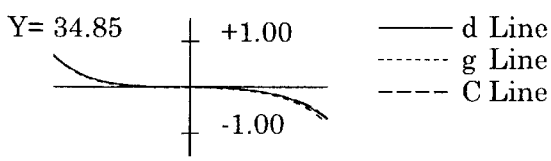
Figure 39A:
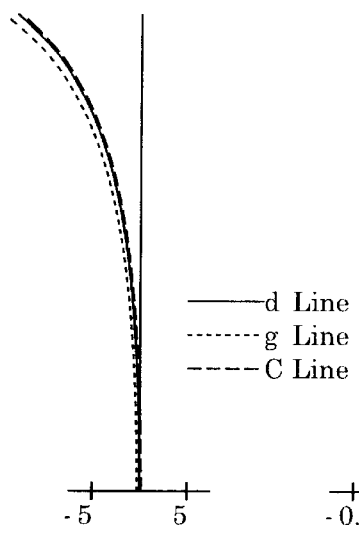
FIGS. 39A, 39B, 39C and 39D show aberrations occurred when the lens arrangement of the soft-focus lens system of FIG. 37 is switched to the soft-focus photographing mode, while an object at infinity is in an in-focus state.
Figure 39B:
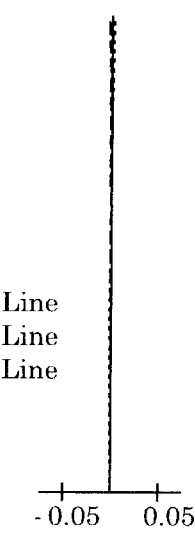
Figure 39C:
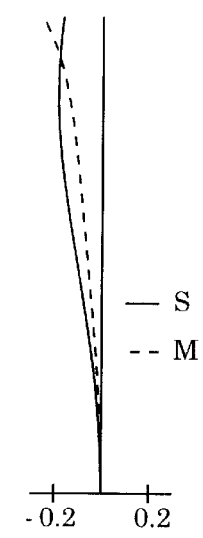
Figure 39D:
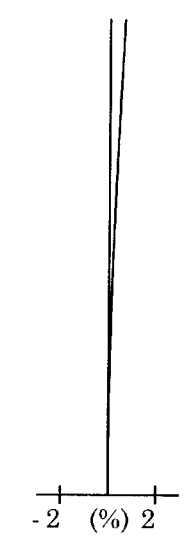
Figure 40A:
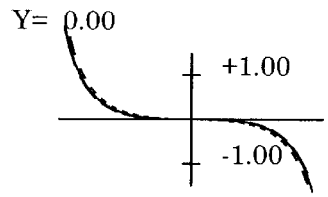
FIGS. 40A, 40B, 40C and 40D show coma occurred when the lens arrangement of the soft-focus lens system of FIG. 37 is switched to the soft-focus photographing mode, while an object at infinity is in an in-focus state.
Figure 40B:
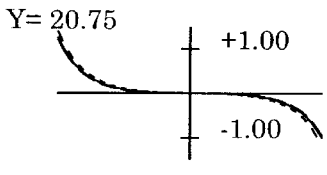
Figure 40C:
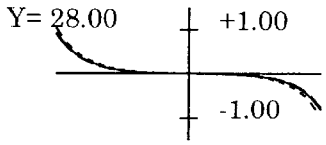
Figure 40D:
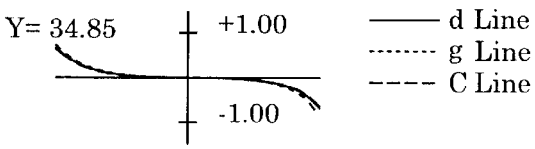

FIG. 33 shows the lens arrangement of the soft-focus lens system in the normal photographing mode, when an object at infinity is in an in-focus state. FIGS. 34A through 34D show aberrations occurred in the soft-focus lens system of FIG. 33. FIGS. 35A through 35D show aberrations occurred when the lens arrangement of the soft-focus lens system of FIG. 33 is switched to the soft-focus photographing mode, while an object at infinity is in an in-focus state. FIGS. 36A through 36C show coma occurred when the lens arrangement of the soft-focus lens system of FIG. 33 is switched to the soft-focus photographing mode, while an object at infinity is in an in-focus state. Table 9 shows the numerical data of the ninth embodiment. The basic lens arrangement is the same as the first embodiment; on the other hand, focusing an object at a close distance is performed by moving the master lens group 10 toward the object. The diaphragms is provided 19.09 from the surface No. 6 toward the image.

TABLE 9

$F_{NO} = 1:2.9$
$f = 124.68–124.06$
$f_B = 59.09–73.61$

| Surface No. | r | d | Nd | νd |
|---|---|---|---|---|
| 1 | 88.489 | 7.56 | 1.61800 | 63.4 |
| 2 | −1254.882 | 0.10 | — | — |
| 3 | 63.947 | 6.04 | 1.61800 | 63.4 |
| 4 | 152.749 | 2.51 | — | — |
| 5 | 1529.856 | 3.00 | 1.66680 | 33.0 |
| 6 | 74.987 | 23.89 | — | — |
| 7 | −46.520 | 1.90 | 1.53172 | 48.9 |
| 8 | 69.625 | 4.51 | — | — |

TABLE 9-continued

| | | | | |
|---|---|---|---|---|
| 9 | −71.118 | 3.19 | 1.69680 | 55.5 |
| 10 | −47.415 | 0.10 | — | — |
| 11 | 72.842 | 7.84 | 1.59240 | 68.3 |
| 12 | −64.805 | 20.59–4.08 | — | — |
| 13 | −176.857 | 5.89 | 1.77250 | 49.6 |
| 14 | −43.848 | 2.75–4.74 | — | — |
| 15 | −37.951 | 1.90 | 1.66672 | 48.3 |
| 16 | 2809.636 | — | — | — |

FIGS. 37 through 56D show the tenth through fourteenth embodiments of the soft-focus lens system.

FIG. 37 shows the tenth embodiment of the soft-focus lens system. The soft-focus lens system includes the master lens group 10, a positive focusing lens group 30 (hereinafter, focusing lens group) which is moveable along the optical axis in order to obtain an in-focus state of the object, and the soft-focus lens group 20, in this order from the object. The soft-focus lens system according to the tenth through fourteenth embodiments is an inner-focusing type lens system in which the focusing lens group 30 is moveable, between the master lens group 10 and the soft-focus lens group 20, for performing focusing. The combined power of the master lens group 10, the focusing lens group 30 and the soft-focus lens group 20 is positive.

In the tenth through fourteenth embodiments, the positive sub lens group 20P and the negative sub lens group 20N of the soft-focus lens group 20 can have the same moving pattern as that of the first through ninth embodiments. The same can be applied to the solution, by which the sub lens groups 20P and 20N are moved without causing the changes of the focal point and the focal length before and after the switching of the photographing modes, if the following conditions are satisfied at the same time:

(1) the master lens group 10 and the focusing lens group 30 have positive power;

(2) the soft-focus lens group 20 has negative power; and (3) the positive sub lens group 20P and the negative sub lens group 20N are independently moveable with respect to the master lens group 10.

The diaphragm S is provided in the focusing lens group 30. Similar to the first through ninth embodiments, the positive sub lens group 20P is constituted by a positive single lens element, and the negative sub lens group 20N is constituted by a negative single lens element. These lens elements are arranged to form an air lens therebetween having a shape of a meniscus lens element with the concave surface facing toward the diaphragm S.

In a conventional soft-focus lens system, the change of the normal photographing mode to the soft-focus photographing mode or vice versa is performed by only varying the thickness of the air lens, while the soft-focus lens group is being moved, without varying the relative distances among the lens groups other than the soft-focus lens group (i.e., the master lens group and the focusing lens group). As a result, the focal point and the focal length are varied before and after the change of the photographing modes. The change of the focal point and the focal length can be explained as follows:

(i) an image formed by the lens groups other than the soft-focus lens group 20 is considered to be an object point for the soft-focus lens group 20;

(ii) when the thickness of the air lens having the concave surface is varied, the focal length of the soft-focus lens group 20 varies, since varying the thickness of the air lens is equivalent to varying the distance between lens elements having predetermined power;

(iii) if the distance between the soft-focus lens group 20 and the lens groups other than the soft-focus lens group 20 is constant, the magnification of the soft-focus lens group 20 varies;

(iv) if the magnification of the soft-focus lens group 20 varies, an image-to-objet distance also varies; and (v) as a result, the focal length of the entire lens system, and the position of the focal point vary.

Unlike the above conventional soft-focus lens system, the soft-focus lens system according to the tenth through fourteenth embodiments is arranged to vary not only the thickness of the air lens in the soft-focus lens group 20, but also the relative positions among the master lens group 10, the focusing lens group 30 and the soft-focus lens group 20. As a result, an image-to-objet distance is maintained constant, and the magnification of the soft-focus lens group 20 is also maintained constant. Consequently, the photographing modes can be changed without causing the changes of the focal point and focal length.

Here, it is noted that the equations for indicating the advantage of the first through the ninth embodiment, i.e., the photographing modes can be changed without causing the changes of the focal point and focal length, can also be applied to the tenth through the fourteenth embodiments.

Condition (1') is for attaining the effects of soft-focusing, while the changes of the focal length and the focal point are reduced to the extent that the changes are substantially negligible.

If the focusing lens group 30 and the soft-focus lens group 20 are close to each other to the extent that d0'/' exceeds the lower limit of condition (1'), the changes of the focal length and the focal point cannot be corrected even when the effects of soft-focusing can be obtained.

If the focusing lens group 30 are the soft-focus lens group 20 are distant from each other to the extent that d0'/f' exceeds the upper limit of condition (1'), it is difficult to secure the back focal distance, so that the diameter of the soft-focus lens group 20 becomes larger.

Condition (2') is for attaining the effects of soft-focusing sufficiently in the soft-focus photographing mode, and for performing photography without the effects of soft-focusing in the normal photographing mode, while the traveling distances of the positive sub lens group 20P and the negative sub lens group 20N are maintained shorter.

If the power of the soft-focus lens group 20 becomes too weak to the extent that fB0'/f' exceeds the lower limit of condition (2'), the traveling distances of the positive sub lens group 20P and the negative sub lens group 20N, in the soft-focus photographing mode, for correcting the changes of the focal point and the focal point become too long.

If the power of the soft-focus lens group 20 becomes too strong to the extent that fB0'/f' exceeds the upper limit of condition (2'), the correcting of aberrations, in the normal photographing mode, becomes difficult, in particular, when photography is performed at a close object distance.

Condition (3) specifies the power of the focusing lens group 30.

If the power of the focusing lens group 30 becomes too strong to the extent that f3/f' exceeds the lower limit of condition (3), it is advantageous for miniaturizing a lens system, since focusing at a closer object can be performed by a shorter traveling distance of the focusing lens group; however, the back focal distance cannot be secured sufficiently.

If the power of the focusing lens group 30 becomes too weak to the extent that f3/f' exceeds the upper limit of condition (3), the size of the lens system becomes larger.

Condition (4) specifies the radius of curvature of the most object-side (first) surface of the focusing lens group 30.

If the radius of curvature of the most object-side (first) surface of the focusing lens group 30 becomes larger to the extent that rR1/f' exceeds the upper limit of condition (4), negative spherical aberration excessively and undesirably occurs, since surfaces other than the most object-side (first) surface have to bear the optical load to secure positive power which is required for the focusing lens group 30. Moreover, the power of the focusing lens group 30 becomes insufficient, so that the traveling distance thereof becomes longer. Consequently, miniaturization of the lens system cannot be attained.

If the radius of curvature of the most object-side (first) surface becomes too small to the extent that rR1/f' exceeds the lower limit of condition (4), the incident angle of an off-axis (marginal) light ray with respect to the focusing lens group 30 largely varies according to the position of the focusing lens group 30, so that outer coma occurs. In other words, even when the focusing lens group 30 moves, the smaller the change of the incident angle with respect to the most object-side (first) surface is, the more advantageous it is for the correcting of aberrations which vary at close distances. Therefore the most object-side (first) surface of the focusing lens group 30 is formed as the convex surface facing toward the object.

An aspherical surface which is defined by the following equation is used:

$$x = cy^2/(1+[1-\{1+K\}c^2y^2y^2]^{1/2}) + A4y^4 + A6y^6 + A8y^8 + A10y^{10} \ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 10

FIGS. 37 through 40D show the tenth embodiment of the soft-focus lens system. FIG. 37 shows the lens arrangement of the soft-focus lens system in the normal photographing mode, when an object at infinity is in an in-focus state. FIGS. 38A through 38D show aberrations occurred in the soft-focus lens system of FIG. 37. FIGS. 39A through 39D show aberrations occurred when the lens arrangement of the soft-focus lens system of FIG. 37 is switched to the soft-focus photographing mode, while an object at infinity is in an in-focus state. FIGS. 40A through 40D show coma occurred when the lens arrangement of the soft-focus lens system of FIG. 37 is switched to the soft-focus photographing mode, while an object at infinity is in an in-focus state.

Table 10 shows the numerical data of the tenth embodiment. Surface Nos. 1 through 6 define the master lens group 10, surface Nos. 7 through 14 define the focusing lens group 30, and surface Nos. 15 through 18 define the soft-focus lens group 20. The numerals corresponding to 'd14' and 'd16' indicate the states where an object at infinity is focused in the normal photographing mode and in the soft-focus photographing mode, respectively.

Focusing an object at a close distance is carried out by moving the focusing lens group 30 toward the object, regardless of the position of the soft-focus lens group 20. The diaphragm S is provided 2.37 from the lens surface No. 8 toward the image.

TABLE 10

$F_{NO} = 1:2.8$
$f = 121.99–121.01$
$f_B = 59.00–71.99$

| Surface No. | r | d | Nd | νd |
|---|---|---|---|---|
| 1 | 65.976 | 4.93 | 1.72916 | 54.7 |
| 2 | 132.426 | 0.10 | — | — |
| 3 | 48.289 | 4.58 | 1.59240 | 68.3 |
| 4 | 75.725 | 5.18 | — | — |
| 5 | 115.905 | 2.00 | 1.60342 | 38.0 |
| 6 | 41.161 | 18.52 | — | — |
| 7 | 42.313 | 5.02 | 1.59240 | 68.3 |
| 8 | 205.089 | 5.53 | — | — |
| 9 | −75.554 | 1.50 | 1.57501 | 41.5 |
| 10 | 45.706 | 3.43 | — | — |
| 11 | 242.531 | 1.50 | 1.66680 | 33.O |
| 12 | 60.378 | 0.30 | — | — |
| 13 | 56.943 | 8.56 | 1.80400 | 46.6 |
| 14 | −68.338 | 16.70–1.13 | — | — |
| 15 | −57.071 | 4.44 | 1.80518 | 25.4 |
| 16 | −35.823 | 3.49–6.07 | — | — |
| 17 | −32.819 | 1.70 | 1.69895 | 30.1 |
| 18 | −74.319 | — | — | — |

Embodiment 11

FIGS. 41 through 44D show the eleventh embodiment of the soft-focus lens system. FIG. 41 shows the lens arrangement of the soft-focus lens system in the normal photographing mode, when an object at infinity is in an in-focus state. FIGS. 42A through 42D show aberrations occurred in the soft-focus lens system of FIG. 41. FIGS. 43A through 43D show aberrations occurred when the lens arrangement of the soft-focus lens system of FIG. 41 is switched to the soft-focus photographing mode, while an object at infinity is in an in-focus state. FIGS. 44A through 44D show coma occurred when the lens arrangement of the soft-focus lens system of FIG. 41 is switched to the soft-focus photographing mode, while an object at infinity is in an in-focus state. Table 11 shows the numerical data of the eleventh embodiment. The basic lens arrangement is the same as the tenth embodiment. The diaphragm S is provided 0.78 from the lens surface No. 8 toward the image.

TABLE 11

$F_{NO} = 1:2.9$
$f = 85.42 - 84.84$
$f_B = 39.10 - 46.30$

| Surface No. | r | d | Nd | νd |
|---|---|---|---|---|
| 1 | 48.804 | 3.74 | 1.72916 | 54.7 |
| 2 | 84.421 | 0.07 | — | — |
| 3 | 38.554 | 3.97 | 1.59240 | 68.3 |
| 4 | 64.532 | 2.49 | — | — |
| 5 | 80.426 | 1.40 | 1.62004 | 36.3 |
| 6 | 31.230 | 14.44 | — | — |
| 7* | 29.743 | 4.09 | 1.58636 | 60.9 |
| 8 | 938.462 | 3.05 | — | — |
| 9 | −72.602 | 2.88 | 1.58912 | 41.1 |
| 10 | 32.303 | 5.32 | — | — |
| 11 | 207.499 | 1.20 | 1.80518 | 25.4 |
| 12 | 43.563 | 0.38 | — | — |
| 13 | 42.651 | 5.66 | 1.83400 | 37.2 |
| 14 | −52.741 | 10.34-1.38 | — | — |
| 15 | −47.298 | 3.56 | 1.80610 | 40.9 |
| 16 | −26.517 | 2.63-4.38 | — | — |
| 17 | −23.303 | 1.19 | 1.60717 | 40.3 |
| 18 | −103.203 | — | — | — |

*designates the aspherical surface which is rotationally symmetrical with respect to the optical axis.

Aspherical surface data (the aspherical surface coefficients not indicated are zero (0.00)): Surf.

| No. | K | A4 | A6 | A8 |
|---|---|---|---|---|
| 7 | 0.00 | −0.11073 × 10$^{-5}$ | −0.17936 × 10$^{-8}$ | −0.47287 × 10$^{-11}$ |

Embodiment 12

Figure 45:
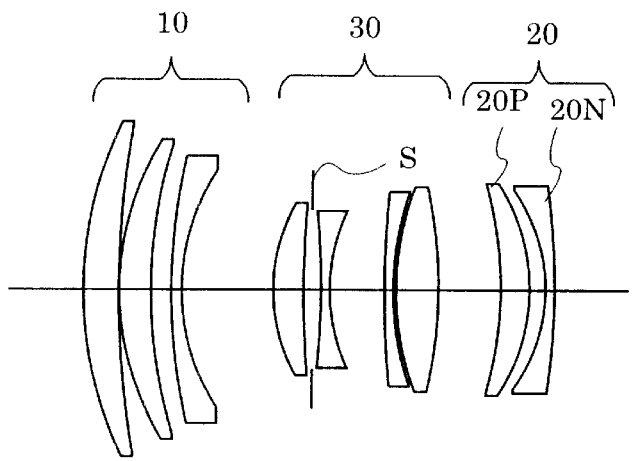
FIG. 45 shows the lens arrangement of a soft-focus lens system according to a twelfth embodiment in the normal photographing mode, when an object at infinity is in an in-focus state.
Figure 46A:
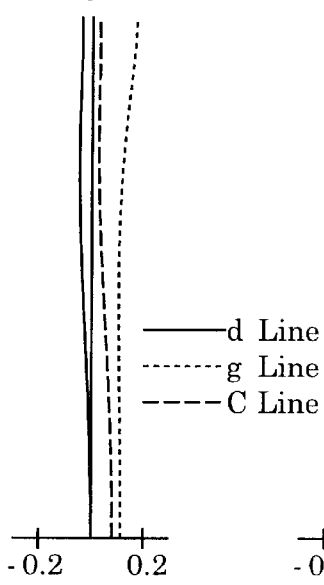
FIGS. 46A, 46B, 46C and 46D show aberrations occurred in the soft-focus lens system of FIG. 45.
Figure 46B:
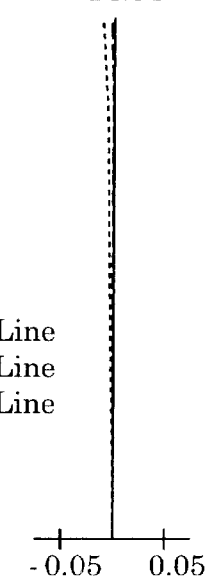
Figure 46C:
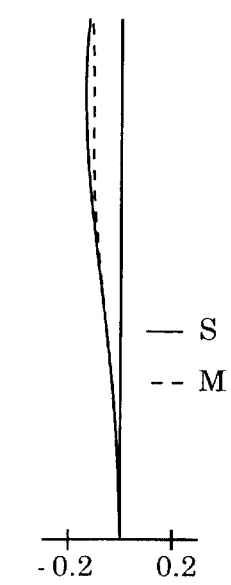
Figure 46D:
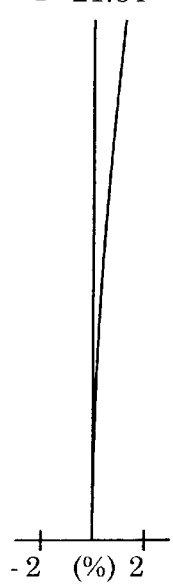

FIGS. 45 through 48D show the twelfth embodiment of the soft-focus lens system. FIG. 45 shows the lens arrangement of the soft-focus lens system in the normal photographing mode, when an object at infinity is in an in-focus state. FIGS. 46A through 46D show aberrations occurred in the soft-focus lens system of FIG. 45. FIGS. 47A through 47D show aberrations occurred when the lens arrangement of the soft-focus lens system of FIG. 45 is switched to the soft-focus photographing mode, while an object at infinity is in an in-focus state. FIGS. 48A through 48D show coma occurred when the lens arrangement of the soft-focus lens system of FIG. 45 is switched to the soft-focus photographing mode, while an object at infinity is in an in-focus state. Table 12 shows the numerical data of the twelfth embodiment. The basic lens arrangement is the same as the tenth embodiment. The diaphragm S is provided 1.12 from the lens surface No. 8 toward the image.

TABLE 12

$F_{NO} = 1:2.9$
$f = 85.0 - 84.51$
$f_B = 39.00 - 44.92$

| Surface No. | r | d | Nd | νd |
|---|---|---|---|---|
| 1 | 51.703 | 4.74 | 1.69680 | 55.5 |
| 2 | 129.933 | 0.07 | — | — |
| 3 | 38.602 | 4.24 | 1.69680 | 55.5 |
| 4 | 66.211 | 2.75 | — | — |
| 5 | 79.762 | 1.40 | 1.66680 | 33.0 |
| 6 | 29.374 | 12.38 | — | — |
| 7 | 23.999 | 4.10 | 1.56873 | 63.1 |
| 8 | 144.343 | 2.31 | — | — |
| 9 | −112.419 | 1.20 | 1.60562 | 43.7 |
| 10 | 25.214 | 7.40 | — | — |
| 11 | 137.993 | 1.20 | 1.80518 | 25.4 |
| 12 | 41.270 | 0.37 | — | — |
| 13 | 39.718 | 5.70 | 1.83400 | 37.2 |
| 14 | −63.323 | 8.39-1.39 | — | — |
| 15 | −51.043 | 3.84 | 1.80610 | 40.9 |
| 16 | −26.454 | 2.13-3.21 | — | — |
| 17 | −23.169 | 1.19 | 1.60717 | 40.3 |
| 18 | −99.497 | — | — | — |

Embodiment 13

Figure 49:
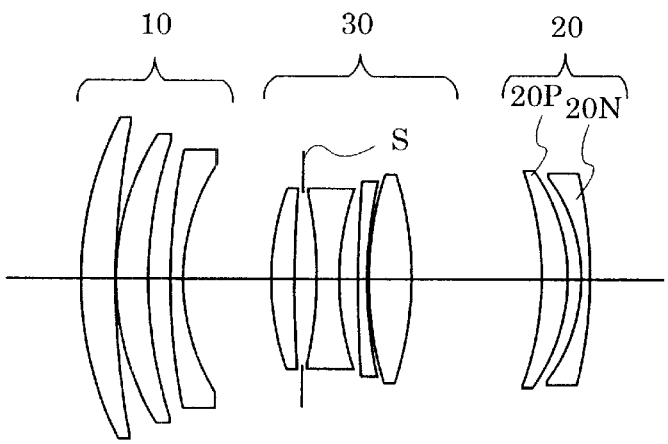
FIG. 49 shows the lens arrangement of a soft-focus lens system according to a thirteenth embodiment in the normal photographing mode, when an object at infinity is in an in-focus state.
Figure 50A:
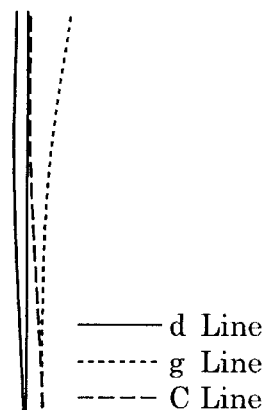
FIGS. 50A, 50B, 50C and 50D show aberrations occurred in the soft-focus lens system of FIG. 49.
Figure 50B:
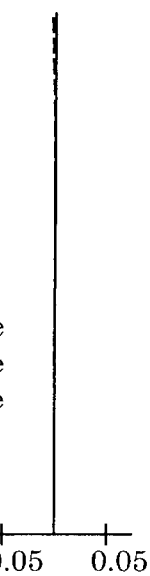
Figure 50C:
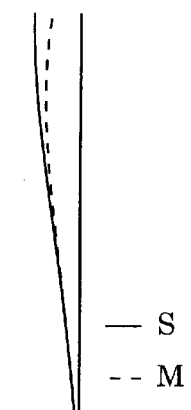
Figure 50D:
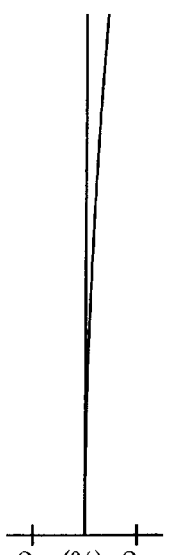

FIGS. 49 through 52D show the thirteenth embodiment of the soft-focus lens system. FIG. 49 shows the lens arrangement of the soft-focus lens system in the normal photographing mode, when an object at infinity is in an in-focus state. FIGS. 50A through 50D show aberrations occurred in the soft-focus lens system of FIG. 49. FIGS. 51A through 51D show aberrations occurred when the lens arrangement of the soft-focus lens system of FIG. 49 is switched to the soft-focus photographing mode, while an object at infinity is in an in-focus state. FIGS. 52A through 52D show coma occurred when the lens arrangement of the soft-focus lens system of FIG. 49 is switched to the soft-focus photographing mode, while an object at infinity is in an in-focus state. Table 13 shows the numerical data of the thirteenth embodiment. The basic lens arrangement is the same as the tenth embodiment. The diaphragm S is provided 1.11 from the lens surface No. 8 toward the image.

TABLE 13

$F_{NO} = 1:2.9$
f = 87.65 - 86.75
$f_R$ = 38.99 - 50.85

| Surface No. | r | d | Nd | vd |
|---|---|---|---|---|
| 1 | 47.893 | 4.62 | 1.69680 | 55.5 |
| 2 | 110.989 | 0.07 | — | — |
| 3 | 36.603 | 4.35 | 1.59240 | 68.3 |
| 4 | 58.274 | 3.00 | — | — |
| 5 | 86.662 | 1.67 | 1.59551 | 39.2 |
| 6 | 28.765 | 11.82 | — | — |
| 7 | 35.853 | 3.10 | 1.61800 | 63.4 |
| 8 | 167.053 | 3.06 | — | — |
| 9 | −51.623 | 3.00 | 1.63980 | 34.5 |
| 10 | 37.308 | 2.57 | — | — |
| 11 | 186.745 | 1.20 | 1.80518 | 25.4 |
| 12 | 61.780 | 0.23 | — | — |
| 13 | 47.808 | 5.73 | 1.83400 | 37.2 |
| 14 | −46.245 | 17.53-3.91 | — | — |
| 15 | −41.659 | 3.50 | 1.80610 | 40.9 |
| 16 | −25.136 | 1.85-3.61 | — | — |
| 17 | −22.662 | 1.19 | 1.60717 | 40.3 |
| 18 | −60.021 | — | — | — |

Embodiment 14

FIGS. 53 through 56D show the fourteenth embodiment of the soft-focus lens system. FIG. 53 shows the lens arrangement of the soft-focus lens system in the normal photographing mode, when an object at infinity is in an in-focus state. FIGS. 54A through 54D show aberrations occurred in the soft-focus lens system of FIG. 53. FIGS. 55A through 55D show aberrations occurred when the lens arrangement of the soft-focus lens system of FIG. 53 is switched to the soft-focus photographing mode, while an object at infinity is in an in-focus state. FIGS. 56A through 56D show coma occurred when the lens arrangement of the soft-focus lens system of FIG. 53 is switched to the soft-focus photographing mode, while an object at infinity is in an in-focus state. Table 14 shows the numerical data of the fourteenth embodiment. Unlike the tenth to thirteenth embodiments, the focusing lens group 30 of the fourteenth embodiment is constituted by the five lens elements. In other words, surface Nos. 1 through 6 define the master lens group 10, surface Nos. 7 through 16 define the focusing lens group 30, and surface Nos. 17 through 20 define the soft-focus lens group 20. The numerals corresponding to surface 'd16' and 'd18' indicate the states where an object at infinity is focused in the normal photographing mode and the soft-focus photographing mode, respectively. The diaphragm S is provided 1.24 from the lens surface No. 10 toward the image.

TABLE 14

$F_{NO} = 1:2.9$
f = 85.72 - 85.17
$f_R$ = 39.00 - 44.87

| Surface No. | r | d | Nd | vd |
|---|---|---|---|---|
| 1 | 50.997 | 4.74 | 1.72000 | 50.2 |
| 2 | 126.624 | 0.07 | — | — |
| 3 | 40.877 | 3.14 | 1.58913 | 61.2 |
| 4 | 48.432 | 3.00 | — | — |
| 5 | 116.935 | 2.63 | 1.69895 | 30.1 |
| 6 | 38.936 | 8.03 | — | — |

TABLE 14-continued $F_{NO} = 1:2.9$
f = 85.72 - 85.17
$f_R$ = 39.00 - 44.87

| Surface No. | r | d | Nd | vd |
|---|---|---|---|---|
| 7 | 33.504 | 2.63 | 1.48749 | 70.2 |
| 8 | 75.692 | 0.10 | — | — |
| 9 | 30.387 | 3.08 | 1.58913 | 61.2 |
| 10 | 131.641 | 2.62 | — | — |
| 11 | −96.739 | 1.20 | 1.58267 | 46.6 |
| 12 | 26.104 | 6.72 | — | — |
| 13 | 181.133 | 1.20 | 1.80518 | 25.4 |
| 14 | 42.719 | 0.43 | — | — |
| 15 | 42.095 | 6.43 | 1.83400 | 37.2 |
| 16 | −55.486 | 10.21-1.93 | — | — |
| 17 | −37.977 | 3.19 | 1.80610 | 40.9 |
| 18 | −26.029 | 3.57-5.99 | — | — |
| 19 | −23.511 | 1.19 | 1.60717 | 40.3 |
| 20 | −75.295 | — | — | — |

FIGS. 57 through 92 show the fifteenth through twenty-first embodiments of the soft-focus lens system.

Unlike the soft-focus lens system of the first to fourteenth embodiments, the soft-focus lens system of the fifteenth through twenty-first embodiments utilizes both field curvature and spherical aberration to obtain the effects of soft-focusing. Specifically, field curvature is arranged to be occurred in the master lens group 10, and spherical aberration is arranged to be occurred in the soft-focus lens group 20. Accordingly, the master lens group 10 can be defined as a field-curvature varying lens group, and the soft-focus lens group 20 can be defined as a spherical-aberration varying lens group.

Figure 92:
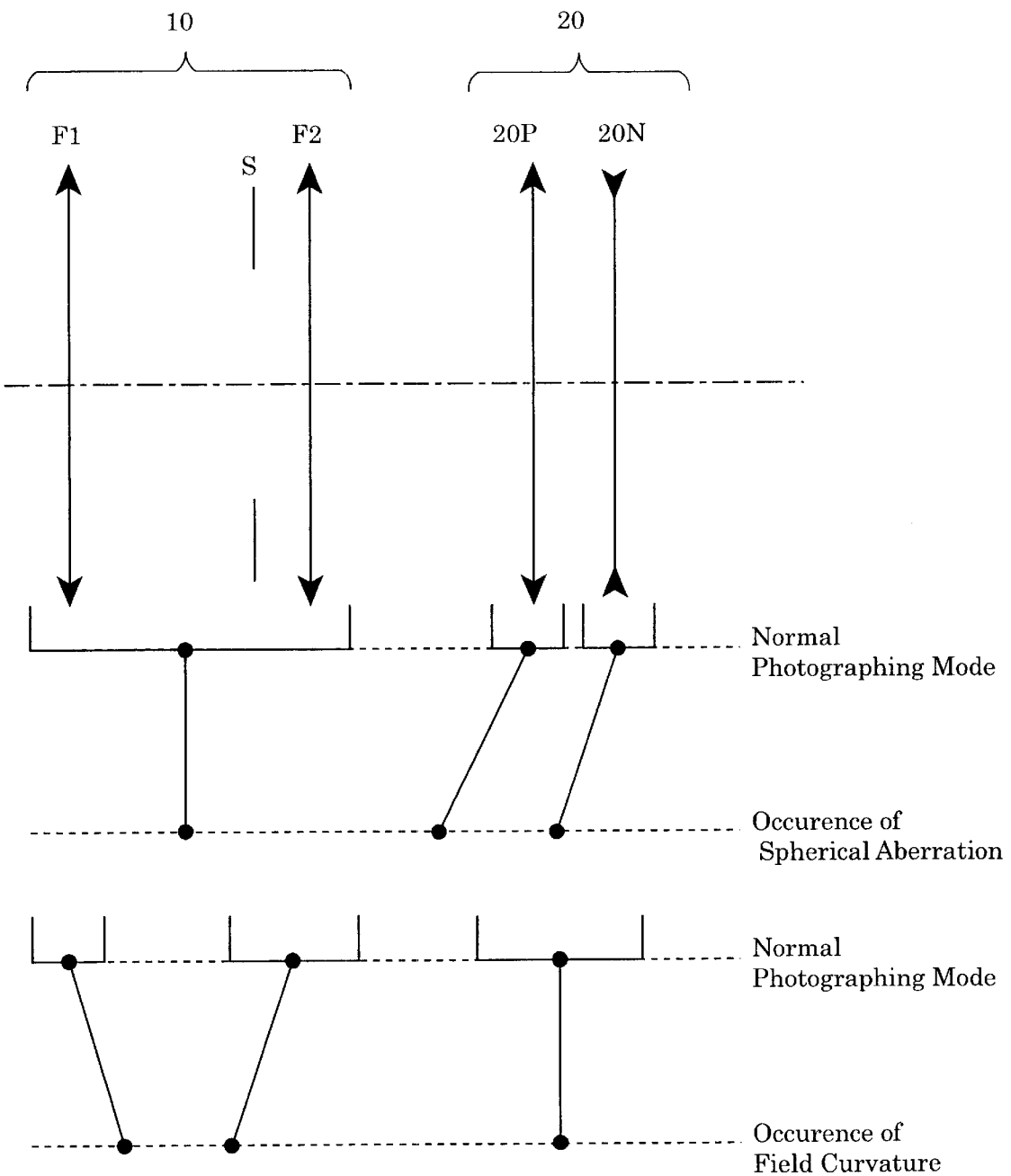
FIG. 92 shows a general arrangement of the lens groups of the soft-focus lens system according to the fifteenth through twenty-first embodiments.

As shown in FIG. 92, the soft-focus lens system of the fifteenth through twenty-first embodiments includes a positive master lens group (field-curvature varying lens group) 10 and a negative soft-focus lens group (spherical-aberration varying lens group) 20, in this order from the object. The master lens group 10 includes a first sub lens group F1, a second sub lens group F2, and the diaphragm S provided therebetween. The soft-focus lens group 20 includes a moveable positive sub lens group 20P (positive sub lens group) and a moveable negative sub lens group 20N (hereinafter, negative sub lens group), each of which is moveable with respect to the master lens group 10. Note the combined power of the master lens group 10 and the soft-focus lens group 20 is positive.

Both the first sub lens group F1 and the second sub lens group F2 have positive power. The diaphragm S is arranged to move together with the second sub lens group F2 when the normal photographing mode is switched to the soft-focus photographing mode, or vice versa. The normal photographing mode and the soft-focus photographing mode are set by respectively moving the positive sub lens group 20P and the negative sub lens group 20N along different moving paths with respect to the master lens group 10; and/or by respectively moving the positive first sub lens group F1 and the positive second sub lens group F2 of the master lens group 10.

The moving pattern of the soft-focus lens group 20 is the same as that of the first through fourteenth embodiments.

Here, a moving pattern of the positive first sub lens group F1 and the positive second sub lens group F2, in which the normal photographing mode is defined as an initial state, is explained as follows:

(i) when the normal photographing mode is switched to the soft-focus photographing mode in which larger field curvature is occurred than in the normal photographing mode, the positive first sub lens group F1 moves toward the image, and (ii) the positive second sub lens group F2 moves toward the object, or remains stationary.

According to the above moving pattern, the distance between the positive first sub lens group F1 and the positive second sub lens group F2 is made shorter, so that field curvature largely occurs in the negative direction. As a result, the effects of soft-focusing can be obtained. The change of the focal point due to the movement of the positive first and second sub lens groups F1 and F2 is corrected by moving the entire master lens group 10 in the optical axis direction.

Either one of the effects of soft-focusing obtained by the positive first and second sub lens groups F1 and F2 of the master lens group 10, and the effects of soft-focusing obtained by the positive and negative sub lens groups 20P and 20N of the soft-focus lens group 20 can be utilized, or both effects can be utilized at the same time.

Accordingly, in the soft-focus photographing mode of the fifteenth through twenty-first embodiments, the following states are specifically defined:

(i) a spherical-aberration occurring state in which only the positive sub lens group 20P and the negative sub lens group 20N of the soft-focus lens group 20 function to obtain the effects of soft-focusing, i.e., these sub lens groups are arranged to generate larger spherical aberration than in the normal photographing mode, while the positive first sub lens group F1 and the positive second sub lens group F2 of the master lens group 10 do not function to obtain the effects of soft-focusing; and (ii) a field-curvature occurring state in which only the positive first sub lens group F1 and the positive second sub lens group F2 of the master lens group 10 function to obtain the effects of soft-focusing, i.e., these sub lens groups are arranged to generate larger field curvature than in the normal photographing mode, while the positive sub lens group 20P and the negative sub lens group 20N of the soft-focus lens group 20 do not function to obtain the effects of soft-focusing.

In the fifteenth through twenty-first embodiments shown in FIGS. 57, 62, 67, 72, 77, 82 and 87, the master lens group (field-curvature varying lens group) 10 and the soft-focus lens group (spherical-aberration varying lens group) 20 are arranged in this order from the object; the master lens group 10 includes a positive first sub lens group F1 (hereinafter, positive first sub lens group 11) and a positive second sub lens group F2 (hereinafter, positive second sub lens group 12) are arranged in this order from the object; the diaphragm S, which is provided between the positive first and second sub lens groups 11 and 12, is mounted on the positive second sub lens group 12. The soft-focus lens group 20 includes the positive sub lens group 20P and the negative sub lens group 20N, which are arranged, in this order from the object. The positive sub lens groups 20P includes a positive single lens element, and the negative sub lens group 20N includes a negative single lens element; and these lens elements are arranged to form an air lens therebetween having a shape of a meniscus lens element with the concave surface facing toward the diaphragm S.

The function of the air lens and the effects thereof are the same as that of the first through fourteenth embodiments.

Here, it is noted that the equations for indicating the advantage of the first through the ninth embodiment, i.e., the photographing modes can be changed without causing the changes of the focal point and focal length, can also be applied to the fifteenth through twenty-first embodiments.

In order to vary field curvature, a predetermined lens group is generally moved along the optical axis so that the incident angle of an off-axis light ray with respect to a lens surface varies. On the other hand, if an attempt is made to move the above predetermined lens group having an incident surface which is convex with respect to the diaphragm, the incident angle largely varies when the predetermined lens group with the convex incident surface moves. As a result, larger field curvature can be obtained with a shorter traveling distance of predetermined lens group.

In the fifteenth through twenty-first embodiments, the positive first sub lens group 11 is arranged to move along the optical axis in order to vary field curvature. In the positive first sub lens group 11, the incident surface which is convex with respect to the diaphragm S corresponds to the object-side surface of the most image-side lens element. It should be noted that if the bundles of light rays before and behind a lens group to be moved are substantially afocal, the change of spherical aberration due to the movement of the lens group is small, and only field curvature can be occurred. Moreover, the change of the focal point due to the movement of the lens group is small, so that there is no need to correct the change of the focal point by moving other lens groups.

Condition (5) is for optimizing the power of the positive first sub lens group 11.

If $|f/fF1|$ exceeds the upper limit of condition (5), the power of the positive first sub lens group 11 becomes too strong, so that not only field curvature, but also spherical aberration varies due to the movement of the positive first sub lens group 11. Consequently, field curvature cannot independently be adjusted.

Condition (6) is for optimizing the radius of curvature of the object-side surface of the most image-side lens element (i.e., the lens element closest to the diaphragm S) in the positive first sub lens group 11, in order to obtain sufficient field curvature by moving the positive first sub lens group 11, i.e., this condition is for optimizing the radius of curvature of the object-side surface.

If the radius of curvature of the object-side surface becomes too much convex with respect to the diaphragm S to the extent that f/rA exceeds the lower limit of condition (6), field curvature largely occurs according to the movement of the positive first sub lens group 11; however, spherical aberration occurred in the normal photographing mode cannot be corrected by the remaining lens system behind the positive first sub lens group 11.

If the radius of curvature of the object-side surface becomes too much concave with respect to the diaphragm S, to the extent that f/rA exceeds the upper limit of condition (6), the change of field curvature according to the movement of the positive first sub lens group 11 becomes smaller.

Condition (7) specifies a space in which the positive first sub lens group 11 can be moved in order to obtain sufficient field curvature, when condition (6) is satisfied.

If the distance between the positive first sub lens group 11 and the positive second sub lens group 12 becomes longer to the extent that dF12/f exceeds the upper limit of condition (7), there is still a possibility that the change of field curvature can be made larger; however, filed curvature in the normal photographing mode becomes too large. As a result, such a large filed curvature cannot be corrected by the remaining lens system behind the positive first sub lens group 11.

If dF12/f exceeds the lower limit of condition (7), the space in which the positive first sub lens group 11 can be moved becomes smaller, so that it is difficult to obtain the sufficient change of field curvature, while condition (6) is satisfied.

Embodiment 15

Figure 57:
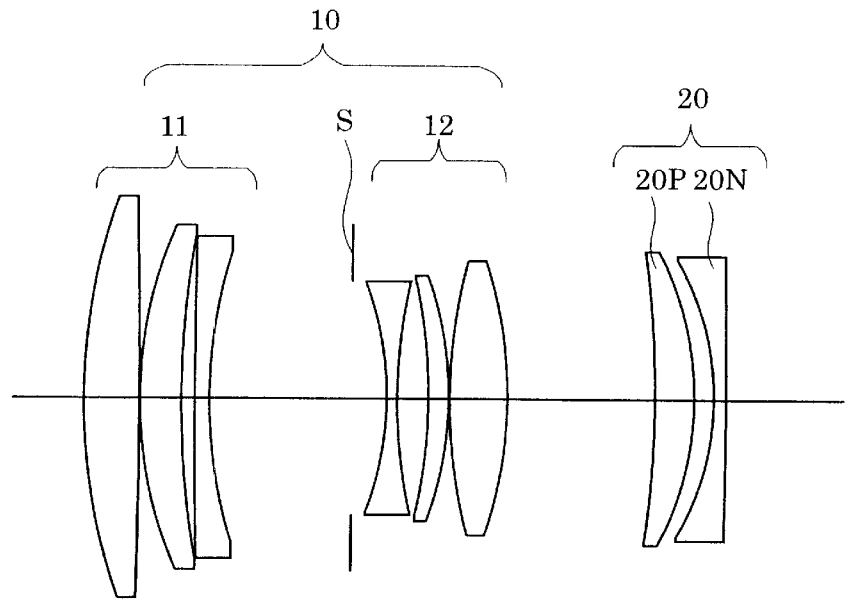
FIG. 57 shows the lens arrangement of a soft-focus lens system according to a fifteenth embodiment in the normal photographing mode, when an object at infinity is in an in-focus state.
Figures 58A, 58B, 58C, 58D:
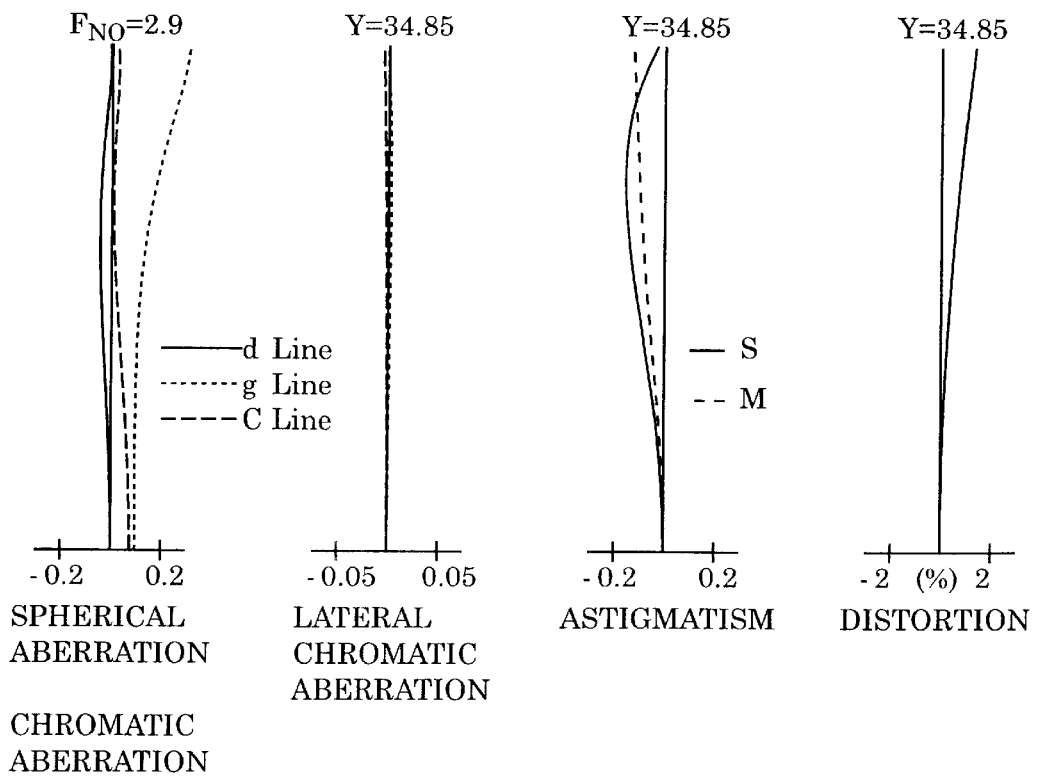
FIGS. 58A, 58B, 58C and 58D show aberrations occurred in the soft-focus lens system of FIG. 57.
Figure 61A:
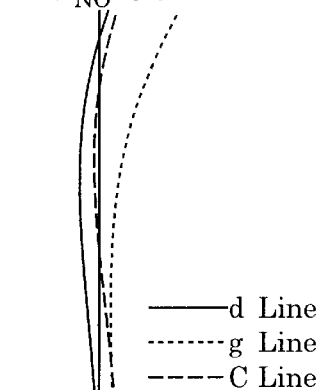
FIGS. 61A, 61B, 61C and 61D show aberrations occurred, when the lens arrangement of the master lens group (field-curvature varying lens group) in FIG. 57 s switched to the soft-focus photographing mode, while n object at infinity is in an in-focus state.
Figure 61B:
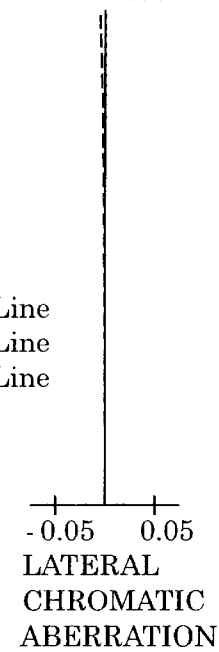
Figure 61C:
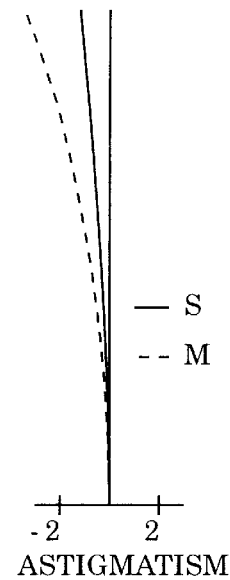
Figure 61D:
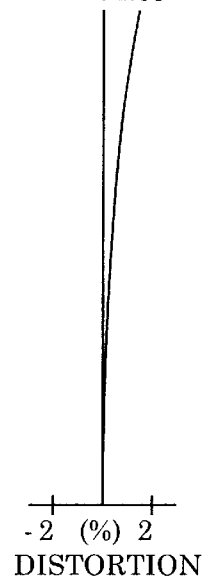
Figure 66A:
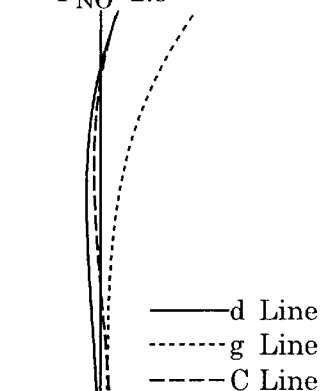
FIGS. 66A, 66B, 66C and 66D show aberrations occurred when the lens arrangement of the master lens group (field-curvature varying lens group) in FIG. 62 is switched to the soft-focus photographing mode, while an object at infinity is in an in-focus state.
Figure 66B:
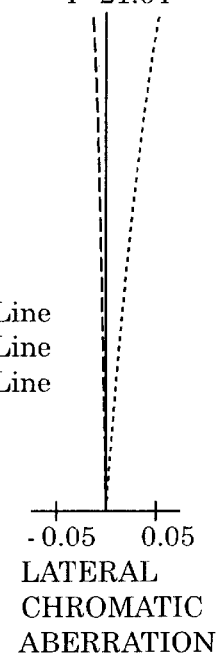
Figure 66C:
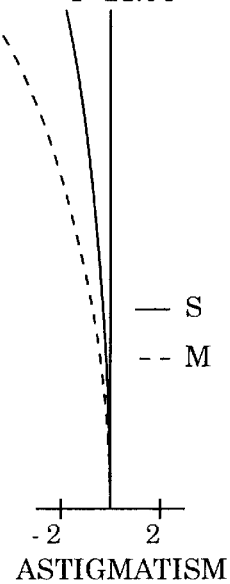
Figure 66D:
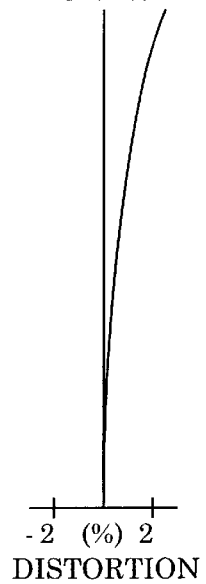
Figures 64A, 64B, 64C, 64D:
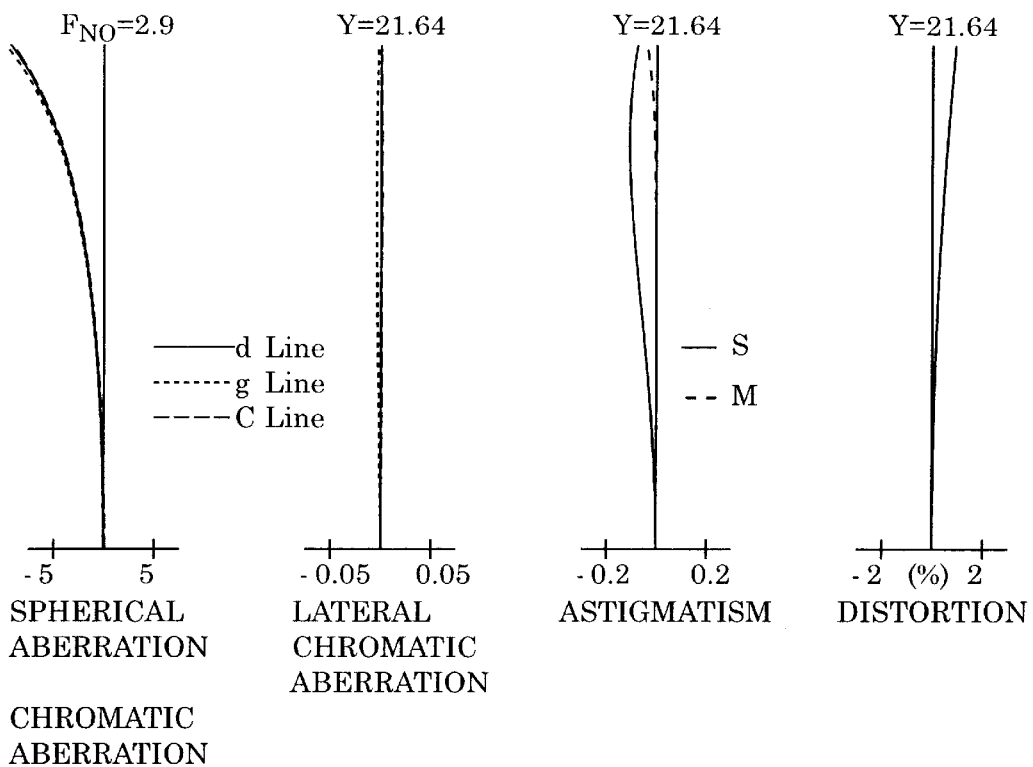
FIGS. 64A, 64B, 64C and 64D show aberrations occurred, when the lens arrangement of the soft-focus lens group (spherical-aberration varying lens group) in FIG. 62 is switched to the soft-focus photographing mode, while an object at infinity is in an in-focus state.
Figure 65A:
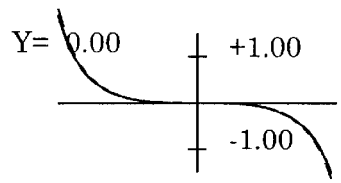
FIGS. 65A, 65B, 65C and 65D show coma occurred when the lens arrangement of the soft-focus lens group (spherical-aberration varying lens group) in FIG. 62 is switched to the soft-focus photographing mode, while an object at infinity is in an in-focus state.
Figure 65B:
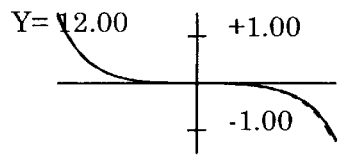
Figure 65C:
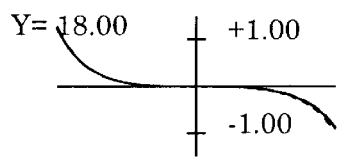
Figure 65D:
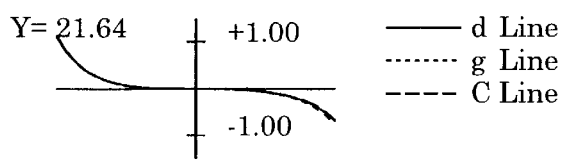

FIGS. 57 through 61D show the fifteenth embodiment of the soft-focus lens system. FIG. 57 shows the lens arrangement of the soft-focus lens system in the normal photographing mode, when an object at infinity is in an in-focus state. FIGS. 58A through 58D show aberrations occurred in the soft-focus lens system of FIG. 57. FIGS. 59A through 59D show aberrations occurred when the lens arrangement of the soft-focus lens group (spherical-aberration varying lens group) 20 of FIG. 57 is switched to the soft-focus photographing mode (spherical-aberration occurring state), while an object at infinity is in an in-focus state. FIGS. 60A through 60D show coma occurred when the lens arrangement of the soft-focus lens group (spherical-aberration varying lens group) 20 of FIG. 57 is switched to the soft-focus photographing mode (spherical-aberration occurring state), while an object at infinity is in an in-focus state. FIGS. 61A through 61D show aberrations occurred when the lens arrangement of the master lens group (field-curvature varying lens group) 10 of FIG. 57 is switched to the soft-focus photographing mode (field-curvature occurring state), while an object at infinity is in an in-focus state.

Table 15 shows the numerical data of the fifteenth embodiment. The numerals corresponding to 'd6', 'd12' and 'd14' indicate the distance between the lens elements in (i) the normal photographing mode when an object at infinity is in an in-focus state, (ii) the spherical-aberration occurring state when an object at infinity is in an in-focus state, and (iii) the field-curvature occurring state when an object at infinity is in an in-focus state, in this order from the left. Likewise, each of the three numerals of $F_{NO}$, f and $f_B$ indicate the values thereof corresponding to the normal photographing mode, the spherical-aberration occurring state and the field-curvature occurring state, respectively.

Surface Nos. 1 through 12 define the master lens group (field-curvature varying lens group) 10. Surface Nos. 1 through 6 define the positive first sub lens group 11, and surface Nos. 7 through 12 define the positive second sub lens group 12. Surface Nos. 13 through 16 define the soft-focus lens group (spherical-aberration varying lens group) 20. Surface Nos. 13 through 14 define the positive sub lens group 20P, and surface Nos. 15 through 16 define the negative sub lens group 20N. Focusing an object at a close distance is carried out by moving the master lens group 10 toward the object. The diaphragm S is provided 4.87 from the surface No. 7 toward the object.

TABLE 15

$F_{NO}$ = 1:2.9 - 2.9 - 3.0
f = 123.31 - 122.56 - 119.04
w = 15.58 - 15.76 - 16.10
$f_B$ = 59.13 - 73.71 - 59.11

| Surface No. | r | d | Nd | vd |
|---|---|---|---|---|
| 1 | 83.484 | 7.70 | 1.61800 | 63.4 |
| 2 | −1080.030 | 0.10 | — | — |
| 3 | 59.633 | 5.78 | 1.61800 | 63.4 |
| 4 | 132.321 | 1.84 | — | — |
| 5 | 1123.680 | 2.04 | 1.63980 | 34.5 |
| 6 | 67.000 | 24.70-24.70-16.70 | — | — |
| 7 | −44.744 | 1.50 | 1.54072 | 47.2 |
| 8 | 72.000 | 4.37 | — | — |

TABLE 15-continued $F_{NO}$ = 1:2.9 - 2.9 - 3.0
f = 123.31 - 122.56 - 119.04
w = 15.58 - 15.76 - 16.10
$f_B$ = 59.13 - 73.71 - 59.11

| Surface No. | r | d | Nd | vd |
|---|---|---|---|---|
| 9 | −72.950 | 2.82 | 1.77250 | 49.6 |
| 10 | −49.229 | 0.10 | — | — |
| 11 | 75.000 | 7.98 | 1.59240 | 68.3 |
| 12 | −60.000 | 20.50-3.61-23.39 | — | — |
| 13 | −144.000 | 5.46 | 1.77250 | 49.6 |
| 14 | −43.709 | 2.74-5.04-2.74 | — | — |
| 15 | −37.980 | 1.70 | 1.66672 | 48.3 |
| 16 | −1020.662 | — | — | — |

Embodiment 16

FIGS. 62 through 66D show the sixteenth embodiment of the soft-focus lens system. FIG. 62 shows the lens arrangement of the soft-focus lens system in the normal photographing mode, when an object at infinity is in an in-focus state. FIGS. 63A through 63D show aberrations occurred in the soft-focus lens system of FIG. 62. FIGS. 64A through 64D show aberrations occurred when the lens arrangement of the soft-focus lens group (spherical-aberration varying lens group) 20 of FIG. 62 is switched to the soft-focus photographing mode (spherical-aberration occurring state), while an object at infinity is in an in-focus state. FIGS. 65A through 65D show coma occurred when the lens arrangement of the soft-focus lens group (spherical-aberration varying lens group) 20 of FIG. 62 is switched to the soft-focus photographing mode (spherical-aberration occurring state), while an object at infinity is in an in-focus state. FIGS. 66A through 66D show aberrations occurred when the lens arrangement of the master lens group (filed-curvature varying lens group) 10 of FIG. 62 is switched to the soft-focus photographing mode (filed-curvature occurring state), while an object at infinity is in an in-focus state. Table 16 shows the numerical data of the sixteenth embodiment. The basic lens arrangement is the same as the fifteenth embodiment. The diaphragm S is provided 1.57 from the surface No. 7 toward the object.

TABLE 16

$F_{NO}$ = 1:2.9 - 2.9 - 2.9
f = 85.29 - 84.83 - 84.98
w = 14.04 - 14.19 - 13.95
$f_B$ = 39.00 - 49.70 - 39.01

| Surface No. | r | d | Nd | vd |
|---|---|---|---|---|
| 1 | 61.471 | 6.85 | 1.59240 | 68.3 |
| 2 | −199.032 | 0.64 | — | — |
| 3 | 45.274 | 5.00 | 1.49700 | 81.6 |
| 4 | 74.061 | 6.26 | — | — |
| 5 | −54.503 | 2.20 | 1.62588 | 35.7 |
| 6 | 60.762 | 9.24-9.24-3.10 | — | — |
| 7 | −391.546 | 1.00 | 1.53172 | 48.9 |
| 8 | 69.575 | 3.11 | — | — |
| 9 | −43.410 | 2.92 | 1.77250 | 49.6 |
| 10 | −32.903 | 0.10 | — | — |
| 11 | 52.896 | 4.63 | 1.59240 | 68.3 |
| 12 | −71.126 | 16.69-4.30-16.69 | — | — |
| 13 | −129.102 | 4.22 | 1.77250 | 49.6 |
| 14 | −31.271 | 1.91-3.57-1.91 | — | — |
| 15 | −27.022 | 1.70 | 1.67003 | 47.3 |
| 16 | 619.349 | — | — | — |

Embodiment 17

Figure 67:
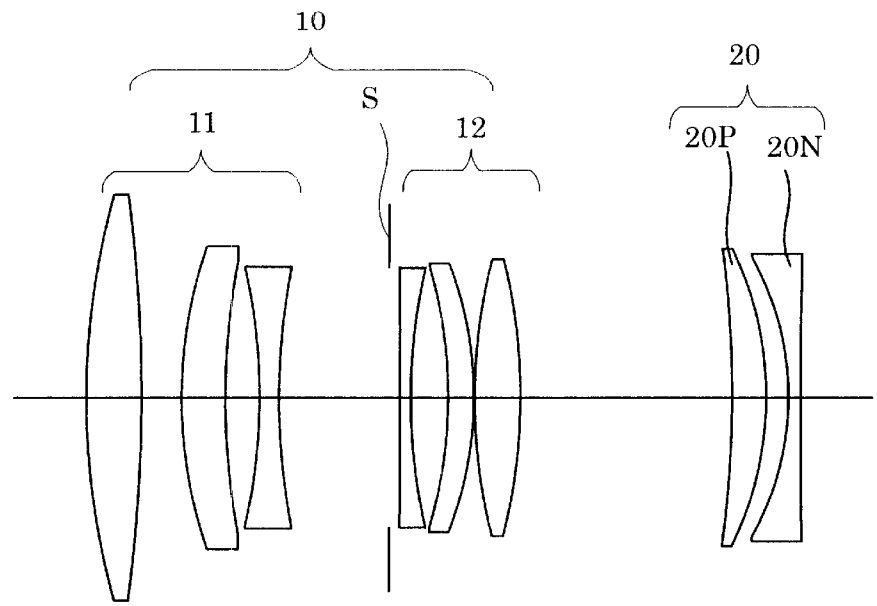
FIG. 67 shows the lens arrangement of a soft-focus lens system according to a seventeenth embodiment in the normal photographing mode, when an object at infinity is n an in-focus state.
Figures 68A, 68B, 68C, 68D:
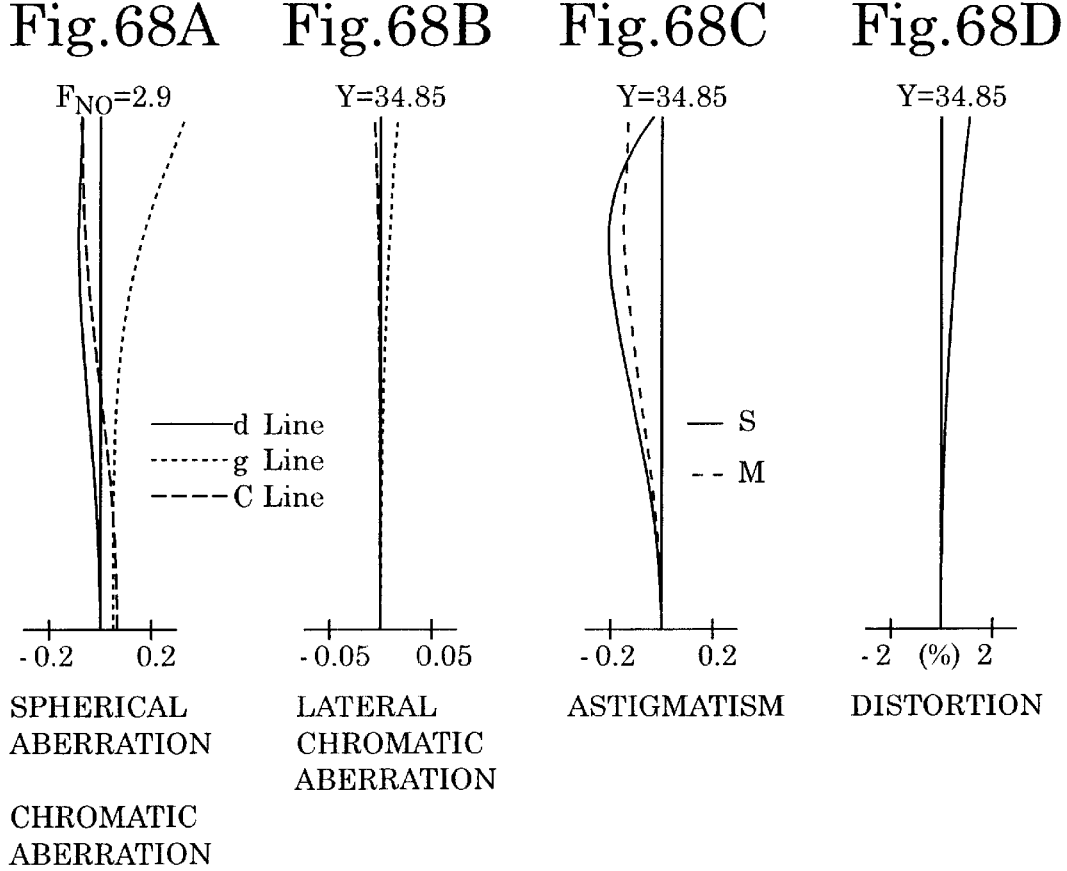
FIGS. 68A, 68B, 68C and 68D show aberrations occurred in the soft-focus lens system of FIG. 67.
Figure 69A:
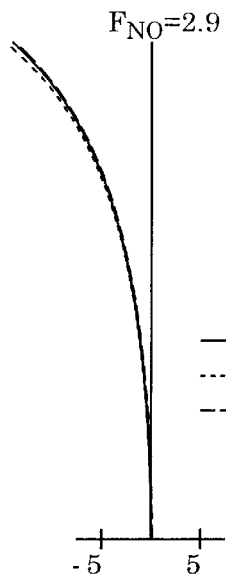
FIGS. 69A, 69B, 69C and 69D show aberrations occurred when the lens arrangement of the soft-focus lens group (spherical-aberration varying lens group) in FIG. 67 is switched to the soft-focus photographing mode, while an object at infinity is in an in-focus state.
Figure 69B:
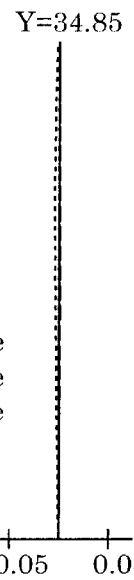
Figure 69C:
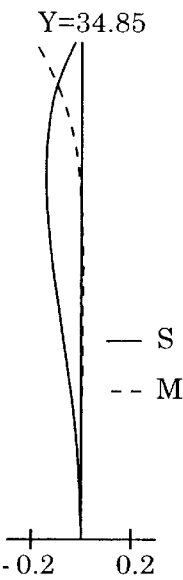
Figure 69D:
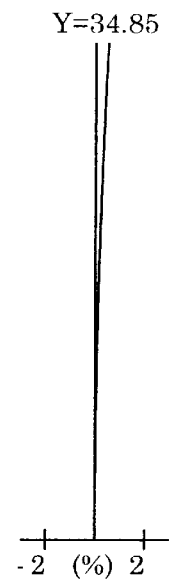
Figure 70A:
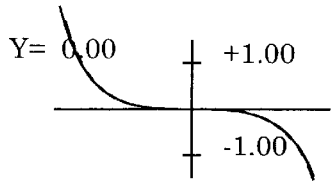
FIGS. 70A, 70B, 70C and 70D show coma occurred when the soft-focus lens group (spherical-aberration varying lens group) in FIG. 67 is switched to the soft-focus photographing mode, while an object at infinity is in an in-focus state.
Figure 70B:
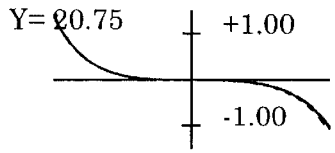
Figure 70C:
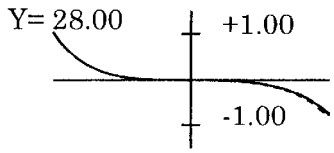
Figure 70D:
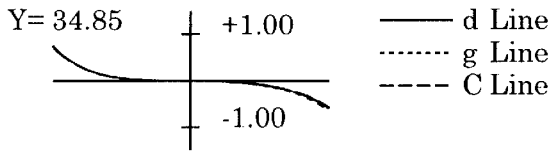
Figures 71A, 71B, 71C, 71D:
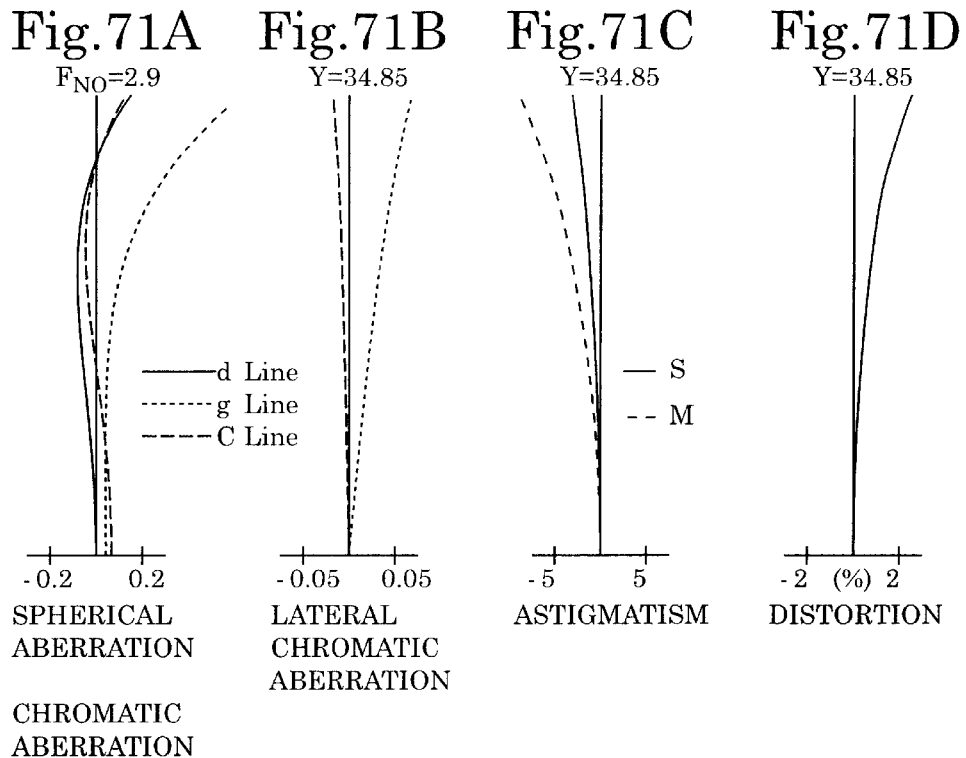
FIGS. 71A, 71B, 71C and 71D show aberrations occurred when the lens arrangement of the master lens group (field-curvature varying lens group) in FIG. 67 is switched to the soft-focus photographing mode, while an object at infinity is in an in-focus state.
Figures 76A, 76B, 76C, 76D:
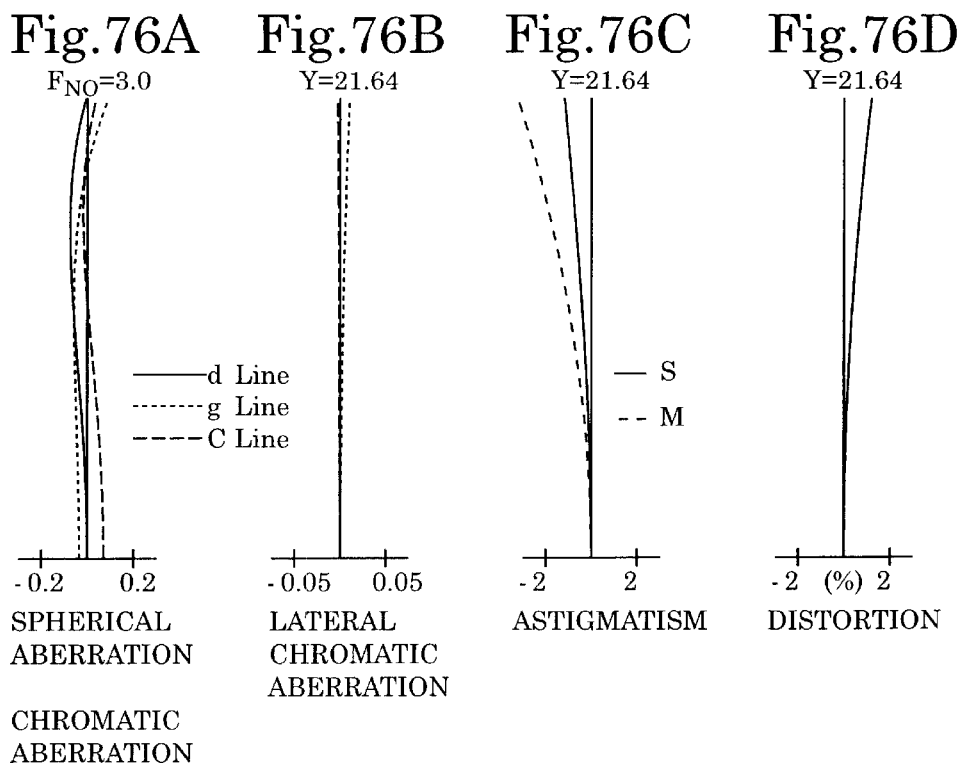
FIGS. 76A, 76B, 76C and 76D show aberrations occurred when the lens arrangement of the master lens group (field-curvature varying lens group) in FIG. 72 is switched to the soft-focus photographing mode, while an object at infinity is in an in-focus state.

FIGS. 67 through 71D show the seventeenth embodiment of the soft-focus lens system. FIG. 67 shows the lens arrangement of the soft-focus lens system in the normal photographing mode, when an object at infinity is in an in-focus state. FIGS. 68A through 68D show aberrations occurred in the soft-focus lens system of FIG. 67. FIGS. 69A through 69D show aberrations occurred when the lens arrangement of the soft-focus lens group (spherical-aberration varying lens group) 20 of FIG. 67 is switched to the soft-focus photographing mode (spherical-aberration occurring state), while an object at infinity is in an in-focus state. FIGS. 70A through 70D show coma occurred when the lens arrangement of the soft-focus lens group (spherical-aberration varying lens group) 20 of FIG. 67 is switched to the soft-focus photographing mode (spherical-aberration occurring state), while an object at infinity is in an in-focus state. FIGS. 71A through 71D show aberrations occurred when the lens arrangement of the master lens group (filed-curvature varying lens group) 10 of FIG. 67 is switched to the soft-focus photographing mode (filed-curvature occurring state), while an object at infinity is in an in-focus state. Table 17 shows the numerical data of the seventeenth embodiment. The basic lens arrangement is the same as the fifteenth embodiment. The diaphragm S is provided 1.48 from the surface No. 7 toward the object.

TABLE 17

$F_{NO} = 1:2.9 - 2.9 - 2.9$
$f = 124.12 - 123.56 - 123.76$
$w = 15.52 - 15.68 - 15.36$
$f_B = 58.99 - 75.54 - 59.00$

| Surface No. | r | d | Nd | vd |
|---|---|---|---|---|
| 1 | 103.993 | 7.61 | 1.59240 | 68.3 |
| 2 | −210.005 | 5.49 | — | — |
| 3 | 63.688 | 6.00 | 1.59240 | 68.3 |
| 4 | 100.064 | 4.72 | — | — |
| 5 | −79.098 | 2.68 | 1.62973 | 40.2 |
| 6 | 95.308 | 16.53-16.53-7.90 | — | — |
| 7 | −2042.561 | 1.50 | 1.57024 | 40.9 |
| 8 | 79.641 | 5.13 | — | — |
| 9 | −63.539 | 3.50 | 1.77250 | 49.6 |
| 10 | −51.847 | 0.10 | — | — |
| 11 | 77.423 | 6.23 | 1.59240 | 68.3 |
| 12 | −79.423 | 29.10-9.75-29.10 | — | — |
| 13 | −152.006 | 4.72 | 1.77250 | 49.6 |
| 14 | −46.354 | 3.02-5.79-3.02 | — | — |
| 15 | −39.317 | 1.70 | 1.61641 | 46.2 |
| 16 | 1037.828 | — | — | — |

Embodiment 18

Figure 72:
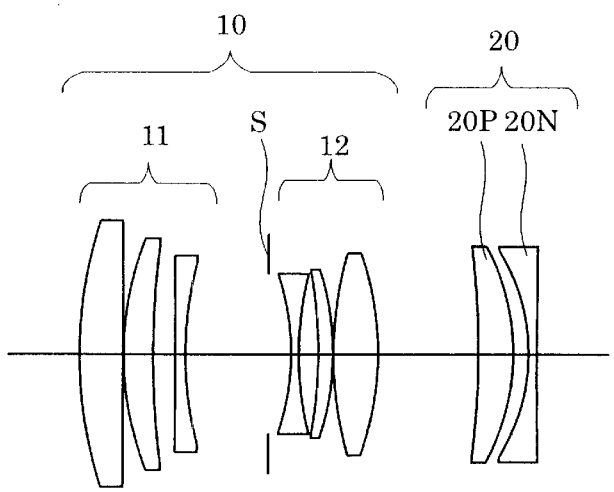
FIG. 72 shows the lens arrangement of a soft-focus lens system according to an eighteenth embodiment in the normal photographing mode, when an object at infinity is in an in-focus state.
Figures 73A, 73B, 73C, 73D:
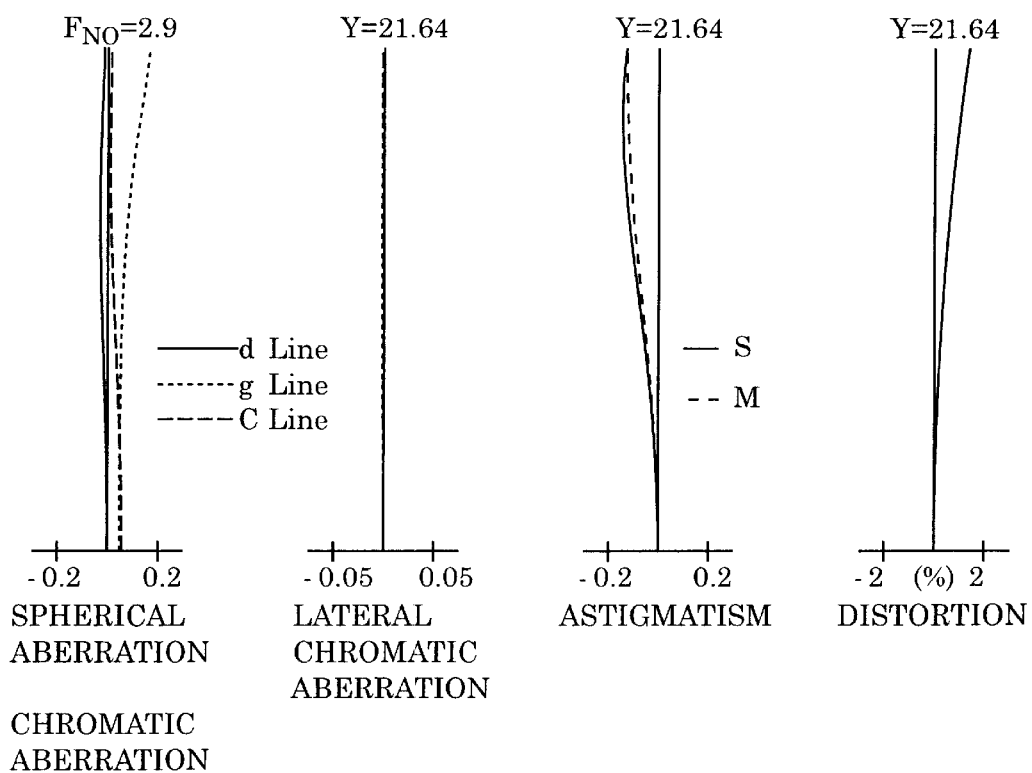
FIGS. 73A, 73B, 73C and 73D show aberrations occurred in the soft-focus lens system of FIG. 72.
Figure 74A:
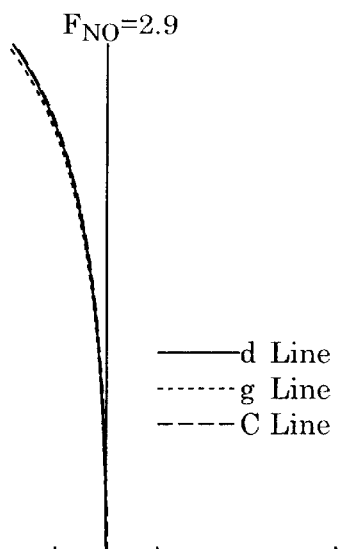
FIGS. 74A, 74B, 74C and 74D show aberrations occurred when the lens arrangement of the soft-focus lens group (spherical-aberration varying lens group) in FIG. 72 is switched to the soft-focus photographing mode, while an object at infinity is in an in-focus state.
Figure 74B:
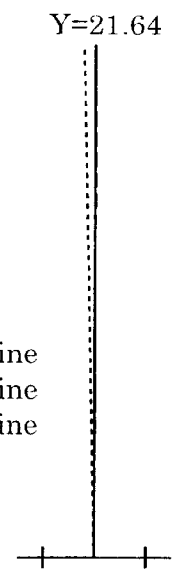
Figure 74C:
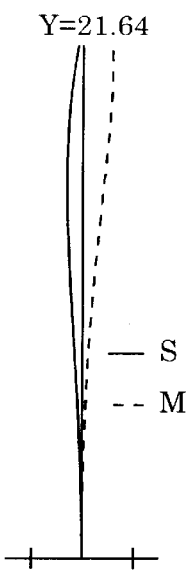
Figure 74D:
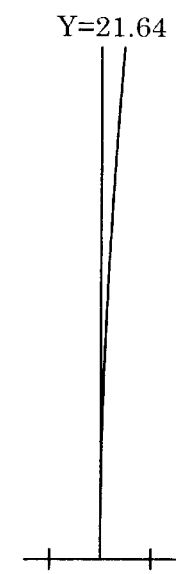
Figure 75A:
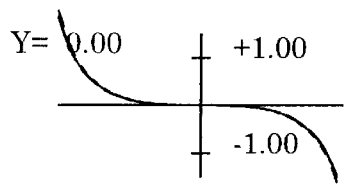
FIGS. 75A, 75B, 75C and 75D show coma occurred when the lens arrangement of the soft-focus lens group (spherical-aberration varying lens group) in FIG. 72 is switched to the soft-focus photographing mode, while an object at infinity is in an in-focus state.
Figure 75B:
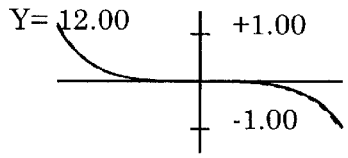
Figure 75C:
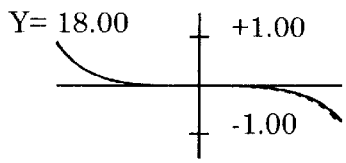
Figure 75D:
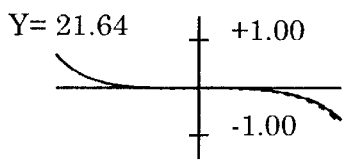

FIGS. 72 through 76D show the eighteenth embodiment of the soft-focus lens system. FIG. 72 shows the lens arrangement of the soft-focus lens system in the normal photographing mode, when an object at infinity is in an in-focus state. FIGS. 73A through 73D show aberrations occurred in the soft-focus lens system of FIG. 72. FIGS. 74A through 74D show aberrations occurred when the lens arrangement of the soft-focus lens group (spherical-aberration varying lens group) 20 of FIG. 72 is switched to the soft-focus photographing mode (spherical-aberration occurring state), while an object at infinity is in an in-focus state. FIGS. 75A through 75D show coma occurred when the lens arrangement of the soft-focus lens group (spherical-aberration varying lens group) 20 of FIG. 72 is switched to the soft-focus photographing mode (spherical-aberration occurring state), while an object at infinity is in an in-focus state. FIGS. 76A through 76D show aberrations occurred when the lens arrangement of the master lens group (filed-curvature varying lens group) 10 of FIG. 72 is switched to the soft-focus photographing mode (filed-curvature occurring state), while an object at infinity is in an in-focus state. Table 18 shows the numerical data of the eighteenth embodiment. The basic lens arrangement is the same as the fifteenth embodiment. The diaphragm S is provided 3.18 from the surface No. 7 toward the object.

TABLE 18

$F_{NO} = 1:2.9 - 2.9 - 3.0$
$f = 85.00 - 84.64 - 80.54$
$w = 14.10 - 14.22 - 14.87$
$f_B = 39.00 - 50.41 - 39.00$

| Surface No. | r | d | Nd | vd |
|---|---|---|---|---|
| 1 | 61.341 | 6.00 | 1.61800 | 63.4 |
| 2 | −2681.074 | 0.07 | — | — |
| 3 | 43.585 | 4.18 | 1.61800 | 63.4 |
| 4 | 125.938 | 3.07 | — | — |
| 5 | −1567.212 | 1.40 | 1.67722 | 31.6 |
| 6 | 50.625 | 14.79-14.79-6.07 | — | — |
| 7 | −33.811 | 1.03 | 1.54141 | 50.9 |
| 8 | 46.885 | 2.75 | — | — |
| 9 | −62.036 | 2.06 | 1.77250 | 49.6 |
| 10 | −37.690 | 0.07 | — | — |
| 11 | 51.724 | 6.26 | 1.59240 | 68.3 |
| 12 | −42.630 | 14.09-1.00-16.80 | — | — |
| 13 | −120.794 | 4.89 | 1.77250 | 49.6 |
| 14 | −31.503 | 2.10-3.78-2.10 | — | — |
| 15 | −27.510 | 1.17 | 1.66672 | 48.3 |
| 16 | 1066.200 | — | — | — |

Embodiment 19

Figure 77:
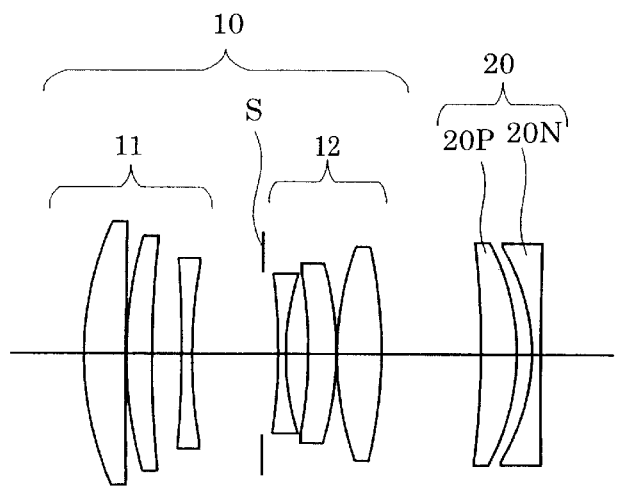
FIG. 77 shows the lens arrangement of a soft-focus lens system according to a nineteenth embodiment in the normal photographing mode, when an object at infinity is in an in-focus state.
Figure 78A:
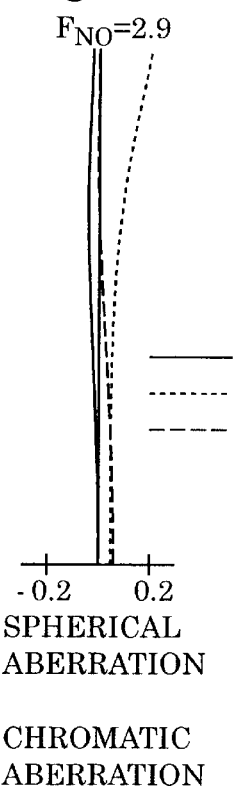
FIGS. 78A, 78B, 78C and 78D show aberrations occurred in the soft-focus lens system of FIG. 77.
Figure 78B:
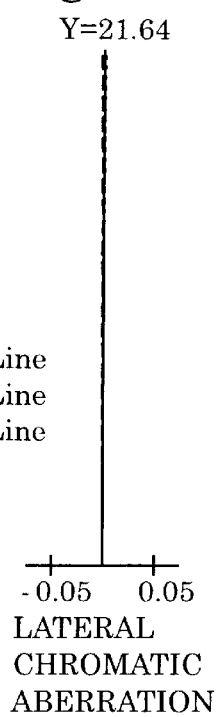
Figure 78C:
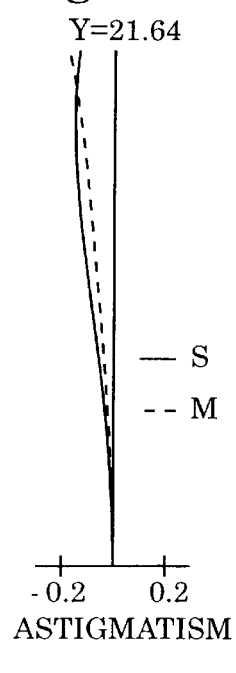
Figure 78D:
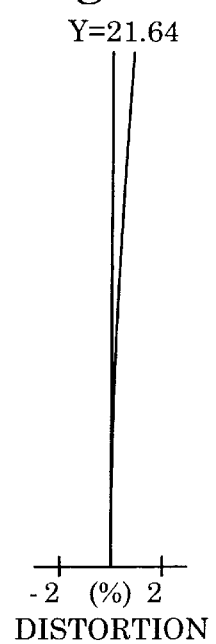
Figure 91A:
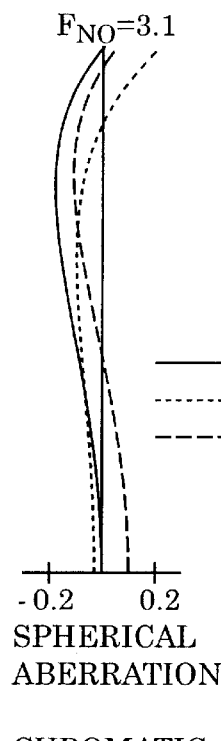
FIGS. 91A, 91B, 91C and 91D show aberrations occurred when the lens arrangement of the master lens group (field-curvature varying lens group) in FIG. 87 is switched to the soft-focus photographing mode, while an object at infinity is in an in-focus state.
Figure 91B:
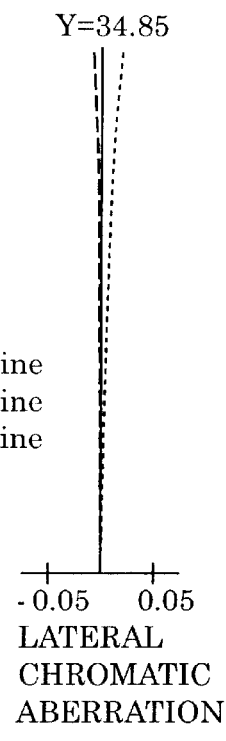
Figure 91C:
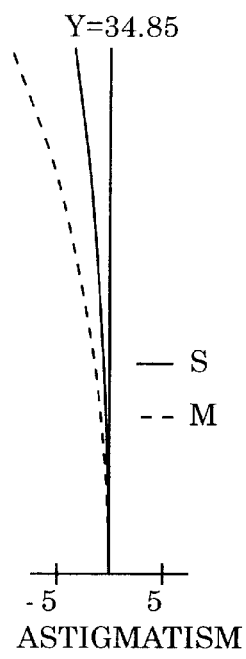
Figure 91D:
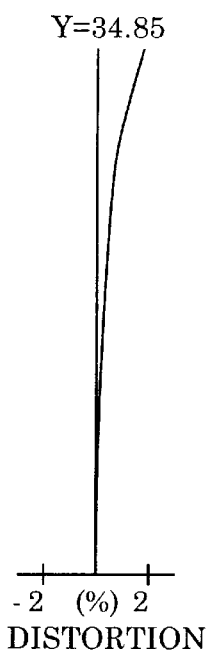

FIGS. 77 through 81D show the nineteenth embodiment of the soft-focus lens system. FIG. 77 shows the lens arrangement of the soft-focus lens system in the normal photographing mode, when an object at infinity is in an in-focus state. FIGS. 78A through 78D show aberrations occurred in the soft-focus lens system of FIG. 77. FIGS. 79A through 79D show aberrations occurred when the lens arrangement of the soft-focus lens group (spherical-aberration varying lens group) 20 of FIG. 77 is switched to the soft-focus photographing mode (spherical-aberration occurring state), while an object at infinity is in an in-focus state. FIGS. 80A through 80D show coma occurred when the lens arrangement of the soft-focus lens group (spherical-aberration varying lens group) 20 of FIG. 77 is switched to the soft-focus photographing mode (spherical-aberration occurring state), while an object at infinity is in an in-focus state. FIGS. 81A through 81D show aberrations occurred when the lens arrangement of the master lens group (filed-curvature varying lens group) 10 of FIG. 77 is switched to the soft-focus photographing mode (filed-curvature occurring state), while an object at infinity is in an in-focus state. Table 19 shows the numerical data of the nineteenth embodiment. The basic lens arrangement is the same as the fifteenth embodiment. The diaphragm S is provided 2.16 from the surface No. 7 toward the object.

TABLE 19

$F_{NO} = 1:2.9 - 2.9 - 3.0$
$f = 85.00 - 84.63 - 80.66$
$w = 14.17 - 14.29 - 14.87$
$f_B = 39.00 - 49.89 - 39.00$

| Surface No. | r | d | Nd | vd |
|---|---|---|---|---|
| 1 | 43.529 | 5.74 | 1.61800 | 63.4 |
| 2 | 1329.322 | 0.10 | — | — |

TABLE 19-continued $F_{NO} = 1:2.9 - 2.9 - 3.0$
$f = 85.00 - 84.63 - 80.66$
$w = 14.17 - 14.29 - 14.87$
$f_B = 39.00 - 49.89 - 39.00$

| Surface No. | r | d | Nd | vd |
|---|---|---|---|---|
| 3 | 57.773 | 3.48 | 1.61800 | 63.4 |
| 4 | 146.924 | 4.07 | — | — |
| 5 | −152.867 | 1.40 | 1.72930 | 30.7 |
| 6 | 69.999 | 11.73-11.73-3.21 | — | — |
| 7 | −78.639 | 1.03 | 1.51700 | 53.2 |
| 8 | 34.758 | 3.12 | — | — |
| 9 | −61.613 | 3.83 | 1.77250 | 49.6 |
| 10 | −43.623 | 0.10 | — | — |
| 11 | 43.469 | 6.04 | 1.59240 | 68.3 |
| 12 | −65.513 | 13.49-1.00-15.98 | — | — |
| 13 | −123.985 | 4.93 | 1.77250 | 49.6 |
| 14 | −31.370 | 2.04-3.64-2.04 | — | — |
| 15 | −27.441 | 1.17 | 1.66672 | 48.3 |
| 16 | 804.045 | — | — | — |

Embodiment 20

FIGS. 82 through 86D show the twentieth embodiment of the soft-focus lens system. FIG. 82 shows the lens arrangement of the soft-focus lens system in the normal photographing mode, when an object at infinity is in an in-focus state. FIGS. 83A through 83D show aberrations occurred in the soft-focus lens system of FIG. 82. FIGS. 84A through 84D show aberrations occurred when the lens arrangement of the soft-focus lens group (spherical-aberration varying lens group) 20 of FIG. 82 is switched to the soft-focus photographing mode (spherical-aberration occurring state), while an object at infinity is in an in-focus state. FIGS. 85A through 85D show coma occurred when the lens arrangement of the soft-focus lens group (spherical-aberration varying lens group) 20 of FIG. 82 is switched to the soft-focus photographing mode (spherical-aberration occurring state), while an object at infinity is in an in-focus state. FIGS. 86A through 86D show aberrations occurred when the lens arrangement of the master lens group (filed-curvature varying lens group) 10 of FIG. 82 is switched to the soft-focus photographing mode (filed-curvature occurring state), while an object at infinity is in an in-focus state. Table 20 shows the numerical data of the twentieth embodiment. The basic lens arrangement is the same as the fifteenth embodiment. The diaphragm S is provided 2.89 from the surface No. 7 toward the object.

TABLE 20

$F_{NO} = 1:2.9 - 2.9 - 3.0$
$f = 85.75 - 85.45 - 80.13$
$w = 14.00 - 14.11 - 14.96$
$f_B = 39.00 - 47.71 - 39.00$

| Surface No. | r | d | Nd | vd |
|---|---|---|---|---|
| 1 | 56.939 | 5.29 | 1.61800 | 63.4 |
| 2 | −721.111 | 0.07 | — | — |
| 3 | 50.771 | 3.46 | 1.58913 | 61.2 |
| 4 | 96.679 | 5.27 | — | — |
| 5 | −206.108 | 1.40 | 1.78470 | 26.2 |
| 6 | 110.691 | 13.95-13.95-3.58 | — | — |
| 7 | −39.980 | 1.03 | 1.57099 | 50.8 |
| 8* | 38.648 | 3.17 | — | — |
| 9 | −132.881 | 2.40 | 1.77250 | 49.6 |
| 10 | −47.202 | 0.07 | — | — |

TABLE 20-continued $F_{NO} = 1:2.9 - 2.9 - 3.0$
$f = 85.75 - 85.45 - 80.13$
$w = 14.00 - 14.11 - 14.96$
$f_B = 39.00 - 47.71 - 39.00$

| Surface No. | r | d | Nd | vd |
|---|---|---|---|---|
| 11 | 46.518 | 6.21 | 1.59240 | 68.3 |
| 12 | −49.221 | 11.73-1.00-14.90 | — | — |
| 13 | −79.215 | 4.49 | 1.77250 | 49.6 |
| 14 | −31.230 | 3.24-5.26-3.24 | — | — |
| 15 | −26.427 | 1.17 | 1.66672 | 48.3 |
| 16 | −372.198 | — | — | — |

*designates the aspherical surface which is rotationally symmetrical with respect to the optical axis.

Aspherical surface data (the aspherical surface coefficients not indicated are zero (0.00)): Surf.

| No. | K | A4 | A6 | A8 |
|---|---|---|---|---|
| 8 | 0.00 | −0.27132 × 10$^{-5}$ | 0.91467 × 10$^{-9}$ | 0.96849 × 10$^{-11}$ |

Embodiment 21

FIGS. 87 through 91D show the twenty-first embodiment of the soft-focus lens system. FIG. 87 shows the lens arrangement of the soft-focus lens system in the normal photographing mode, when an object at infinity is in an in-focus state. FIGS. 88A through 88D show aberrations occurred in the soft-focus lens system of FIG. 87. FIGS. 89A through 89D show aberrations occurred when the lens arrangement of the soft-focus lens group (spherical-aberration varying lens group) 20 of FIG. 87 is switched to the soft-focus photographing mode (spherical-aberration occurring state), while an object at infinity is in an in-focus state. FIGS. 90A through 90D show coma occurred when the lens arrangement of the soft-focus lens group (spherical-aberration varying lens group) 20 of FIG. 87 is switched to the soft-focus photographing mode (spherical-aberration occurring state), while an object at infinity is in an in-focus state. FIGS. 91A through 91D show aberrations occurred when the lens arrangement of the master lens group (filed-curvature varying lens group) 10 of FIG. 87 is switched to the soft-focus photographing mode (filed-curvature occurring state), while an object at infinity is in an in-focus state. Table 21 shows the numerical data of the twenty-first embodiment. The basic lens arrangement is the same as the fifteenth embodiment. The diaphragm S is provided 3.84 from the surface No. 7 toward the object.

TABLE 21

$F_{NO} = 1:2.9 - 2.9 - 3.1$
$f = 123.83 - 123.35 - 114.89$
$w = 15.53 - 15.67 - 16.60$
$f_B = 59.00 - 73.32 - 59.00$

| Surface No. | r | d | Nd | vd |
|---|---|---|---|---|
| 1 | 94.233 | 6.49 | 1.61800 | 63.4 |
| 2 | −864.309 | 2.59 | — | — |
| 3 | 66.957 | 6.67 | 1.61800 | 63.4 |
| 4 | 133.151 | 2.84 | — | — |
| 5 | −688.979 | 1.50 | 1.72151 | 29.2 |
| 6 | 117.321 | 25.46-25.46-8.01 | — | — |

TABLE 21-continued $F_{NO} = 1{:}2.9 - 2.9 - 3.1$
$f = 123.83 - 123.35 - 114.89$
$w = 15.53 - 15.67 - 16.60$
$f_B = 59.00 - 73.32 - 59.00$

| Surface No. | r | d | Nd | vd |
|---|---|---|---|---|
| 7 | −51.412 | 1.57 | 1.53172 | 48.9 |
| 8* | 55.245 | 3.99 | — | — |
| 9 | −134.894 | 3.38 | 1.77250 | 49.6 |
| 10 | −62.571 | 0.10 | — | — |
| 11 | 66.381 | 7.71 | 1.59240 | 68.3 |
| 12 | −71.537 | 17.58-1.00-23.29 | — | — |
| 13 | −151.613 | 5.44 | 1.77250 | 49.6 |
| 14 | −44.636 | 3.29-5.54-3.29 | — | — |
| 15 | −38.543 | 1.77 | 1.66672 | 48.3 |
| 16 | −2464.682 | — | — | — |

*designates the aspherical surface which is rotationally symmetrical with respect to the optical axis.

Aspherical surface data (the aspherical surface coefficients not indicated are zero (0.00)): Surf.

| No. | K | A4 | A6 | A8 |
|---|---|---|---|---|
| 8 | 0.00 | −0.11713 × 10⁻⁵ | 0.23419 × 10⁻⁹ | 0.30228 × 10⁻¹² |

Numerical values of each condition of the first through ninth embodiments are shown in Table 22.

TABLE 22

|  | Condition (1) | Condition (2) |
|---|---|---|
| Embod. 1 | 0.16 | −1.40 |
| Embod. 2 | 0.15 | −1.50 |
| Embod. 3 | 0.11 | −1.92 |
| Embod. 4 | 0.07 | −1.10 |
| Embod. 5 | 0.11 | −1.22 |
| Embod. 6 | 0.15 | −2.14 |
| Embod. 7 | 0.17 | −2.24 |
| Embod. 8 | 0.16 | −2.16 |
| Embod. 9 | 0.17 | −2.06 |

Numerical values of each condition of the tenth through fourteenth embodiments are shown in Table 23.

TABLE 23

|  | Cond. (1') | Cond. (2') | Cond. (3) | Cond (4) |
|---|---|---|---|---|
| Embod. 10 | 0.14 | −3.08 | 0.86 | 0.35 |
| Embod. 11 | 0.12 | −2.07 | 0.79 | 0.35 |
| Embod. 12 | 0.10 | −2.70 | 0.89 | 0.28 |
| Embod. 13 | 0.20 | −4.00 | 0.91 | 0.41 |
| Embod. 14 | 0.12 | −1.73 | 0.71 | 0.39 |

As can be understood from the Table 23, the numerical values of the tenth through fourteenth embodiments satisfy conditions (1') (2') (3) and (4). Furthermore, as can be understood from the aberration diagrams, the aberrations are adequately corrected. In particular, as can be understood from the diagrams of coma in the soft-focus photographing mode, asymmetry, which is optically harmful, is not recognized, thereby it is apparent that the effects of soft-focusing are obtained.

Numerical values of each condition of the fifteenth through twenty-first embodiments are shown in Table 24.

TABLE 24

|  | Embod. 15 | Embod. 16 | Embod. 17 | Embod. 18 |
|---|---|---|---|---|
| Cond. (1) | 0.17 | 0.20 | 0.23 | 0.17 |
| Cond. (2) | −2.03 | −1.88 | −1.96 | −2.04 |
| Cond. (5) | 0.75 | 0.04 | 0.03 | 0.69 |
| Cond. (6) | 0.11 | −1.56 | −1.57 | −0.05 |
| Cond. (7) | 0.20 | 0.11 | 0.13 | 0.17 |

|  | Embod. 19 | Embod. 20 | Embod. 21 |
|---|---|---|---|
| Cond. (1) | 0.16 | 0.14 | 0.14 |
| Cond. (2) | −2.04 | −1.61 | −1.96 |
| Cond. (5) | 0.67 | 0.72 | 0.73 |
| Cond. (6) | −0.56 | −0.42 | −0.18 |
| Cond. (7) | 0.14 | 0.16 | 0.21 |

As can be understood from the Table 24, the numerical values of the fifteenth through twenty-first embodiments satisfy conditions (1) (2) (5) (6) and (7). Furthermore, as can be understood from the aberration diagrams, the aberrations are adequately corrected. In particular, as can be understood from the diagrams of coma in the soft-focus photographing mode, asymmetry, which is optically harmful, is not recognized, thereby it is apparent that the effects of soft-focusing are obtained. Still further, according to the diagrams showing aberrations in the field-curvature occurring state when an object at infinity is in an in-focus state, field curvature (astigmatism) can be largely occurred, so that the effects of soft-focusing can be obtained, while spherical aberration and other aberrations are not deteriorated.

According to the descriptions, the soft-focus lens system, in which (ii) the change of the focal point and the focal length do not substantially occur, (ii) complicated movement of the lens groups is not required, and (iii) options on the effects of soft-focusing in order to widen photographic expressions can be increased by utilizing not only spherical aberration but also filed curvature.

What is claimed is:

1. A soft-focus lens system comprising a positive master lens group and a negative soft-focus lens group,
    wherein said master lens group comprises two sub lens groups F1 and F2, and a diaphragm is provided therebetween;
    wherein at least one of said sub lens groups F1 and F2 of said master lens group is made moveable along the optical axis in order to set a normal photographing mode or a soft-focus photographing mode in which larger field curvature is occurred than in said normal photographing mode;
    wherein said negative soft-focus lens group comprises a positive sub lens group and a negative sub lens group, which are independently moveable with respect to said master lens group;
    wherein said positive sub lens group and said negative sub lens group are moved to set said normal photographing mode or said soft-focus photographing mode in which larger spherical aberration is occurred than in said normal photographing mode.

2. A soft-focus lens system according to claim 1, wherein each of said positive sub lens group and said negative sub lens group is arranged to move with respect to said master lens group and the other of said sub lens groups so that the focal point and the focal length are not varied before and after the switching of said soft-focus photographing mode to said normal photographing mode or vice versa.

3. A soft-focus lens system according to claim 1, wherein said master lens group and said soft-focus lens group are arranged in this order from an object; and wherein said positive sub lens group and said negative sub lens group comprise a positive single lens element and a negative single lens element which are arranged in this order from said object, and are arranged to form an air lens therebetween having a shape of a meniscus lens element with the concave surface facing toward said diaphragm.

4. A soft-focus lens system according to claim 1, wherein said master lens group functions as a lens group to perform focusing in order to obtain an in-focus state of said object.

5. A soft-focus lens system according to claim 1, satisfying the following conditions:

$$0.05 < d0/f < 0.50$$

$$-4.0 < fB0/f < -0.5$$

wherein d0 designates the distance between said master lens group and said soft-focus lens group along the optical axis in said normal photographing mode;

fB0 designates the focal length of said soft-focus lens group in said normal photographing mode; and f designates the focal length of the entire lens system in said normal photographing mode.

6. A soft-focus lens system according to claim 1, wherein said sub lens groups F1 and F2 are arranged in this order from said object, wherein at least said sub lens group F2 has positive power;

wherein said diaphragm is arranged to move together with said sub lens group F2 when the normal photographing mode is switched to the soft-focus photographing mode in which field curvature largely occurs than in the normal photographing mode, or vice versa; and wherein said sub lens group F1 satisfies the following condition:

$$|f/fF1| < 1.0$$

wherein fF1 designates the focal length of said sub lens group F1 of said master lens group.

7. A soft-focus lens system according to claim 1, wherein said sub lens group F2 is made immoveable, when said normal photographing mode is switched to said soft-focus photographing mode, or vice versa.

8. A soft-focus lens system according to claim 1, satisfying the following conditions:

$$-4.0 < f/rA < 1.0$$

$$0.05 < dF12/f < 0.50$$

wherein rA designates the radius of curvature of the object-side surface of the most-image side lens element in said sub lens group F1 of said master lens group; and dF12 designates the distance between said sub lens groups F1 and F2 in said normal photographing mode.

9. A soft-focus lens system comprising a positive master lens group and a negative soft-focus lens group, wherein said negative soft-focus lens group comprises a positive sub lens group and a negative sub lens group, which are independently moveable with respect to the master lens group;

wherein said positive sub lens group and said negative sub lens group are moved to set a normal photographing mode or a soft-focus photographing mode in which larger spherical aberration is occurred than in said normal photographing mode;

wherein each of said positive sub lens group and said negative sub lens group is arranged to move with respect to said master lens group and the other of said sub lens groups so that the focal point and the focal length are not varied before and after the switching of said soft-focus photographing mode to said normal photographing mode or vice versa.

10. A soft-focus lens system according to claim 9, wherein, said master lens group and said soft-focus lens group are arranged in this order from an object, and a diaphragm is provided in said master lens group; and wherein said positive sub lens group and said negative sub lens group comprise a positive single lens element and a negative single lens element which are arranged in this order from said object, and are arranged to form an air lens therebetween having a shape of a meniscus lens element with the concave surface facing toward said diaphragm.

11. A soft-focus lens system according to claim 9, satisfying the following conditions:

$$0.05 < d0/f < 0.5$$

$$-4.0 < fB0/f < -0.5$$

wherein d0 designates the distance between said master lens group and said soft-focus lens group along the optical axis in said normal photographing mode;

fB0 designates the focal length of said soft-focus lens group in said normal photographing mode; and f designates the focal length of the entire lens system in said normal photographing mode.

12. A soft-focus lens system according to claim 9, wherein only said master lens group functions as a lens group to perform focusing in order to obtain an in-focus state of said object, or the entire soft-focus lens system functions as said focusing lens group.

13. A soft-focus lens system according to claim 9, further comprising a positive focusing lens group that is provided between said positive master lens group and said negative soft-focus lens group, wherein each of said positive sub lens group and said negative sub lens group of said soft-focus lens group is arranged to move with respect to said master lens group, said focusing lens group and the other of said sub lens groups so that the focal point and the focal length are not varied before and after the switching of said soft-focus photographing mode to said normal photographing mode or vice versa;

wherein said master lens group is made constantly immoveable; and wherein said focusing lens group is arranged to function as a lens group to perform focusing regardless of the positions of said positive sub lens group and said negative sub lens group of said soft-focus lens group.

14. A soft-focus lens system according to claim 13, wherein, a diaphragm is provided in said focusing lens group; and wherein said positive sub lens group and said negative sub lens group of said negative soft-focus lens group comprise a positive single lens element and a negative single lens element which are arranged in this order from said object, and are arranged to form an air lens therebetween having a shape of a meniscus lens element with the concave surface facing toward said diaphragm.

15. A soft-focus lens system according to claim 13, satisfying the following conditions:

$$0.05 < d0'/f' < 0.50$$

$$-4.0 < fB0'/f' < -0.5$$

wherein
- d0' designates the distance between said focusing lens group and said soft-focus lens group along the optical axis in said normal photographing mode;
- fB0' designates the focal length of said soft-focus lens group in said normal photographing mode; and f' designates the focal length of the entire lens system in said normal photographing mode.

16. A soft-focus lens system according to claim 13, satisfying the following conditions:

$$0.5 < f3/f' < 1.5$$

$$0.1 < rR1/f' < 2.0$$

wherein
- f3 designates the focal length of said focusing lens group; and
- rR1 designates the radius of curvature of the most object-side surface of said focusing lens group.

* * * * *